United States Patent
Fernández Gutiérrez

(10) Patent No.: US 8,261,085 B1
(45) Date of Patent: Sep. 4, 2012

(54) METHODS, APPARATUS AND SYSTEMS TO IMPROVE SECURITY IN COMPUTER SYSTEMS

(75) Inventor: Álvaro Fernández Gutiérrez, Barcelona (ES)

(73) Assignee: Media Patents, S.L., Barcelona (ES)

( * ) Notice: Subject to any disclaimer, the term of this patent is extended or adjusted under 35 U.S.C. 154(b) by 0 days.

(21) Appl. No.: 13/244,723

(22) Filed: Sep. 26, 2011

Related U.S. Application Data

(63) Continuation-in-part of application No. 13/194,701, filed on Jul. 29, 2011.

(30) Foreign Application Priority Data

Jun. 22, 2011 (ES) .................................. 201131053

(51) Int. Cl.
*G06F 21/00* (2006.01)
(52) U.S. Cl. ........ 713/181; 713/176; 713/177; 713/179; 713/180; 713/189; 726/1; 726/2; 726/22; 726/24; 726/26; 711/113; 711/118; 711/119; 711/121; 711/123; 711/125; 711/126; 712/1; 712/2; 712/10; 712/23; 712/32; 712/35; 712/220
(58) Field of Classification Search .......... 713/176–181, 713/187, 189–194; 726/26–30, 1, 2, 22–24; 711/118–137, 113; 712/1–27, 32–35, 220
See application file for complete search history.

(56) References Cited

U.S. PATENT DOCUMENTS

| | | | |
|---|---|---|---|
| 5,953,422 A | 9/1999 | Angelo et al. | |
| 6,367,011 B1 | 4/2002 | Lee et al. | |
| 7,203,841 B2 * | 4/2007 | Jackson et al. | 713/187 |
| 7,891,008 B2 * | 2/2011 | Fortune et al. | 726/27 |
| 2004/0111610 A1 * | 6/2004 | Slick et al. | 713/160 |
| 2004/0111749 A1 | 6/2004 | Zhang et al. | |
| 2004/0117653 A1 | 6/2004 | Shapira et al. | |
| 2006/0048221 A1 | 3/2006 | Morais et al. | |
| 2006/0080553 A1 | 4/2006 | Hall | |
| 2007/0067130 A1 * | 3/2007 | Toda et al. | 702/108 |
| 2007/0113103 A1 | 5/2007 | Ye et al. | |
| 2008/0010473 A1 * | 1/2008 | Harris | 713/300 |
| 2008/0163008 A1 * | 7/2008 | Jacob | 714/699 |
| 2008/0229117 A1 | 9/2008 | Shin et al. | |
| 2008/0256363 A1 * | 10/2008 | Balacheff et al. | 713/187 |
| 2009/0049309 A1 | 2/2009 | Brinker et al. | |
| 2009/0254761 A1 | 10/2009 | Thiebeauld De La Crouee et al. | |
| 2009/0259924 A1 * | 10/2009 | Amann et al. | 714/807 |
| 2009/0276617 A1 | 11/2009 | Grell et al. | |
| 2010/0029370 A1 | 2/2010 | Robinson et al. | |
| 2010/0293388 A1 * | 11/2010 | Ammer et al. | 713/187 |
| 2011/0087872 A1 | 4/2011 | Shah et al. | |
| 2011/0246817 A1 | 10/2011 | Orsini et al. | |

OTHER PUBLICATIONS

Caches and Hash Trees for Efficient Memory Integrity Verification by Gassend et al; Year: 2003; Publisher: IEEE.*

(Continued)

*Primary Examiner* — Taghi Arani
*Assistant Examiner* — Madhuri Herzog
(74) *Attorney, Agent, or Firm* — Gary R. Maze; K Kalan; Berenbaum Weinshienk PC

(57) ABSTRACT

According to some implementations methods, apparatus and systems are provided involving the use of processors having at least one core with a security component, the security component adapted to read and verify data within data blocks stored in a L1 instruction cache memory and to allow the execution of data block instructions in the core only upon the instructions being verified by the use of a cryptographic algorithm.

84 Claims, 37 Drawing Sheets

OTHER PUBLICATIONS

Platte et al., "A New Encryption and Hashing Scheme for the Security Architecture for Microprocessors", Robotics Research Institute: Section Information Technology, Lecture Notes in Computer Science, 2006 (The year of publication is sufficiently earlier than the effective U.S. Filing date, and any foreign priority date, so that the particular month of publication is not an issue), vol. 4237/2006, 120-129, Springer, University of Dortmund, Germany.

Platte et al., "A Cache Design for a Security Architecture for Microprocessors (SAM)", Robotics Research Institute: Section Information Technology, Lecture Notes in Computer Science, 2006 (The year of publication is sufficiently earlier than the effective U.S. Filing date, and any foreign priority date, so that the particular month of publication is not an issue), vol. 3894/2006, 435-449, Springer, University of Dortmund, Germany.

Platte et al., "A Combined Hardware and Software Architecture for Secure Computing", Computer Engineering Institute, University of Dortmund, Proceedings of the 2nd Conference on Computing Frontiers, May 2005, ACM, Germany.

* cited by examiner

METHODS, APPARATUS AND SYSTEMS TO IMPROVE SECURITY IN COMPUTER SYSTEMS

CROSS-REFERENCE TO RELATED APPLICATIONS

The present application is a continuation-in-part of application Ser. No. 13/194,701, filed Jul. 29, 2011, which claims priority to and the benefit of Spanish Patent Application No. 201131053, filed Jun. 22, 2011. The present application is also related to U.S. patent application Ser. Nos. 13/244,757 and 13/244,782 all three of which being filed together on the same date of Sep. 26, 2011, all the teachings of which being incorporated herein by this reference as if fully set forth here.

TECHNICAL FIELD

The field relates to security of computer systems.

BACKGROUND

Today computers systems are highly vulnerable to virus, worms, Trojans and other malware and security vulnerabilities.

Recently there has appeared a new malware used by a new bootnet called TDL-4 that has switched from using centralized networks to control the bootnet to using Peer to Peer networks, making it impossible to stop the bootnet by stopping their control servers. More than 4.5 million computers may have thus far been infected by this new bootnet.

In July 2011 a new vulnerability was discovered in the Skype program that allows a hacker to hijack user accounts. Another vulnerability was discovered in the iOS operating system from Apple that could allow hackers to remotely control iPhones, iPads and iPod touch when the devices open an infected pdf file.

There is thus a need to improve the security in computer systems.

SUMMARY OF THE DISCLOSURE

Methods, apparatus and systems are provided that improve security in computer systems.

In one implementation a computer system stores a software program that contains some instructions organized in data blocks, wherein each data block comprises first data with instructions like, for example, machine code instructions, and second data, like, for example, a digital signature, a hash value or a cryptographic hash value, computed using a first cryptographic algorithm and taking as input of the cryptographic algorithm at least the first data, and wherein the computer system includes a security component within the processor that allows the execution of the instructions of the first data only after the security component has used a second cryptographic algorithm to verify that the second data is correct According to one implementation a processor is provided that is adapted to process data blocks of a first computer program, the data blocks having a length in bytes and comprising first data comprising information fields, second data comprising executable instructions and third data usable to verify at least the second data, the information fields of the first data comprising a first information field identifying the format of the data block, a second information field identifying a first cryptographic key and a third information field identifying a first cryptographic algorithm usable to verify the at least second data using the first cryptographic key and the third data, the processor comprising a first core having a L1 instruction cache memory with cache lines having a length in bytes that is the same length in bytes as the data blocks, the L1 cache memory adapted to store a data block of the first computer program in a cache line of the L1 instruction cache memory, the first core comprising a security component adapted to read the information of the data block stored in the cache line and to access inside the processor the first cryptographic key identified in the second information field of the data block and use the first cryptographic key in the execution of the first cryptographic algorithm to calculate fourth data based at least on the second data, and to verify at least the second data if the calculated fourth data is the same as the third data stored in the data block, the first core adapted to execute the executable instructions of a data block stored in the cache line of the L1 cache memory only upon the security component verifying at least the second data of the data block.

According to one implementation a processor is provided that is adapted to process data blocks of a first computer program, the data blocks having a length in bytes and comprising first data comprising information fields, second data comprising executable instructions and third data usable to verify at least the first and second data, the information fields of the first data comprising a first information field identifying the format of the data block, a second information field identifying a first cryptographic key and a third information field identifying a first cryptographic algorithm usable to verify the at least first and second data using the first cryptographic key and the third data, the processor comprising a first core having a L1 instruction cache memory with cache lines having a length in bytes that is the same length in bytes as the data blocks, the L1 cache memory adapted to store a data block of the first computer program in a cache line of the L1 instruction cache memory, the first core comprising a security component adapted to read the information of the data block stored in the cache line and to access inside the processor the first cryptographic key identified in the second information field of the data block and use the first cryptographic key in the execution of the first cryptographic algorithm to calculate fourth data based at least on the first and second data, and to verify at least the first and second data if the calculated fourth data is the same as the third data stored in the data block, the first core adapted to execute the executable instructions of a data block stored in the cache line of the L1 cache memory only upon the security component verifying at least the first and second data of the data block.

According to one implementation a computing device is provided comprising: a main memory storing at least a part of a first computer program comprising data blocks having a length in bytes, the data blocks comprising first data comprising information fields, second data comprising executable instructions and third data usable to verify at least the second data, the information fields of the first data comprising a first information field identifying the format of the data block, a second information field identifying a first cryptographic key and a third information field identifying a first cryptographic algorithm usable to verify at least the second data using the first cryptographic key and the third data; and a processor comprising a first core having a L1 instruction cache memory comprising cache lines with a length in bytes that is the same length in bytes as the data blocks of the first computer program, the L1 cache memory adapted to store a data block of the first computer program in a cache line, the first core comprising a security component adapted to read the information of the data block stored in the cache line and to access inside the processor the first cryptographic key identified in the second information field of the data block and use the first cryptographic key in the execution of the first cryptographic algorithm to calculate fourth data based at least on the second data, and to verify at least the second data if the calculated fourth data is the same as the third data stored in the data block, the first core adapted to execute the executable instructions of the data block stored in the cache line only upon the security component verifying at least the second data of the data block.

According to one implementation a computing device is provided comprising: a main memory storing at least a part of a first computer program comprising data blocks having a length in bytes, the data blocks comprising first data comprising information fields, second data comprising executable instructions and third data usable to verify at least the first and second data, the information fields of the first data comprising a first information field identifying the format of the data block, a second information field identifying a first cryptographic key and a third information field identifying a first cryptographic algorithm usable to verify at least the first and second data using the first cryptographic key and the third data; and a processor comprising a first core having a L1 instruction cache memory comprising cache lines with a length in bytes that is the same length in bytes as the data blocks of the first computer program, the L1 cache memory adapted to store a data block of the first computer program in a cache line, the first core comprising a security component adapted to read the information of the data block stored in the cache line and to access inside the processor the first cryptographic key identified in the second information field of the data block and use the first cryptographic key in the execution of the first cryptographic algorithm to calculate fourth data based at least on the first and second data, and to verify at least the first and second data if the calculated fourth data is the same as the third data stored in the data block, the first core adapted to execute the executable instructions of the data block stored in the cache line only upon the security component verifying at least the first second data of the data block.

According to one implementation a method is provided comprising: receiving in a processor comprising a first core having a security component and a L1 instruction cache memory data blocks of a first computer program having lengths in bytes that are the same length in bytes as the cache lines of the L1 instruction cache memory, the data blocks comprising first data comprising information fields, second data comprising executable instructions and third data usable to verify at least the second data, the information fields of the first data comprising a first information field identifying the format of the data block, a second information field identifying a first cryptographic key and a third information field identifying a first cryptographic algorithm usable to verify at least the second data using the first cryptographic key and the third data; storing in the L1 cache memory at least one of the data blocks of the first computer program in one of the cache lines of the L1 instruction cache memory; the security component reading the information of the at least one data block stored in a cache line of the L1 instruction cache memory and accessing inside the processor the first cryptographic key identified in the second information field of the at least one data block and using the first cryptographic key in the execution of the first cryptographic algorithm to calculate fourth data based at least on the second data, and verifying at least the second data if the calculated fourth data is the same as the third data stored in the at least one data block; and executing in the first core the executable instructions of the at least one data block only upon the security component verifying the at least second data of the at least one data block.

According to one implementation a method is provided comprising: receiving in a processor comprising a first core having a security component and a L1 instruction cache memory data blocks of a first computer program having lengths in bytes that are the same length in bytes as the cache lines of the L1 instruction cache memory, the data blocks comprising first data comprising information fields, second data comprising executable instructions and third data usable to verify at least the first and second data, the information fields of the first data comprising a first information field identifying the format of the data block, a second information field identifying a first cryptographic key and a third information field identifying a first cryptographic algorithm usable to verify at least the first and second data using the first cryptographic key and the third data; storing in the L1 cache memory at least one of the data blocks of the first computer program in one of the cache lines of the L1 instruction cache memory; the security component reading the information of the at least one data block stored in a cache line of the L1 instruction cache memory and accessing inside the processor the first cryptographic key identified in the second information field of the at least one data block and using the first cryptographic key in the execution of the first cryptographic algorithm to calculate fourth data based at least on the first and second data, and verifying at least the first and second data if the calculated fourth data is the same as the third data stored in the at least one data block; and executing in the first core the executable instructions of the at least one data block only upon the security component verifying the at least first and second data of the at least one data block.

BRIEF DESCRIPTION OF THE DRAWINGS

Other advantages and features of the present invention are explained in the following description in which, with a non-limiting character, preferred embodiments are referred to in relation to the attached drawings:

FIG. 6B shows a structure of a software program that includes hash data.

DETAILED DESCRIPTION

Figure 1:
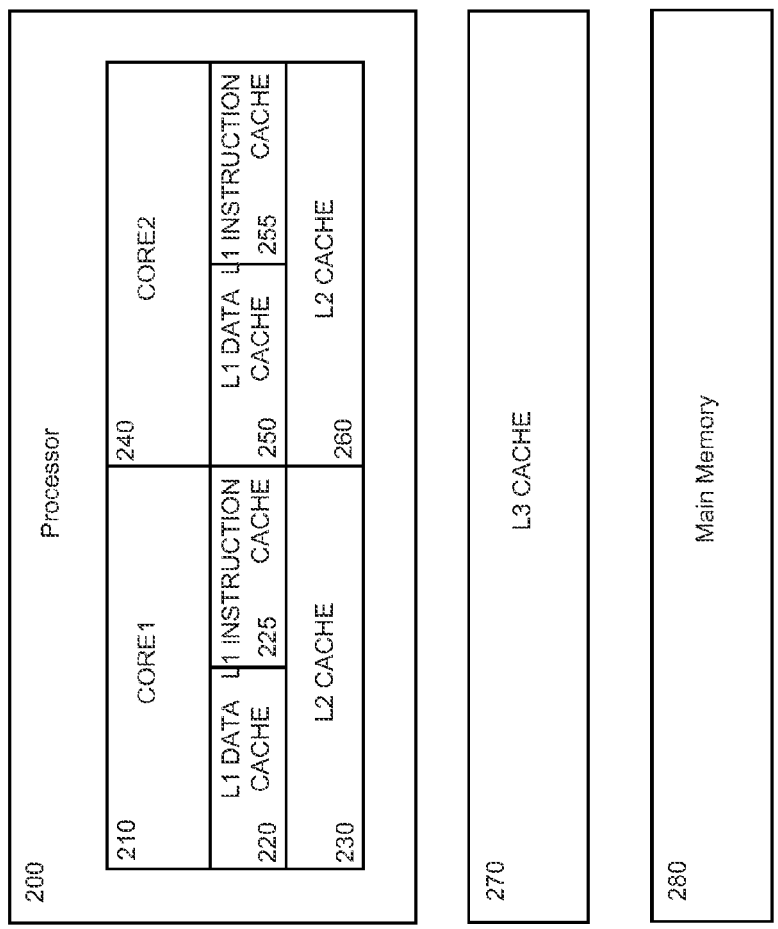
FIG. 1 shows an example of a processor and two memories that may be used in some implementations.

In the following description, references to "one implementation" or "an implementation", "in some implementations", or like terms mean that the feature or features being referred to is included in at least one implementation of the present invention. Further, separate references to "one implementation" or "an implementation", "in some implementations", or like terms in the foregoing description do not necessarily refer to the same implementation; however, such implementations are also not mutually exclusive unless so stated, and except as will be readily apparent to those skilled in the art from the description. For example, a feature, structure, act, etc. described in one implementation may also be included in other implementations. Thus, the present invention includes a variety of combinations and/or integrations of the implementations described herein.

A description of how a memory may operate in different computerized systems may be found in the book Modern Operating Systems, Andrew S. Tanenbaum, 2008, published by Prentice Hall. Chapter 3 of the book is entitled "Memory Management" and describes the operation of various types of memories and different devices and concepts related to the functioning of memory in computer systems, for example, no memory abstraction, memory abstraction, address spaces, base and limit registers, swapping, virtual memory, pages, paging, virtual addresses, virtual address space, MMU (Memory Management Unit), page frames, page fault, page table, TLB (Translation Lookaside Buffers) and other concepts that are well known in the prior art and not explained here to simplify the explanation. Implementations disclosed and contemplated herein may use some of these concepts and elements.

A description of cryptography and cryptographic algorithms may be found in the book "Understanding Cryptography", Christof Paar and Jan Pelzl, 2010, published by Springer.

"Word" is often used to refer to a set of data used by a processor. A word is a fixed set of bits that can be managed as a unit by the instruction set of the processor or processor hardware. In systems of 32 bits each word consists of 32 bits or 4 bytes and in 64-bit systems each word consists of 64 bits or 8 bytes. For example, there are 32-bit processors that can load 4 bytes of data in a processor register with a single instruction and there are 64-bit processors that can load 8 bytes of data in a processor register with a single instruction. Other implementations are also possible as will be discussed below.

The implementations disclosed and contemplated herein are aimed improve the security of different types of computer systems or computer devices like, for example, a desktop computer, a laptop computer, a server, a mobile phone, a smartphone, a media player such as iPod, a television, a smart-TV, a PC tablet, a set top box, a router, a firewall, a switch, a proxy, an SOC (System on a Chip), a NoC (Network on a Chip) and/or any other electronic equipment, electronic component or computing device having a hardware component to execute instructions or processes in software or in hardware, such as, for example, an electronic device that comprises a processor and/or an FPGA (Field Programmable Gate Array).

FIGS. 1 to 4 show, without limiting the scope of the invention, various examples of processors and memories that may be used in the implementations disclosed and contemplated herein.

FIG. 1 shows a processor 200 consisting of two cores, CORE1 210 and CORE2 240 having cache memories.

In the following description the abbreviation L1 refers to the first level cache memory that usually is the cache memory with the lowest latency. The abbreviation L2 refers to the second level cache memory.

CORE1 210 has a L1 data cache 220, a L1 instruction cache 225 and a L2 cache 230. CORE2 240 has a L1 data cache 250, a L1 instruction cache 255 and a L2 cache 260.

FIG. 1 also shows an L3 external cache 270 and a main memory 280 which may be used by CORE1 and CORE2.

Figure 2:
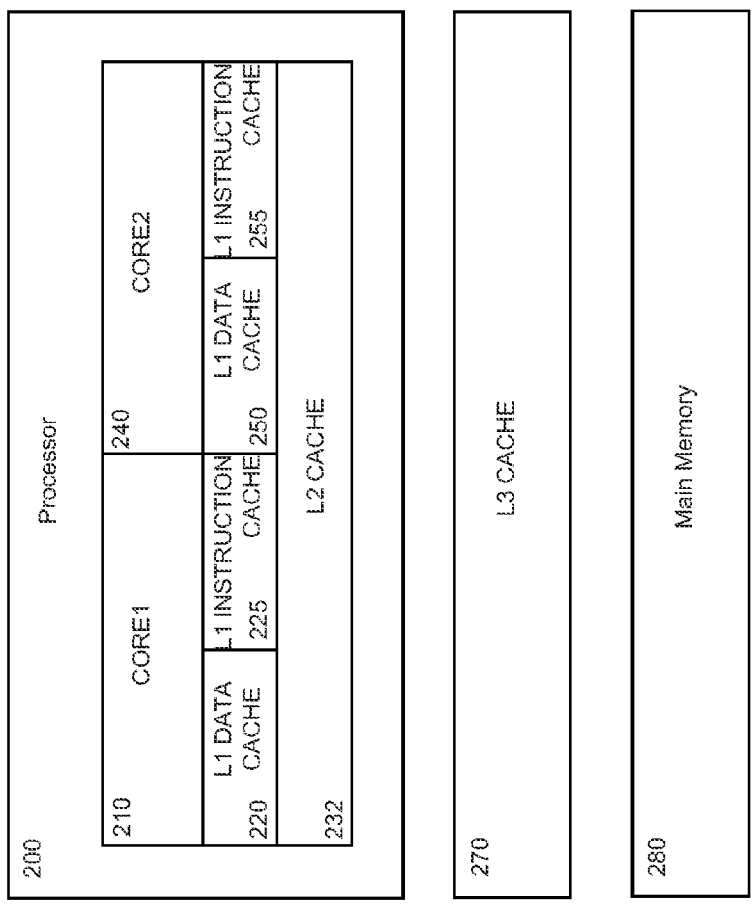
FIG. 2 shows another example of a processor and two memories that may be used in some implementations.

FIG. 2 shows an example in which the L2 cache memory 232 is a memory shared by both cores CORE1 210 and CORE2 240.

Figure 3:
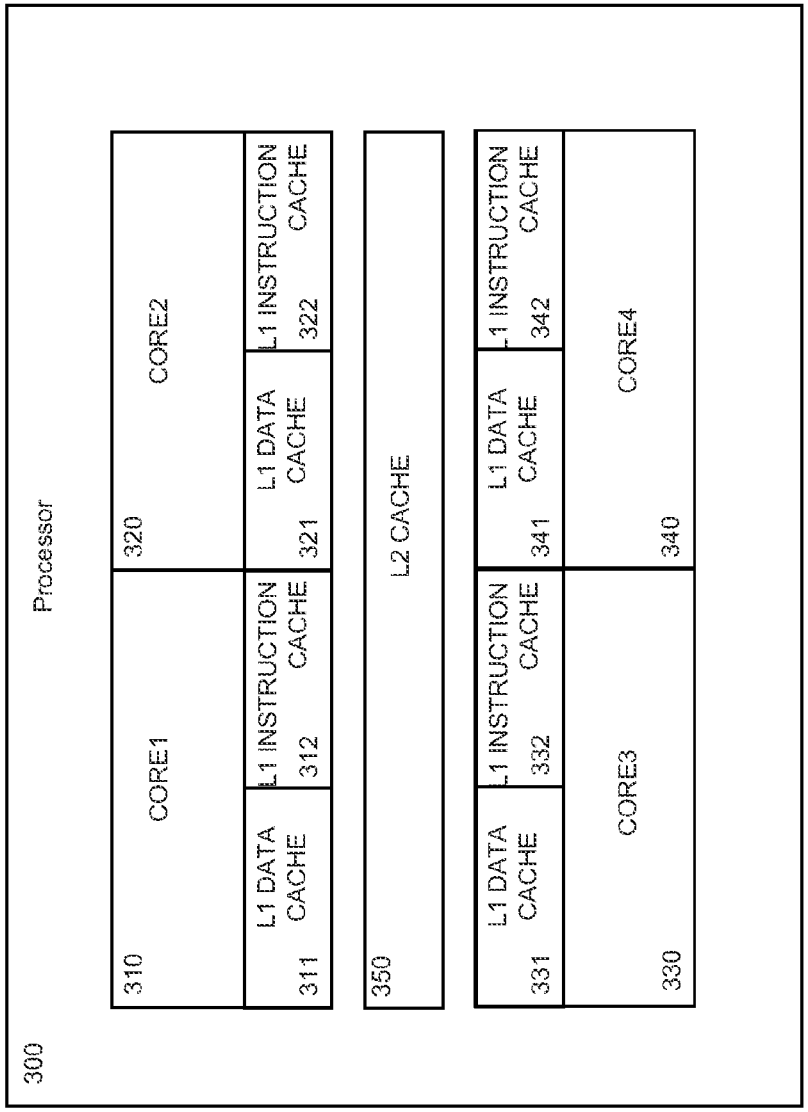
FIG. 3 shows an example of a processor with four cores and a shared L2 cache memory that may be used in some implementations.

FIG. 3 shows one example of a processor 300 with four cores CORE1 310, CORE2 320, CORE3 330 and CORE4 340. Each of the cores CORE1, CORE2, CORE3 and CORE4 has a L1 data cache 311, 321, 331 and 341, respectively, and a L1 instruction cache 312, 322, 332 and 342, respectively. FIG. 3 also shows a L2 cache 350 that may be used by all four cores.

Figure 4:
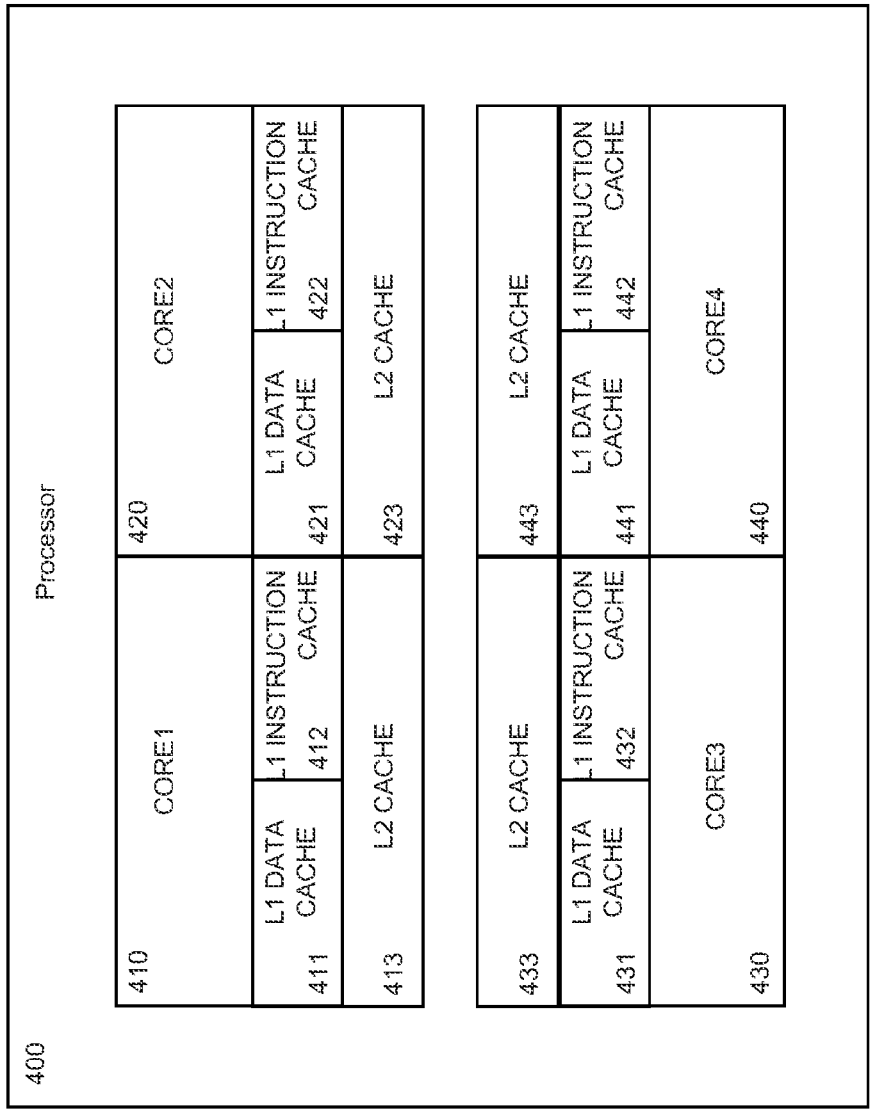
FIG. 4 shows an example of a processor with four cores and four L2 cache memories that may be used in some implementations.

FIG. 4 shows another example of a processor 400 with four cores. CORE1 410 has a L1 data cache 411 and a L1 instruction cache 412. CORE2 420 has a L1 data cache 421 and a L1 instruction cache 422. CORE3 430 has a L1 data cache 431 and a L1 instruction cache 432. CORE4 440 has a L1 data cache 441 and a L1 instruction cache 442. Each one of the cores CORE1 410, CORE2 420, CORE3 430 and CORE4 440 has its own L2 cache 413, 423, 433 and 443, respectively.

FIGS. 1 to 4 show non-limiting examples of processors that may be used in some implementations. However, other different processors with a different number of cores, for example 16 to 100 cores, and with different cache memory configurations may be used in the implementations disclosed and contemplated herein.

Figure 5:
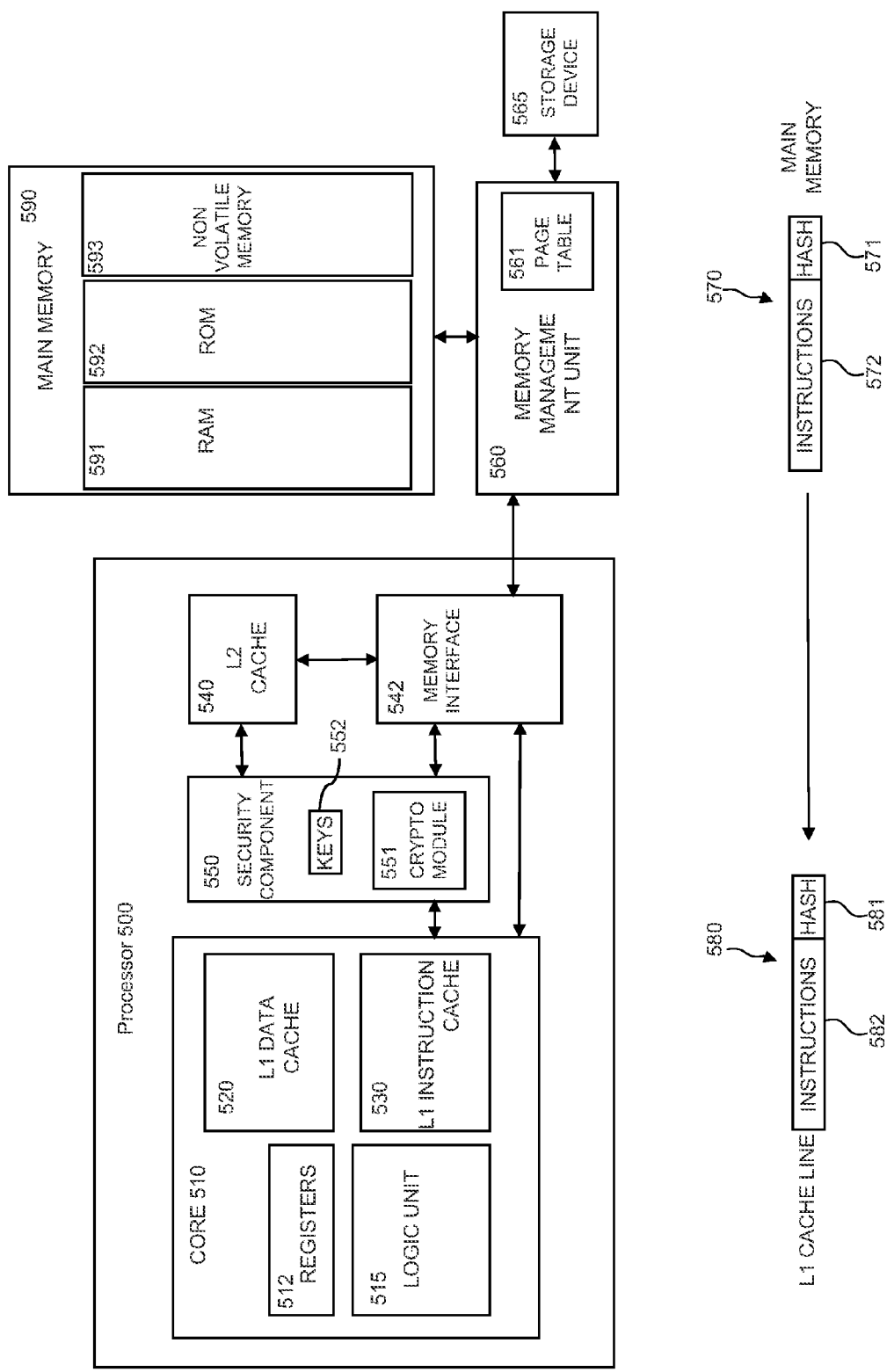
FIG. 5 shows an example of a processor that may be used in some implementations.

FIG. 5 shows an example of an implementation with a processor 500 that has a single CORE 510 to simplify the explanation.

In one implementation, CORE 510 of the processor 500 may comprise a logic unit 515, registers 512, a L1 data cache 520 and a L1 instruction cache 530. Core 510 may comprise other elements not shown in FIG. 5 for simplicity.

The processor 500 also has an L2 cache memory 540, a memory interface component 542, which may include features such as communication management with the MMU 560 (Memory Management Unit) and/or main memory 590, and a security component 550. The processor 500 may use other cache memories not shown in the figure, like for example an internal L3 memory cache or an external L3 memory cache.

Main memory 590 may include a combination of memories, such as RAM (Random Access Memory) 591, ROM (Read Only Memory) 592 and/or a non-volatile memory 593, like, for example, flash memory. Different implementations may use other types of main memory.

The security component 550 has a memory KEYS 552 capable to store cryptographic information, like for example cryptographic keys.

In some implementations, the memory KEYS 552 may be a ROM memory or FLASH memory located inside the security component 550.

In some implementations, the security component 550 may access an external memory that stores cryptographic keys, for example a memory inside the processor 500 but outside the security component or a memory in a component outside the processor 500 but in the same computing device as the processor 500.

In some implementations, the security component may comprise an internal cache memory, for example an internal static RAM cache memory, (not shown in the figure) to speed the access to memory 552, for example storing in the internal cache memory the most recently used data in the memory KEYS 552.

The security component 550 may also include a crypto module 551 that is capable of executing different cryptographic algorithms, In some implementations, the crypro module 551 may be capable of executing algorithms to calculate or compute hash functions, cryptographic hash functions and/or digital signatures such as for example, DSA (Digital Signature Algorithm), RSA Digital signature, Elgamal Digital Signature, ECDSA (Elliptic Curve Digital Signature Algoriyhm), Hash Functions using Block Ciphers, MAC (Message Authentication Code), HMAC (Hashed Message Authentication Code), MD5, SHA1, SHA2, SHA256, SHA-384, SHA512 and other cryptographic algorithms.

The book "Understanding Cryptography", Christof Paar et. Al., 2010, Springer-Verlag, explains many of the mentioned cryptographic algorithms.

Below is a brief explanation about hash functions and cryptographic algorithms.

A hash function is a function, procedure or algorithm that converts a first set of data into a second smaller set of data generally called "hash values", "hash codes", "hashes" and other names, so that an accidental or intentional modification of any byte in the first set of data causes an alteration in the hash value. Hash functions are also known as one-way hash function or compression function.

In cryptography, the term "message" is commonly used to refer to the first set of data.

A n-bit cryptographic hash function is a function taking an arbitrary long message and a cryptographic key as input and outputting a fixed-length hash value of size n bits.

Cryptographic hash functions have many information security applications, for example, digital signatures and message authentication codes (MAC).

Message Authentication Codes (MAC) is a hash function with addition of a secret key. The hash value is a function of both, the first set of data and the key.

Hashed Message Authentication Code (HMAC) is a protocol that uses hash functions for authentication. The basic idea of hash-based message authentication codes is that a secret key is hashed together with the message.

Different implementations may use different type of digital signatures, hash functions, cryptographic hash functions and/or other cryptographic algorithms, with or without secret keys or cryptographic keys.

The ideal cryptographic hash function has the following characteristics:
  it is easy to compute the hash value for a given message
  it is computationally infeasible to find out the message that generated a given hash value
  it is computationally infeasible to change a message with a given hash value
  it is computationally infeasible to find two messages with the same hash value The hash value obtained by a hash function or cryptographic hash function is usually called "message digest", "digest", "message digest", "fingerprint", "cryptographic checksum", "cryptographic hash value", "keyed hash value" and others names.

Digital signatures may employ a type of asymmetric cryptography that uses two keys: a private key and a public key. For messages sent through a non-secure channel, a properly implemented digital signature gives the receiver reason to believe the message was sent by the claimed sender. Digital signatures are equivalent, in some respects, to traditional handwritten signatures with properly implemented digital signatures are more difficult to forge than the handwritten type.

A digital signature may be used for proving the authenticity of a digital message or data. A valid digital signature gives a recipient reason to believe that the message or data was created by a known sender, and that it was not altered in transit.

Digital signatures can also provide non-repudiation, meaning that the signer cannot successfully claim they did not sign a message, while also claiming their private key remains secret. Further, some non-repudiation methods offer a time stamp for the digital signature, so that even if the private key is exposed, the signature is valid nonetheless. Digitally signed messages may be anything performable as bit string. Examples include electronic mail, contacts, or a message sent via come other cryptographic protocol.

A digital signature may consists of three algorithms:
  A first algorithm is the key generation algorithm that selects a private key uniformly at random for a set of possible private keys. The algorithm outputs the private key and a corresponding public key.

A second algorithm is the signing algorithm that, given a message and a private key, produces a signature.

A third algorithm is the signature verifying algorithm that, given a message, a public key and a signature, either accepts or rejects the message's claim to authenticity.

In some implementations a digital signature may use hash functions. For example the sender may use a hash function to compute a hash value of a message and then compute the digital signature of the hash value instead of the digital signature of the message. The sender then sends the message and the digital signature of the hash value to the receiver. Hence the hash value represents the message. The receiver receives the messages and the digital signature of the hash value and computes the hash function of the message to obtain the hash value and using the public key verifies the digital signature of the hash value.

Some implementations may use hash functions, cryptographic hash functions and/or digital signatures. Other implementations may use other cryptographic algorithms.

For clarity, in the following explanation the term "hash data" refers to the data output by a cryptographic algorithm that may take as input a message or set of data and optionally a cryptographic key, like for example the algorithm of a hash function, the algorithm of a cryptographic hash function, the algorithm of a digital signature and other cryptographic algorithms. In the figures and in the term "HASH" or the capital letter "H" is used.

In some implementations the hash data may be, for example, a hash value computed using a hash function without a cryptographic key, a hash value computed using a cryptographic hash function with a cryptographic key, a hash value computed using the HMAC algorithm, a digital signature or a data computed using other different cryptographic algorithms.

To avoid repeating in all the explanation that different implementations may implement all these different cryptographic algorithms and/or other cryptographic algorithms we will refer to the output of the cryptographic algorithms with the term "hash data".

Some implementations may add padding data to the set of data that is going to be used as input of a hash function, cryptographic hash function or digital signature algorithm. The use of padding data in some implementations is explained in FIGS. 27C and 27D.

Returning to FIG. 5, when data from an address of the main memory are transferred to the cache memory, for example to the L1 data cache 520 or the L1 instruction cache 530, a single word is not transferred (such as a Word of 32 or 64 bits) rather a set of contiguous words are transferred, called "cache line". In FIG. 5, the element 580 represents a cache line, for example a cache line of the L1 instruction cache and the element 570 represents the data stored in the main memory 590.

In one implementation, when a memory address that is not stored in the cache memory is required by the processor, the entire cache line is transmitted from the main memory to L1 cache memory, either the L1 data cache 520 or L1 instruction cache 530.

The memory address of each cache line is calculated based on the size of the cache line. For example in a 64-byte cache line the last 6 bits of the memory address of the cache line are zero. In a 128-byte cache line, the last 7 bits of the memory address of each cache line are zero. In general, in a cache line of a size of $2^n$ bits, the last n bits (the lower n bits) of the address of the cache line are zero.

In one implementation, when a processor instruction reads a memory address that is not stored in the cache memory, the cache line containing the data is first transferred from main memory (or from another intermediate cache, such as L2 or L3) to a L1 cache memory, either the L1 data cache or the L1 instruction cache.

In some implementations, it may be necessary to make space in the L1 cache memory to store the cache line. To do this, one or more cache lines may be evicted from the L1 cache memory to other cache memory such as L2. In turn, the L2 cache memory may evict its data to other L3 cache memory (not shown in FIG. 5) and data may also be evicted to the main memory 590.

In FIG. 5, element 570 represents a block of data having the same size of a cache line and stored in a given memory address of the main memory 590. The data block 570 comprises a first part 572, which for example may store executable instructions, and a second part HASH 571 storing hash data. that may be calculated or computed using the first data 572 and a cryptographic key by executing a cryptographic algorithm, like for example a hash function, a cryptographic hash function, a digital signature or other cryptographic algorithms.

In the following explanation we use the term "data block" to refer to elements like 570 that comprise a first data, for example instructions, an a second data that is a hash data.

As previously explained the term "hash data" is used to refer to data that may be calculated or computed based on first data 572, for example using a cryptographic key and executing a cryptographic algorithm, like for example a hash function, a cryptographic hash function, a digital signature or other cryptographic algorithms.

In one implementation, when the processor 500 requests one or more data stored in the main memory, the data block 570 is transferred from main memory to a L1 cache memory of core 510, for example using the Memory Management Unit (MMU) 560 and memory interface 542.

The element 580 of FIG. 5 represents the data of data block 570 stored in a cache line of the L1 cache memory of the processor. The cache line 580 stores a first data portion 582, which for example may comprise executable instructions, for example machine code instructions executable by the CORE 510, and a second data portion 581 storing the hash data.

In the example of FIG. 5, the data block 570 comprises two data portions 571 and 572 and the cache line 580 comprises also two data portions 581 and 582, but other implementations are possible like, for example, the implementations of FIGS. 21A, 21B, 21C, 27A and 27B.

In the next figures examples of data blocks and cache lines comprising two portions are used, but other implementations using different data blocks are possible.

In some implementations, the data block 570 may be stored in a cache line in the L1 instruction cache 530 and the first data portion 582 may comprise instructions that may be executed by the core 510 when stored in the L1 instruction cache line 580.

In some implementations the data block 570 may comprise any kind of data and may be stored in a cache line in the L1 data cache 520 or in the L1 instruction cache 530.

In some implementations, the data portion 582 of the cache line 580 may store instructions executable by the processor 500, for example machine code instructions executable by the core 510, and before the core 510 can execute instructions 582 from the cache line 580 stored in the L1 Instruction cache 530, the security component 550 uses the crypto module 551 to verify that the hash data 581 is correct using a cryptographic algorithm that may take as input the data 582 and a cryptographic key, for example a cryptographic key stored in the memory KEYS 552.

If the crypto module 551 verifies that the hash data is correct, the security component allows the CORE 510 to execute the instructions 582 stored in the cache line 580. Otherwise the security component doesn't allow the core 510 to execute the instructions stored in the cache line 580.

In one implementation, the security component 550 verifies the hash data 571 while transferring the data block 570 from the main memory to the cache line 580 of the L1 instruction cache and only stores the data block 570 in the cache line 580 if the hash data 571 is correct. For example, the security component may comprise a buffer memory (not shown in FIG. 5) to verify the hash data of the data blocks stored in the buffer memory and only transfers the data of a data block to a cache line if the hash data is correct.

In some implementations, each cache line 580 of the L1 cache memories may have associated an additional bit, for example an additional bit stored in a table used to associate the cache addresses with the physical memory addresses and/or virtual memory addresses or a table used to manage the cache coherence. We will call this bit the SECURE BIT, which indicates that the hash data of a cache line has been verified and it is correct.

In one implementation, the CORE 510 can not execute instructions in the cache line 580 until the security component verifies that the hash data 581 is correct and stores this information in the SECURE BIT associated to the cache line 580.

In one implementation when data block 570 of the main memory is transferred to the cache line 580, for example a cache line stored in the L1 instruction cache, the security component may store the value 0 in the SECURE BIT associated to the cache line 580 to indicate that the hash data 581 has not yet been verified.

The security component then verifies the hash data using the crypto module 551 and If the hash data 581 is correct, the security component changes the SECURE BIT value to 1 to indicate that the hash data 581 is correct and therefore the CORE 510 may execute any instruction stored in the part 582 of the cache line 580.

In one implementation, if the hash data 581 is not correct the security component doesn't change the value 0 in the SECURE BIT and the CORE 510 doesn't execute the instruction stored in the cache line 580.

In one implementation, the security component may read the L2 cache memory and may verify that the hash data of a data block stored in the L2 cache is correct and may update the SECURE BIT associated with the data block stored in the L2 cache, for example storing the value 1 in a SECURE BIT associated with the data block stored in the L2 cache memory.

For example, the SECURE BIT may be set to the value 0 when a data block is transferred from the main memory to the L2 cache memory. If the data is transferred from the L2 cache to the L1 cache, then the security component verifies the hash data and updates the SECURE BIT, for example, the SECURE BIT may be set to the value 1 if the hash data is correct.

In one implementation, for example if the L2 cache is inside the microprocessor, if the security component has updated the SECURE BIT of a data block stored in the L2 cache to the value 1, it may be not necessary to verify the hash data again when the data block is transferred from the L2 cache to a cache line of the L1 cache if the data of the data block hash not been modified in the L2 cache memory.

In one implementation, a L1 instruction cache line of the L1 cache memory having a correct hash data and the SECURE BIT set to the value 1 is transferred to the L2 cache maintaining the SECURE BIT=1 and then, transferred back to the L1 instruction cache maintaining the secure bit=1. This way, it is not necessary to verify the hash data of the cache line each time it is moved between L1 and L2 memories.

In some implementations, the security component is only used with the L1 instruction cache and it is not used with the L1 data cache, and the core or cores may read and write data in the L1 data cache without the security component 550 verifying hash data in the cache lines of the L1 data cache.

In other implementations, the security component is used with the L1 instruction cache and also with some determined memory addresses of the L1 data cache.

When executable instructions of programs are executed in the core 510, the instructions usually read and write memory addresses in the L1 data cache, so it may not be convenient to use hash data in all the L1 data cache lines.

But certain applications and certain parts of the operating system of the computing device may use hash data in certain parts or addresses of the L1 data cache memory as explained later in some examples, like for example a just in time compiler that generates and stores machine code instructions in a L1 data cache that will be transferred to be executed in a L1 instruction cache.

In one implementation, the security component starts verifying the hash data 581 of the data 582 while transferring the data block 570 from main memory to the cache line 580. For example, if the cache line has 128 bytes, of which 108 bytes are instructions and 20 bytes are a hash data, and the processor has 64 bits, data block 570 are passed to the processor cache memory in blocks of 64 bits or 8 bytes, thus needing 16 transfers to move data to the cache line. In some implementations the security component can start verifying the hash data 581 while running these 16 transfers.

In one implementation, the crypto module starts verifying the hash data without having all the data blocks 570 stored in the cache line 580, for example by starting the verification of the hash data using the first bytes of data that are being transferred to the cache line 580.

In one implementation, the MMU transfers the data block 570 from main memory to the cache line 580 transferring the words in the order that the security component needs to verify the hash data, thereby accelerating the verification of the hash data 581 of the cache line 580 and the processor can execute the instructions stored in part 582 of cache line 580 more quickly.

In one implementation, if a hash data verified by the security component is not correct, then the security component does not transfer the data block 570 stored in the main memory to the cache line 580. In one implementation, the processor may generate an interrupt, such as a hardware interrupt or software interrupt, for example to inform the operating system that instructions 572 do not have a correct hash data.

In some implementations the security component 550 may use symmetric cryptography algorithms where one cryptographic algorithm uses a secret key to generate a first hash data of a first data and the crypto module has access to the secret key, for example stored in the memory KEYS 552, and the security component executes the same algorithm to calculate the hash data of the same data and compares the generated hash data with the first hash data to verify the authenticity of the first hash data. In some implementations the crypto module 551 implements one or more of these functions.

In some implementations, the crypto module may use asymetric cryptography algorithms, where a pair of keys called public key and private key are used as follows: a first cryptographic algorithm may be used to generate the public key and private key pair, a second cryptographic algorithm uses the private key to generate a digital signature (that we will also call "hash data") of the data to sign and a third cryptographic algorithm may use the public key to verify that the digital signature is correct and has been generated using the private key. For example the second algorithm using the private key may be used to generate the hash data 571 and the crypto module may execute the third algorithm using the public key to verify the hash data 571 (or to verify the same hash data stored in the hash data 581 if the crypto module 551 reads the instructions 582 and the hash data 581 from the cache line 580).

Storing cryptography private keys or symmetric keys inside an integrated circuit may be a risk. For example there are some technologies that allow the reading of data in a hard disk drive after it has been deleted and overwritten many times. The number of times that a data should be overwritten in a hard disk in order to delete it is typically unknown and may depend on how the technology used to read the data in the hard disk drives evolves. The same may happen with data stored inside integrated circuits.

For example, the new IRIS (Integrity and Reliability of Integrated Circuits) program being developed by DARPA (Defense Advanced Research Projects Agency) is a research project to determine the functionality of integrated circuits even without having the complete specifications of the integrated circuits.

In some implementations the crypto module doesn't store private keys and only stores public keys and it can execute the third algorithm to verify that a hash data is correct but it cannot execute the second algorithm to calculate or generate hash data.

In some implementations the crypto module may have access to both the public key and the private key.

In some implementations, instead of using a public key algorithm to generate a digital signature of the data, a one-way hash function is used to generate a one-way hash of the data and then the one-way hash data is encrypted using a private key, thereby generating a digital signature of the data and the public key may be used to verify the digital signature.

Although some implementations use cryptographic keys and cryptographic hash functions or digital signatures, in some implementations the crypto module may use hash functions that don't use cryptographic keys and/or cryptographic hash functions, for example using a hash function algorithm that is implemented in the security component and is kept secret and only computers having access to this secret hash algorithm may compute and/or verity the hash data of the data blocks.

In some implementations, the security component 550 uses hardware to perform different functions, such as, for example: reading information stored in L1 cache memories (like, for example the information of a data block stored in a cache line of a L1 cache memory), reading information stored in other memories (such as, for example, an L2 cache memory and/or an L3 cache memory), reading information stored in the KEYS memory 552, reading information from a buffer, writing information in a cache memory, executing cryptographic algorithms and computed or calculating the value of the hash data. In some implementations the security component 550 performs these, or other functions, using logic gates that implement Boolean functions such as for example, NAND, OR, XOR, NOR or any other type of logic gates. In some implementations when a crypto module 551 forms a part of the security component 550, the crypto module 551 performs one or more of these functions.

In one implementation the security component 550 comprises a FPGA (Field Programmable Gate Array) that may be configured, reconfigured or programmed to execute one or more of the aforementioned functions.

In one implementation, the crypto module 551 and other elements of the security component 550 may be programmed or implemented using a hardware definition language (HDL) such as "Verilog HDL", VHDL ("VHSIC Hardware Description Language" or "Very High Speed Integrated Circuit Hardware Description Language"), SystemVerilog, and others.

In one implementation, the crypto module may use parallel computations that take as input data part or all of the 864 bits (108 bytes) of data 582, for example using logic gates which act in parallel on a part or all of the 864 bits of data 582. In one implementation, the security component 550 may also use bits of a cryptographic key as input of the calculations in parallel.

In some implementations, the processor 500 that comprises the security component 550 may be an ASIC (Application Specific Integrated Circuit) a SOC (System On a Chip) and/or an NoC (Network on a Chip)

In one implementation, the cryptographic keys and cryptographic algorithms may be custom implemented for use in a given electronic device, such as an electronic device custom designed for a given entity.

In the example of FIG. 5 the L1 cache memories are shown as part of CORE 510 and the L2 cache is shown as part of the processor 500, but other configurations are also possible. For example, L1 cache memories may be within the microprocessor 500 but outside the CORE 510. In another example both cache memories L1 and L2 may be outside the microprocessor 500. In some implementations there may be a single cache memory L1, for example used to store both data and instructions.

The example of FIG. 5 also shows a component MMU 560 (Memory Management Unit) outside the processor 500 that communicates with the processor 500 and the main memory 590.

In one implementation, in a system that uses virtual memory, the MMU stores in the main memory 590 one or more pages of data and program instructions and stores in the storage device 565 the rest of the program data that are not currently needed in the main memory. In this way, by storing in the main memory 590 only the portions of the program required at a given time or time period, the system can execute a set of programs that take up much more space than is available in main memory.

In one implementation, the MMU is the device responsible for transferring the pages stored in the storage device 565 to the main memory and conversely. The MMU may have a page table 561 in which it stores information from the pages that are in main memory at any given time.

In one implementation, the MMU may be used to convert virtual memory addresses to physical memory addresses in systems using virtual memory.

In some implementations, the MMU may be included within the processor 500.

When the processor 500 wants to read or write a particular memory address in the main memory 590, processor 500 typically begins trying to read the data associated with the memory address in the nearest cache, such as the data cache L1 or the instruction cache L1, to determine if said memory address is stored in the L1 cache. If this occurs it is called "cache hit" and the processor 500 reads or writes the data of that memory address in the L1 cache.

When the data from that memory address that the processor 500 wants to read or to write is not in the L1 cache, this event is called "cache miss". Then the processor tries to access the next cache level, such as the L2 cache, to check if the L2 cache has the data stored. If data is not in the L2 cache then the processor will access the next cache memory level, such as an L3 or L4 (not shown in FIG. 5) if they are used in the computing device comprising the processor 500.

If the data of the memory address are not found in any of the cache memories, then the data are obtained from main memory 590. There are different algorithms for managing cache memories in order to maximize the cache hit and minimize the cache miss and to maintain data consistency between the various cache memories, for example algorithms to maintain cache consistency in processor with multiple core, like the MESI protocol (Modified, Exclusive, Shared and Invalid) and the MOESI protocol (Modified, Owned, Exclusive, Shared and Invalid).

It may also be the case that the memory address that the processor 500 wants to access is not stored in main memory 590, for example in systems using virtual memory. When this happens it is called a "page fault" and the data that the processor wants to read or write is transferred first to the main memory, for example from a storage device unit 565 such as a hard drive or SSD (Solid State Drive).

In one implementation, by default all the data that the processor reads or writes are written previously in a cache memory, for example in the L1 cache memories.

In computer architecture, instruction prefetch is a technique used in microprocessors to speed up the execution of a program by reducing wait states.

Prefetching occurs when a processor requests a data from main memory before it is actually needed. Once the data comes from memory, it is placed in a cache memory. When the data is actually needed, the data may be accessed much more quicklier from the cache memory than if it had to be requested from main memory.

Since programs are generally executed sequentially, performance is likely to be best when instructions are prefetched in program order. Alternatively, the prefetch may be part of a complex branch prediction algorithm, where the processor tries to anticipate the result of a calculation and fetch the right instructions in advance.

In one implementation, the security component verifies the hash data of the data blocks transmitted to the cache memory during the prefetching. In other implementation, the security component verifies the hash data to the data blocks after the prefetching.

Some processors allow the execution of instructions that can disable or stop the use of cache memory. In one implementation, the processor 500 may be manufactured or configured to always use the cache memory and does not allow disabling it.

In one implementation, the security component can detect that a program has some instructions to disable the cache memory use, and the security component does not allow the execution of these instructions, for example by preventing the instructions to be copied in the L1 instruction cache.

In one implementation, the security component may detect that a data block being transferred to the L1 instruction cache comprises instructions to disable the cache and the security component does not allow the data block to be stored in the cache line. This way, the execution of the instructions disabling the cache is not allowed.

In one implementation, the security component does not allow any program to execute an instruction disabling the use of the L1 instruction cache and/or the L1 data cache. For example, in one implementation, the security component communicates with core 510 to instruct core 510 to allow or not to allow the execution of instructions disabling the cache memory.

In one implementation, the security component stores the memory addresses for which the core 510 can disable the cache memory use, for example memory addresses corresponding to input and output devices.

In one implementation, the processor may use different memory addresses for the main memory and for input and output devices, and core 510 may be configured to use the L1 data cache and L1 instruction cache only with the main memory addresses and not with input and/or output device.

In the example of FIG. 5, the security component 550 is shown inside the processor, but other configurations are possible.

In one implementation, the security component 550 may be located outside the processor. In other implementations the security component 550 may be in a cache memory located outside the processor or may be included, for example, inside an external memory controller to the processor, for example inside the MMU (Memory Management Unit) 560.

In one implementation, the security component 550 may be inside the main memory 590. In one implementation, the security component 550 may be divided, for example, in two modules, so that a first module may be located inside the processor and a second module may be located outside the processor.

Figure 6A:
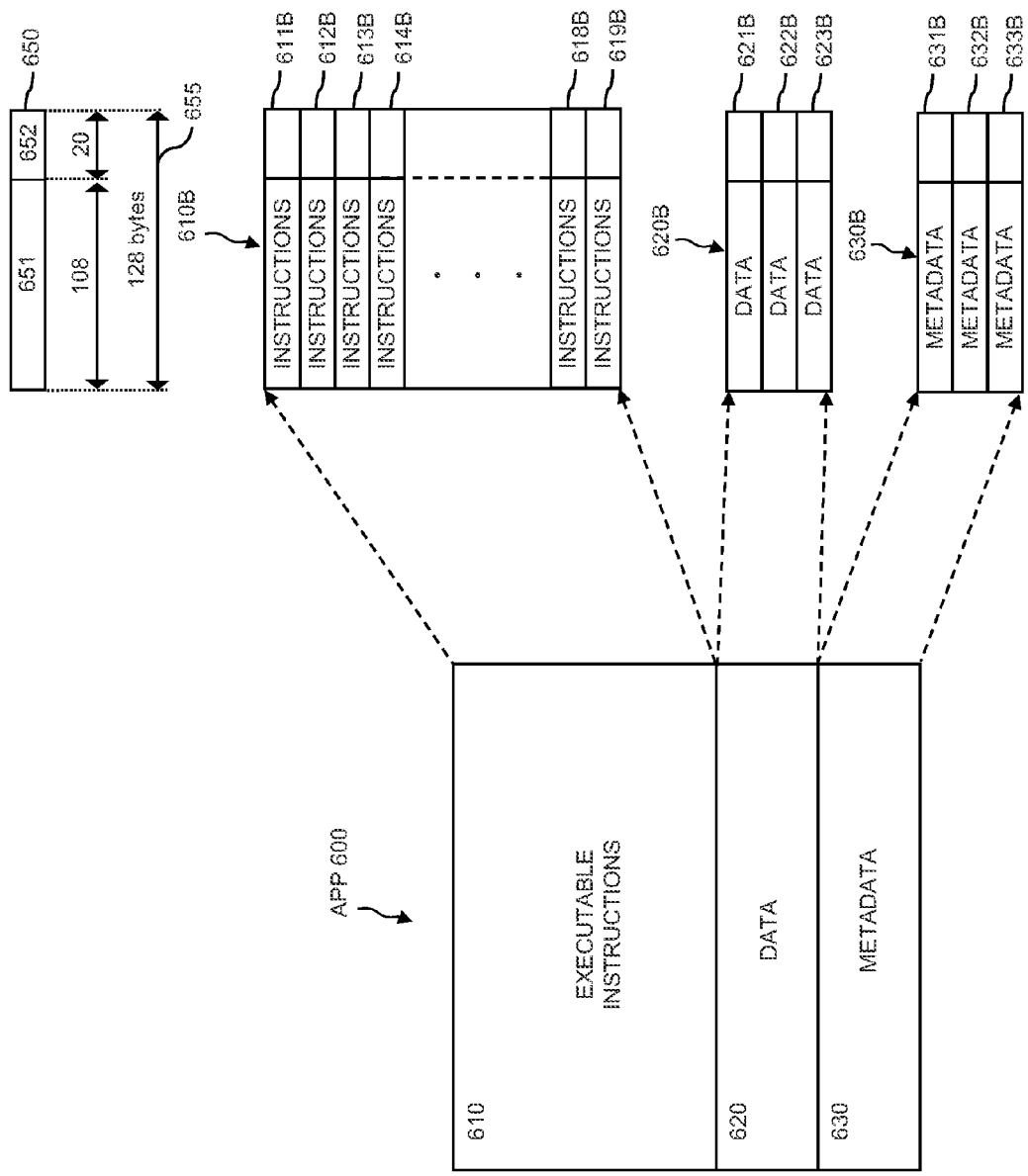
FIGS. 6A and 6B show a structure of a computer software program.

FIG. 6A shows an example of a computer software program APP 600 comprising different parts 610, 620 and 630. In one implementation, the computer program APP 600 comprises executable instructions 610, DATA 620 and METADATA 630. METADATA 630 may contain information about the computer program APP 600, such as the computer program name, version, date it was created, cryptography information and other data.

The format of a computer software program and their parts may vary depending on the operating system, the computing device where the program is to be executed, the developer tools used to develop the program and/or the manufacturer or developer who has created the software. The program APP 600 of FIG. 6A shows three parts 610, 620 and 630 although other configurations and/or formats are possible.

The example of FIG. 6A shows the internal format of the parts 610, 620 and 630 that form the program APP 600 through elements 610B, 620B and 630B, respectively.

Figure 6B:
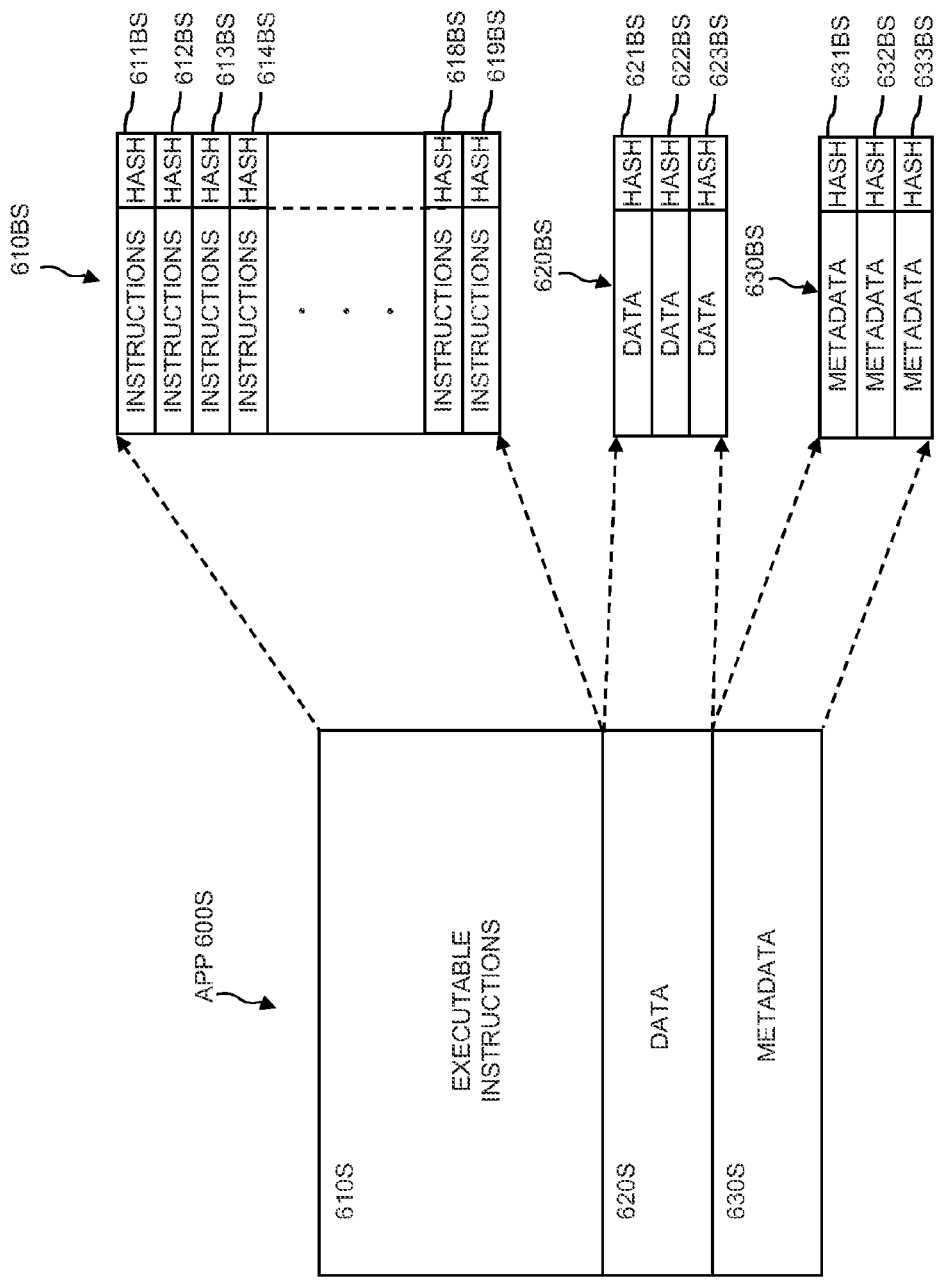

FIG. 6A shows the software program APP 600 before the hash data of each data block have been added, while FIG. 6B shows the software program APP 600S that includes the hash data in parts 610BS, 620BS and 630BS.

In FIG. 6A, element 610B shows an example of the executable instructions 610 of the program APP 600 organized into data blocks of 128 bytes comprising 108 bytes of executable instructions and a field of 20 bytes that may store the hash data in each of the data blocks.

The example in FIG. 6A shows the initial 4 data blocks 611B, 612B, 613B and 614B, and the last two data blocks 618B and 619B to simplify the figure, since the executable instructions 610 may have a length of several MB or GB organized into thousands or millions of data blocks of 128 bytes.

In one implementation, the program data 620 and metadata 630 may also be configured in data blocks like the data block 650, and they may store hash data in each data block.

In the example of FIG. 6A, element 620B shows an example of the data 620 of the computer program APP 600 configured in data blocks of 128 bytes. The element 630B shows an example of metadata 630 of the computer program APP 600 configured in data blocks of 128 bytes.

In the example in FIG. 6A the data 620B is shown comprising three data blocks 621B, 622B and 623b but different implementations may use a different number of data blocks. FIG. 6A also shows the metadata 630B example comprising three data blocks 631B, 632B and 633B, although other implementations may use a different number of data blocks.

In the example of FIG. 6A, the computer program APP 600 may comprise executable instructions 610, however, another type of instructions are possible, such as, for example, interpreted type instructions or bytecode type instructions, as explained later.

In the example of FIG. 6A, the element 650 represent a data block with a size of 128 bytes, as indicated by arrow 655, and comprises a first portion of data 651 of 108 bytes and a second portion of data 652 of 20 bytes. The data portion 651 may store executable instructions, data or metadata and the data portion 652 may store a hash data.

As explained before, we use term "data block" to refer to blocks of data like the data block 650. Data blocks may store instructions, data or metadata.

Some implementation may use different data blocks with different data portions and different sizes, like for example the data blocks shown in FIGS. 21A, 21B, 27A and 27B.

The data block 650 of FIG. 6A may be used for example in computers with a cache line size of 128 bytes, for example computing devices having a L1 instruction cache memory with a cache line of 128 bytes. The cache lines of 128 bytes are common in 64-bit processors.

In the example of FIGS. 6A and 6B, the parts of the computer program APP 600 and computer program APP 600S which contain the executable instructions, data and metadata, may be configured as data blocks of 128 bytes, similar to the data block 650, having 108 bytes of instructions, data or metadata and 20 bytes of hash data.

In some implementations, only the part 610 comprising the executable instructions of the computer program APP 600 is configured in data blocks of 128 bytes like the data block 650. In still another implementation, not all the instructions in the part 610 of the computer program APP 600 is configured in data blocks but at least a part of the instructions of the part 610 of the program APP 600 are configured in data blocks.

In some implementations, programs may comprise first executable instructions, first data and/or first metadata configured in data blocks comprising hash data and also second executable instructions, second data and/or second metadata that are not configured in data blocks. For example, the second executable instructions may be executed in a core that doesn't have a security component in a processor that has multiple cores, with at least a first core having a security component and at least a second core not having a security component.

The executable instructions 610 or 610S of the computer programs APP 600 and APP 600S, respectively, may not occupy a space that is a multiple of 108 bytes (in this example, 108 bytes is the size of the cache line minus the size of the hash data), so the last data block of executable instructions may comprise instructions, padding data and the hash data.

In one implementation, a programmer or developer of the APP 600 may use a computing device executing developer tools having access to a cryptographic key used to generate the hash data for the data blocks of the computer program APP 600S.

In one implementation the developer tools executing in the computing device, like for example a compiler, may calculate and store the hash data of each data block, generating the computer program APP 600S that comprises a hash data in each data block.

In one implementation, the programmer may use a computing device with developer tools, like for example a compiler, but the computing device may not have access to the cryptographic key to generate the hash data for the data blocks of the computer program APP 600S, and the portion of the data blocks to store the hash data may be initially empty (for example storing the value 0 in each byte) in the program APP 600 and the program APP 600 without hash data may be stored in the computing device by the developer tools, for example stored in a disk drive of the computing device.

In one implementation the computer program APP 600 without hash data may be transmitted from a first computing device to a second computing device, for example using a data network like the Internet, and the second computing device may have access to a cryptographic key to calculate the hash data and may execute a computer program that reads the computer program APP 600 and generates and stores the computer program APP 600S comprising the hash data in each data block. The second computing device may also transmit the computer program APP 600S to other computing devices in a data network like for example the Internet.

When the hash data of each data block is added to the computer program APP 600 the computer program APP 600S is generated. FIG. 6B, shows the computer program APP 600S comprising parts 610BS, 620BS and 630BS.

In the example of FIG. 6B, the elements 610BS, 620BS and 630BS show the data blocks of different parts of the computer program APP 600S, for example executable instructions 610S, data 620S and metadata 630S, respectively.

Element 610BS from the example of FIG. 6B shows the initial 4 data blocks 611BS, 612BS, 613BS and 614BS, as well as the last two data blocks 618BS and 619BS to simplify the figure.

The example in FIG. 6B shows data 620BS comprising three data blocks 621BS, 622BS and 623BS, although different implementations may use a different number of data blocks.

FIG. 6B also shows the metadata 630BS comprising three blocks of data 631BS, 632BS and 633BS although other implementations may use a different number of metadata blocks.

In the example of FIG. 6B the data blocks corresponding to executable instructions 610S, data 620S and metadata 630S include the corresponding hash data for each data block.

Figure 7:
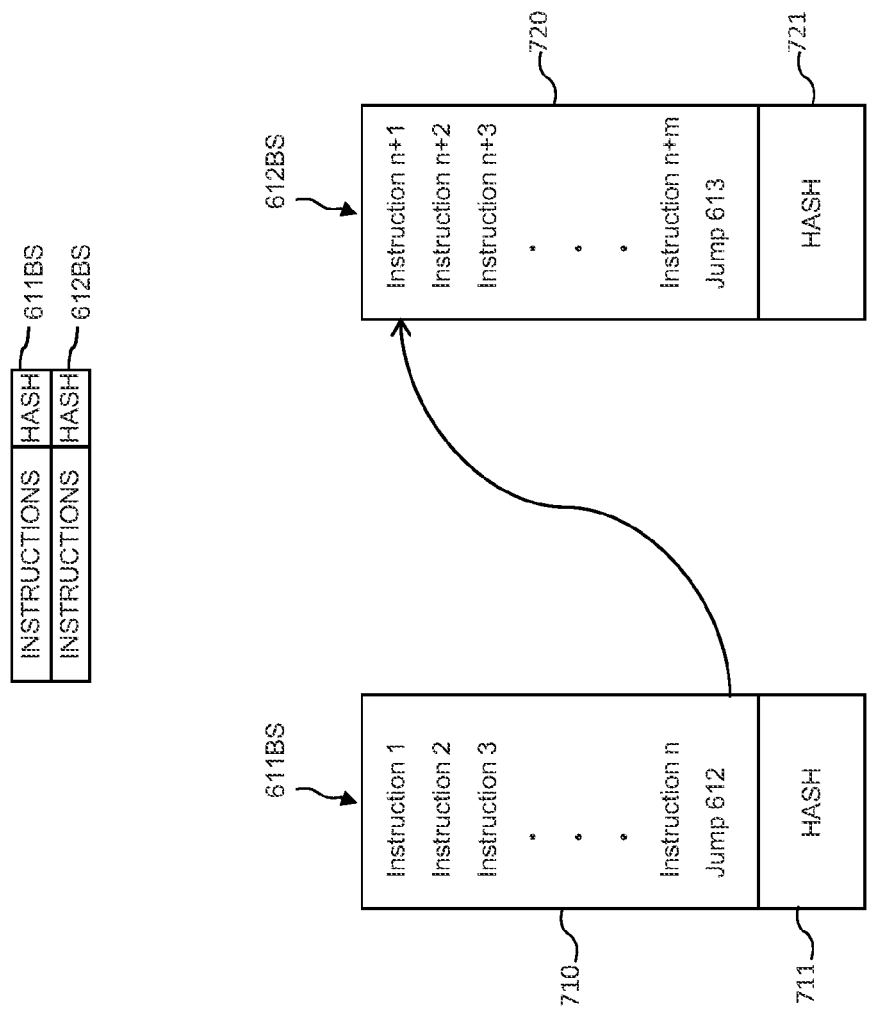
FIG. 7 shows an example of how program instructions may be executed.

FIG. 7 shows an example with two data blocks 611BS and 612BS, each one containing instructions and a hash data.

In some implementations, the executable instructions of a computer program may be distributed in memory blocks that are not continuous, since each data block includes a hash data that can interrupt the software program instructions.

Elements 710 and 711 of FIG. 7 show the data block 611BS comprising a group of executable instructions 710 ranging from instruction 1 to the instruction Jump 612, occupying the 108 bytes of data block 611BS and hash data 711.

After instruction n there is a jump instruction (Jump 612) to the next instruction, instruction n+1 in the next data block 612BS shown in the figure in detail by the elements 720 and 721.

In some implementations, the executable instructions of a computer program may be distributed in data blocks, for example using a jump instruction. Other instructions may be used to distribute executable instructions in data blocks, for example a "call" instruction in one data block that jumps into the instructions of another data block until the processor executes a "return" instruction.

Below is an explanation of hash functions and some type of hash functions called "lightweight hash functions" that may be used in some implementations.

There are many different digital signatures like for example RSA, DSA (Digital Signature Algorithm) and its elliptic curve variant ECDSA, and others.

In one implementation, the security component may use the HMAC protocol (Hash-based Message Authentication Code). HMAC is a protocol designed to calculate the "message authentication code" (MAC) using a cryptographic hash function in combination with a secret key.

Different implementations may use different hash functions such as MD5 or SHA-1 with the HMAC protocol. The result is called algorithm HMAC-MD5 or HMAC-SHA-1 respectively.

The HMAC protocol is described in specification RFC 2104, "HMAC: Keyed Hashing for Message Authentication," H. Krawczyk et. Al, February 1997, published by IETF and available online.

The MD5 Message Digest Algorithm is a widely used cryptographic hash function that produces a 128-bit (16-bytes) hash value.

RFC 6151 specifications, "Update security considerations for the MD5 Message-Digest and the HMAC-MD5 Algorithm", S. Turner et. Al., March 2011, published by IETF and available online, update various security aspects of RFC 2104.

SHA-1 is a cryptographic hash function designed by the National Security Agency and published by the NIST as a U.S. Federal Information Processing Standard. SHA stand for Secure Hash Algorithm. The three SHA algorithms are structured differently and are distinguished as SHA-0, SHA-1 and SHA-2. SHA-1 is similar to SHA-0, but corrects an error in the original SHA hash specification that led to significant weakness. The SHA-0 algorithm was not adapted by many applications. SHA-2 on the other hand significantly differs from the SHA-1 hash function.

SHA-1 is the most widely used of the existing SHA hash functions, and is employed in several widely-used security applications and protocols. In 2005, security flaws were identified in SHA-1, namely that a mathematical weakness might exist, indicating that a stronger hash function would be desirable. Although no successful attacks have yet been reported on the SHA-2 variants, they are algorithmically similar to SHA-1 and also efforts are underway to develop improved alternatives.

SHA-1 produces a 160-bit (20-bytes) hash value on principles similar to those used by Ronald L. Rivest of MIT in the design of the MD4 and MD5 message digest algorithms, but has a more conservative design.

Other version of SHA algorithm generates different hash values, for example SHA256 and SHA512 generate hash values of 256 bits and 512 bits respectively.

A new hash standard, SHA-3, is currently under development. An ongoing NIST hash function competition is scheduled to end with the selection of winning function in 2012.

In some implementations, the security component may use hash functions called "Lightweight Hash" that may be implemented with a reduced number of logic gates. So far, the lightweight hash-type functions have been designed or implemented to the RFID protocol.

The ongoing "SHA-3" Hash Competition organized by NIST has received many different submissions with most of them need more than 10.000 GE (gate equivalents).

The article "QUARK: A Lightweight Hash", Jean-Philippe Aumasson et al., of the book "Cryptographic Hardware and Embedded Systems-CHES 2010", August 2010, published by Springer, describes a new hash function of lightweight hash type and mentions different hash functions and the number of gates equivalents used by each implementation.

The following table shows different hash functions, the number of gates equivalents and the number of bits of the hash value.

| Name | Gate Equivalents (GE) | Bits Hash Value |
| --- | --- | --- |
| CubeHash (2) | 7630 GE in 0.13 μm ASIC | 512 |
| MD5 (3) | 8001 GE in 0.35 μm ASIC | 128 |
| SHA-1 (4) | 6122 GE in 0.18 μm ASIC | 160 |
| MAME (5) | 8100 GE in 0.18 μm ASIC | 256 |
| PRESENT (6) | 1600 GE in 0.18 μm ASIC | 64 |
| QUARK (*) | 2300 GE | 112 |
| U-QUARK (*) | 1379 GE | 64 |
| QUARK (*) | 4500 GE (expected) | 256 |

(2) Bernstein, D. J.: Cubehash specification (2.B.1). Submission to NIST, Round 2 (2009), http://cubehash.cr.yp.to/submission2/spec.pdf (3) Feldhofer, M., Wolkerstorfer, J.: Strong crypto for RFID tags—a comparison of low power hardware implementations. In: ISCAS, pp. 1839-1842. IEE, Los Alamitos (2007).

(4) O'Neil, M.: Low cost SHA-1 hash function architecture for RFID tags. In: Workshop on RFID Security RFIDsec (2008).

(5) Yoshida, H. et. Al., "MAME: A compression function with reduced hardware requirements. In ECRYPT Hash Workshop (2007)

(6) Bogdanov et. Al., "Hash functions and RFID tags: Mind the gap". In CHES 2008. LNCS, vol. 5154, pp 283-299. Springer, Heilderberg (2008).

Bogdanov et. Al., "PRESENT: An ultra-lightweight block cripher". In CHES 2007. LNCS, col. 4727, pp 450-466, Springer, Heidelberg (2007).

The MD5 Message-Digest Algorithm is a widely used cryptographic hash function that produces a 128-bit (16-byte) hash value. MD5 has been employed in a wide variety of security applications, and is also commonly used to check data integrity. However, it has been shown that MD5 is not collision resistant; as such, MD5 is not suitable for applications like SSL certificates or digital signatures that rely on this property. An MD5 hash is typically expressed as a 32-digit hexadecimal number.

MD5 is one in a series of message digest algorithms designed by Professor Ronald Rivest of MIT (Rivest, 1994). MD5 is described in specifications RFC 1321, "The MD5 Message-Digest Algorithm", R. Rivest et al, April 1992, published by IETF and available online at <http://tools.ietf.org/html/rfc1321>.

SHA-1 is described in specifications RFC 3174, "US Secure Hash Algorithm 1 (SHA1)", P. Jones et al, September 2001, published by IETF and available online at <http://tools.ietf.org/html/rfc3174>.

In cryptography, RSA (which stands for Rivest, Shamir and Adleman who first publicly described it) is an algorithm for public-key cryptography. It was the first algorithm known to be suitable for signing as well as encryption, and was one of the first great advances in public key cryptography. RSA is widely used in electronic commerce protocols, and is believed to be sufficiently secure given sufficiently long keys and the use of up-to-date implementations.

The Digital Signature Algorithm (DSA) is a United States Federal Government standard or FIPS for digital signatures. It was proposed by the National Institute of Standards and Technology (NIST) in August 1991 for use in their Digital Signature Standard (DSS), specified in FIPS 186, adopted in 1993. A minor revision was issued in 1996 as FIPS 186-1. The standard was expanded further in 2000 as FIPS 186-2 and again in 2009 as FIPS 186-3.

The Elliptic Curve Digital Signature Algorithm (ECDSA) is a variant of the Digital Signature Algorithm (DSA) which uses Elliptic curve cryptography.

Figure 8:
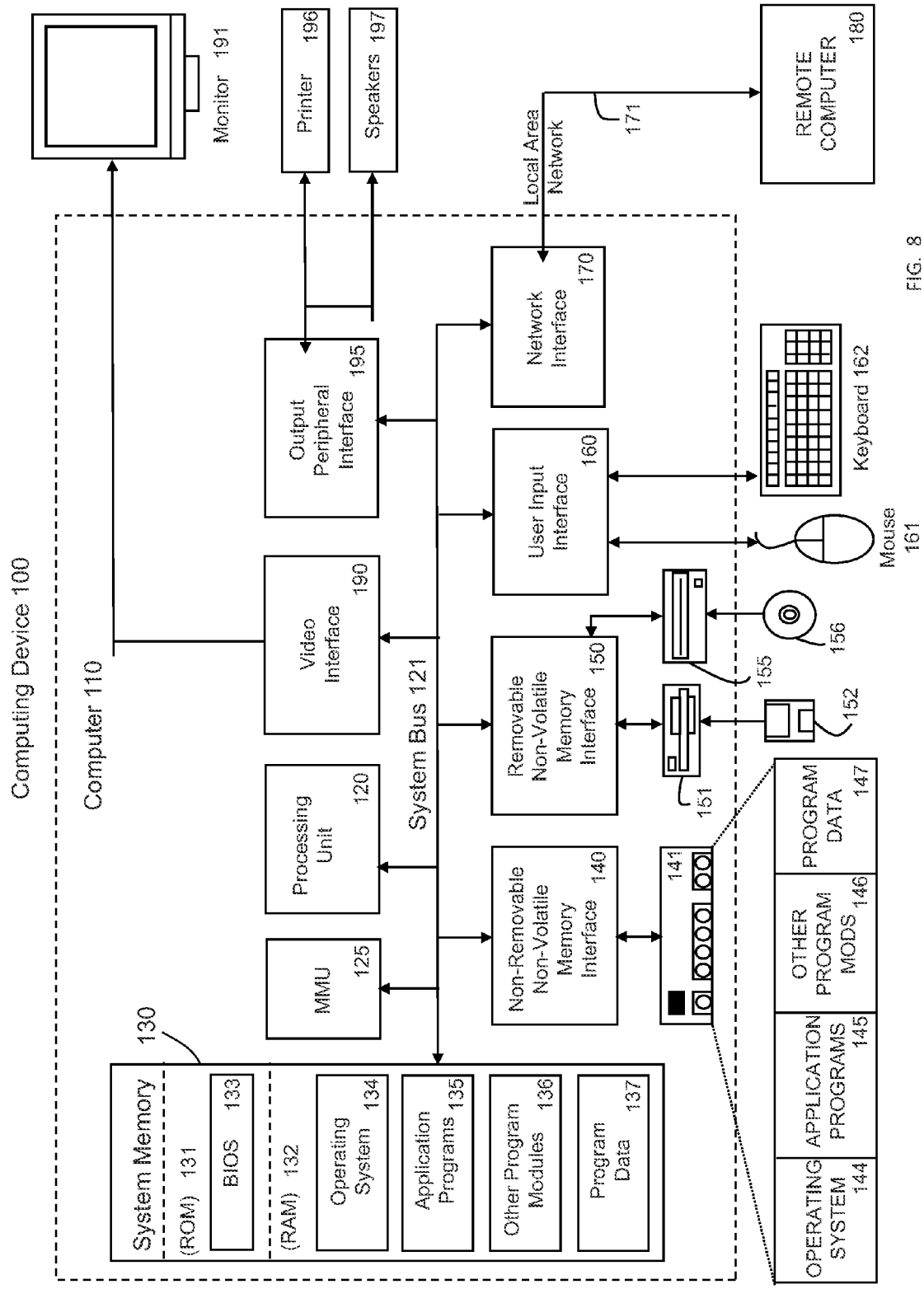
FIG. 8 shows an example of computer system/computing environment.

FIG. 8 shows a diagram of an exemplary computing device 100 in the form of a computer 110 that may be used in some implementations The computer 110 is just one example of a computing device 100 and does not suggest or imply any limitation on the scope of use or functionality of the different implementations. Similarly, the computer 110 should not be interpreted depending upon or based on the requirements of any combination of components illustrated in the example in FIG. 8. Other ways of implementing a computer device 100 or computer 110 may also be appropriate for different implementations.

Different implementations are functional with many other configurations or computing devices with a general or special purpose. Examples of configurations or known computing devices which may be appropriate for using the different implementations include, without limitation, personal computers, portable computers or devices, multiprocessor systems, microprocessor-based systems, set-top-boxes, televisions, programmable consumer devices, network computers, minicomputers, mainframes, distributed computing systems that include any of the previously mentioned systems or devices or the like.

In the example in FIG. 8, a general purpose computing device in the form of computer 110 is depicted. Components of computer 110 may include, without limitation, a processing unit 120, a system memory 130, a system bus 121 that connects various system components including the system memory to the processing unit 120. The system bus 121 may be any type of bus structure including a memory bus or memory controller, a peripheral bus, and/or a local bus using a variety of bus architectures. By way of example and without limitation, such architectures include Industry Standard Architecture (ISA), Micro Channel.

The processing unit 120 may include one or more cores and cache memories, like for example the configurations explained in FIG. 1 to FIG. 4. Some processing unit cache memories may be located inside the processing unit chip and other cache memories may be located outside the processing unit chip (not shown in FIG. 8).

Architecture (MCA), Enhanced ISA (EISA), Video Electronics Standards Association (VESA) and Peripheral Component Interconnect (PCI) (also known as Mezzanine bus).

The computer 110 typically includes a variety of computer readable media. Computer readable media can be any available media that can be accessed by computer 110 and includes volatile and non-volatile, and removable and non-removable media. By way of example and without limitation, computer readable media may include computer storage media and communications media. Computer storage media include volatile and non-volatile, and removable and non-removable media, implemented with any method or technology for information storage such as readable computer instructions, data structures, program modules or other data.

Computer storage media include, without limitation, RAM, ROM, EEPROM, flash memory or other memories, CDROM, DVD (Digital Versatile Disks) or other storage means on optical disks, magnetic cassettes, magnetic tapes, magnetic disk storage media or other magnetic storage devices, or any other medium which can be used to store the desired information and which can be accessed by computer 110.

The communications media typically include computer readable instructions, data structures, program modules or other data in a modulated data signal such as a carrier wave or other transport mechanism and includes any means of distributing information. The term "modulated data signal" means a signal that has established or changed one or more of its characteristics so that it encodes information in the signal. By way of example and without limitation, communications media include wired media such as a wired data network or a direct cable connection, and wireless media such as acoustic, RF, infrared and other wireless media. Similarly, any combination of the elements previously mentioned may be included within the scope of the computer readable media definition.

The system memory 130 includes computer storage media in the form of volatile memory and/or non-volatile memory such as read-only memory (ROM) 131 and random access memory (RAM) 132. A basic input/output system 133 (BIOS), containing the basic routines that help transfer information between elements included in the computer 110, for example at start-up, it is typically stored in ROM 131. RAM 132 typically contains data and/or program modules that are immediately accessible and/or being used by the central processing unit 120. By way of example and without limitation, FIG. 8 shows an operating system 134, programs or applications 135, other program modules 136 and program data 137.

The computer 110 may also include other removable/non-removable, volatile/non-volatile storage media. By way of example, FIG. 8 illustrates a hard disk drive 141 that reads or writes to a non-removable and non-volatile magnetic media, a magnetic disk drive 151 that reads or writes to the removable and volatile magnetic disk 152, and an optical disk drive 155 that reads or writes to a removable and non-volatile optical disk 156, such as a CD ROM or other optical media.

Other removable/non-removable, volatile/non-volatile storage media which can be used in the system shown in FIG. 8 include, without limitation, magnetic tapes, flash memory cards, DVD (Digital Versatile Disks), digital Video tapes, solid state RAM, solid state ROM and the like. The hard disk drive 141 is typically connected to the system bus 121 through a non-removable memory interface such as interface 140, the magnetic disk drive 151 and optical disk drive 155 are typically connected to the bus system 121 via a removable memory interface such as interface 150.

The units and their associated storage computer media described above and illustrated in FIG. 8 provide storage for computer readable instructions, data structures, the program modules and other data for computer 110. FIG. 8, for example, shows the hard disk drive 141 storing operating system 144, programs or applications 145, other program modules 146 and program data 147. Note that these components can be the same as or different from the operating system 134, programs or applications 135, other program modules 136 and program data 137. The operating system 144, programs or applications 145, other program modules 146 and program data 147 are indicated with different numbers to illustrate that at least they are different copies. The applications or other computer program modules 136 may contain, among other things, computer instructions that when executed, cause the system to operate or perform functions.

A user can enter commands and information into the computer through input devices such as keyboard 162 and pointing device 161, commonly referred to as a mouse, trackball or touch pad. Other input devices (not shown) may be a microphone, joystick, game pad, satellite dish, scanner, or similar devices. These and other input devices are often connected to a processing unit 120 through an input interface 160 that is connected to the system bus, but may be connected to other interfaces and bus structures, such as a parallel port, a game port or a USB (Universal Serial Bus). The monitor 191 or other display device is also connected to the system bus 121 via an interface, such as the video interface 190. In addition to the monitor, computers may also include other peripheral output devices such as speakers 197 and a printer 196, which may be connected through an output peripheral interface 195.

In some implementations, the computer 110 may be a tablet computer or a smartphone, like for example the Apple iPAD tablets or the Android-based tablet computers and smartphones.

The computer 110 may operate in a networked environment using logical connections to one or more remote computing devices 180. Remote computing devices 180 may be a personal computer, a server, a router, a network PC, a "peer" device or other common network nodes and typically include some or all of the elements described above relative to computer 110. Logics connections shown in FIG. 8 include a local area network (LAN) 171, but may also include other networks. Such networking environments are often used in offices, enterprise computer networks, intranets and the Internet.

The network interface 170 provides an interface to external networks, which may include multiple computer systems or devices and communication links as described above. These communication links may be wired links, optical links, wireless links or any other mechanism for information communication. In one implementation, network 171 supports the Ethernet protocol when the network interface is connected to a local area network environment (LAN). The network interface 170 may take different forms, including a network card that is installed inside the computer 110 or an embedded component or chip that is part of the computer 110, or may be part of another component, such as the motherboard or an expansion card. In one implementation described in more detail below, the network interface is implemented as part of the chipset of the computer 110.

FIG. 8 also shows a MMU 125 (Memory Management Unit) that may manage the access to memory 130 and other memories, like for example the hard disk drive 141. In some implementations the disk drive 141 may be a Solid State Disk (SSD).

In some implementations, the processing unit may comprise at least one core having a security component and at least one core not having a security component. Some implementations may have more than one processor, for example a first processor with core or cores having security components and a second processor with core or cores not having security components. Other combinations are possible.

Figure 9:
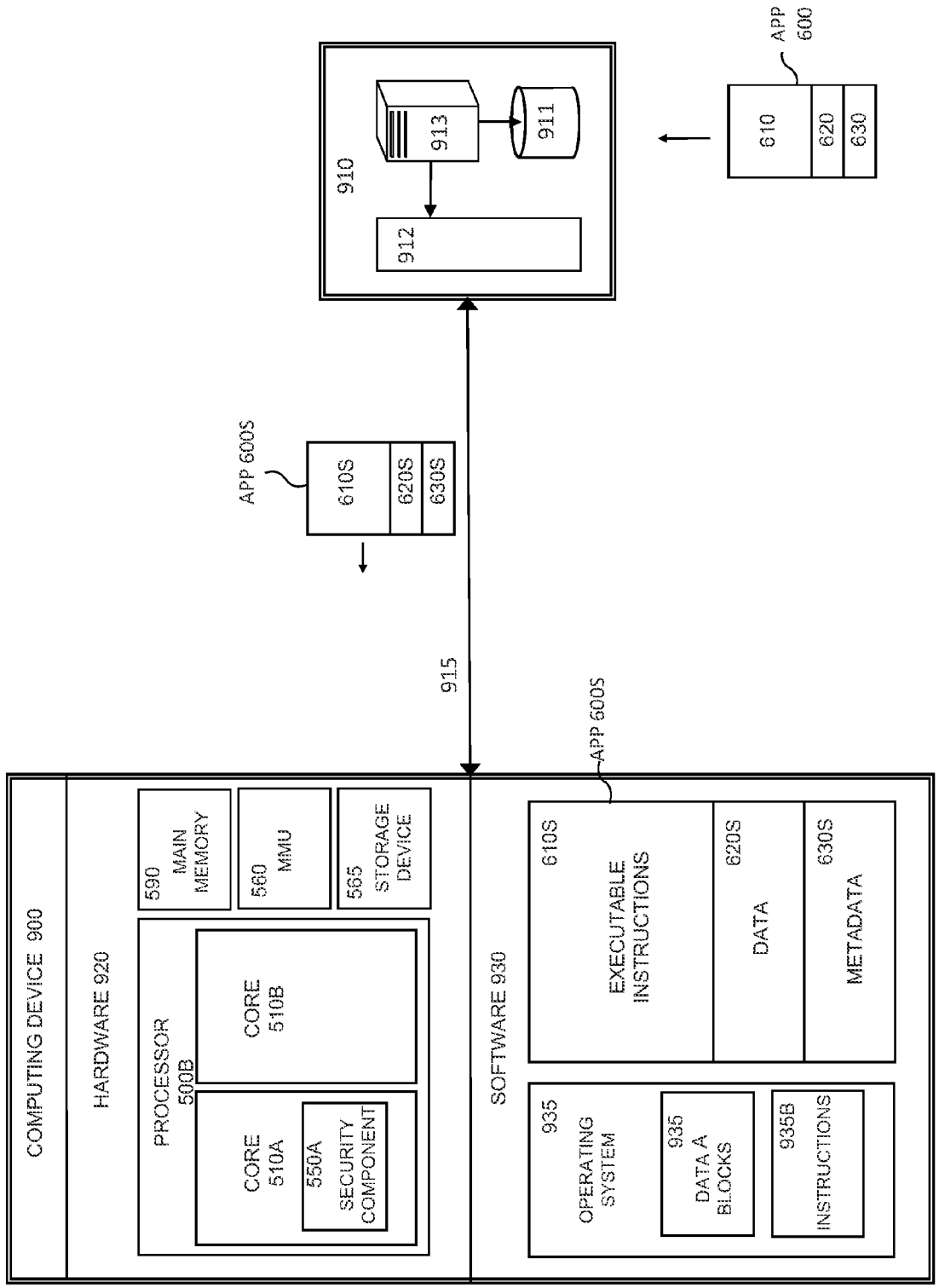
FIG. 9 shows a system according to one implementation.

FIG. 9 shows an example of a computing device 900 having one processor 500B that comprises a first CORE 510A having a security component 550A and a second CORE 510B not having a security component. Both cores may have one or more cache memories, for example an L1 instruction cache and a L1 data cache in each core (not shown in FIG. 9 for simplicity).

The hardware and the software of the computing device 900 are represented in a simplified form by elements 920 and 930, respectively. But hardware 920 and software 930 may include any other element of hardware and/or software like, for example, any element shown or described in previous figures, like for example in FIG. 8.

In one implementation, all applications and all executable instructions used in the computing device 900 are organized into data block similar to those shown in FIG. 6B.

In one implementation, the processor 500B does not execute any instruction stored in a cache line of a L1 instruction cache of the CORE 510A if the cache line does not comprises a correct hash data. This implementation may offer maximum security but also the difficulty of installing applications on the computing device 900 or using old applications that may have their instructions not organized in data blocks with hash data.

In one implementation, one or more cores may execute instructions stored in their L1 instruction cache whether they have a hash data or not. This may reduce the security but increases the flexibility of the computing device 900 to install and execute software, like for example old software.

For example, in FIG. 9 the processor 500 has a first core 510A having a security component 550A that may execute the instructions stored in data blocks having a hash data and has a second core 510B not having a security component that may execute instructions not stored in data blocks with hash data.

In one implementation, for example the operating system and applications with most critical functions, such as those related to security and communications, may comprise instructions organized in data blocks with hash data and may be executed in the CORE 510A, while other applications without using data blocks with hash data may be executed in CORE 510B.

In one implementation the operating system has a table indicating which computer program applications, process and/or threads use data blocks with hash data and which do not. In one implementation this table has also an associated one or more hash values, cryptographic hash values or digital signature to prevent it from being altered.

In some implementations, the operating system may store a table identifying the program applications, process and/or threads, for example process or threads that are being executed in a multi-core processor, that have their executable instructions stored in data blocks having hash data.

In one implementation the operating system chooses the core or cores in which each program application, each process and/or each thread is going to be executed, for example selecting the cores having a security component to execute the instructions stored in data blocks with hash data and selecting the cores not having a security component to execute the instructions not stored in data blocks having hash data.

In the example of FIG. 9, the hardware 920 comprises elements similar to the elements described in FIG. 5 like a security component 550A, a main memory 590, a MMU 560 and a storage device 565.

Software 930 being executed in the computing device 900 may comprise the operating system 935 and some computer software applications like computer program APP 600S, which for example may be transmitted to the computing device 900 from a system 910.

In the example of FIG. 9 the operating systems may comprise first computer programs or processes 935A having instructions stored in data blocks with hash data and second computer programs or processes 935B having instructions that are not stored in data blocks with hash data.

In one implementation, the operating system 935 may select the first core 510A that has a security component 550A to execute the instructions stored in data blocks having hash data, like for example the instructions of the part 935A of the operating system 935.

In one implementations, the operating system 935 may select the second core 510B that doesn't have a security component to execute the instructions not stored in data blocks having hash data, like for example the instructions of the part 935B of the operating system 935.

In some implementations, the operating system may have a program loader used to execute programs, process or thread and the program loader is capable of detecting if the instructions of a computer program, a process or a thread comprises data blocks having hash data and the program loader may select a different core to execute each computer program, process or thread depending on if they have their instructions organized in data blocks with hash data or not, for example selecting the CORE 510 to execute programs, process or threads having their instructions organized in data blocks with hash data and selecting the CORE 510B to execute programs, process or thread not having their instructions organized in data blocks with hash data.

In one implementation, a program application may have at least first part (for example first processes or thread or libraries) having instruction organized in data blocks with hash data and at least a second part having instructions not organized in data blocks with hash data and the processor 500B may execute each part of the instructions of the program in the CORE 510A or the CORE 510B depending on if they are organized in data blocks with hash data or not respectively. This may be useful, for example, in programs that use shared libraries or call functions of the operating system that may or may not have their instructions organized in data blocks with hash data.

In some implementations, the operating system may read information stored in the metadata of a computer program application to decide in which core or cores the different parts of the computer program may be executed.

In one implementation, the operating system is configured to execute certain program, process and/or threads of the operating system always in a core or cores having a security component, for example the parts of the operating system that are related with booting the computing device, security, cryptography, communications, memory management, the program loader, and other parts of the operating system.

In the example of FIG. 9, the software may comprise one or more applications, for example the computer program APP 600S which contains executable instructions 610S, data 620S and metadata 630S. The instructions 610S may comprise data blocks comprising instructions and hash data, and the computing device 900 may execute this instructions in the CORE 510A having a security component.

FIG. 9 also shows a system 910 comprising a server 913, a database 911 and an application 912. The system 910 may communicate with the computing device 900 via the communication 915, for example using a data network like the Internet.

Figure 10:
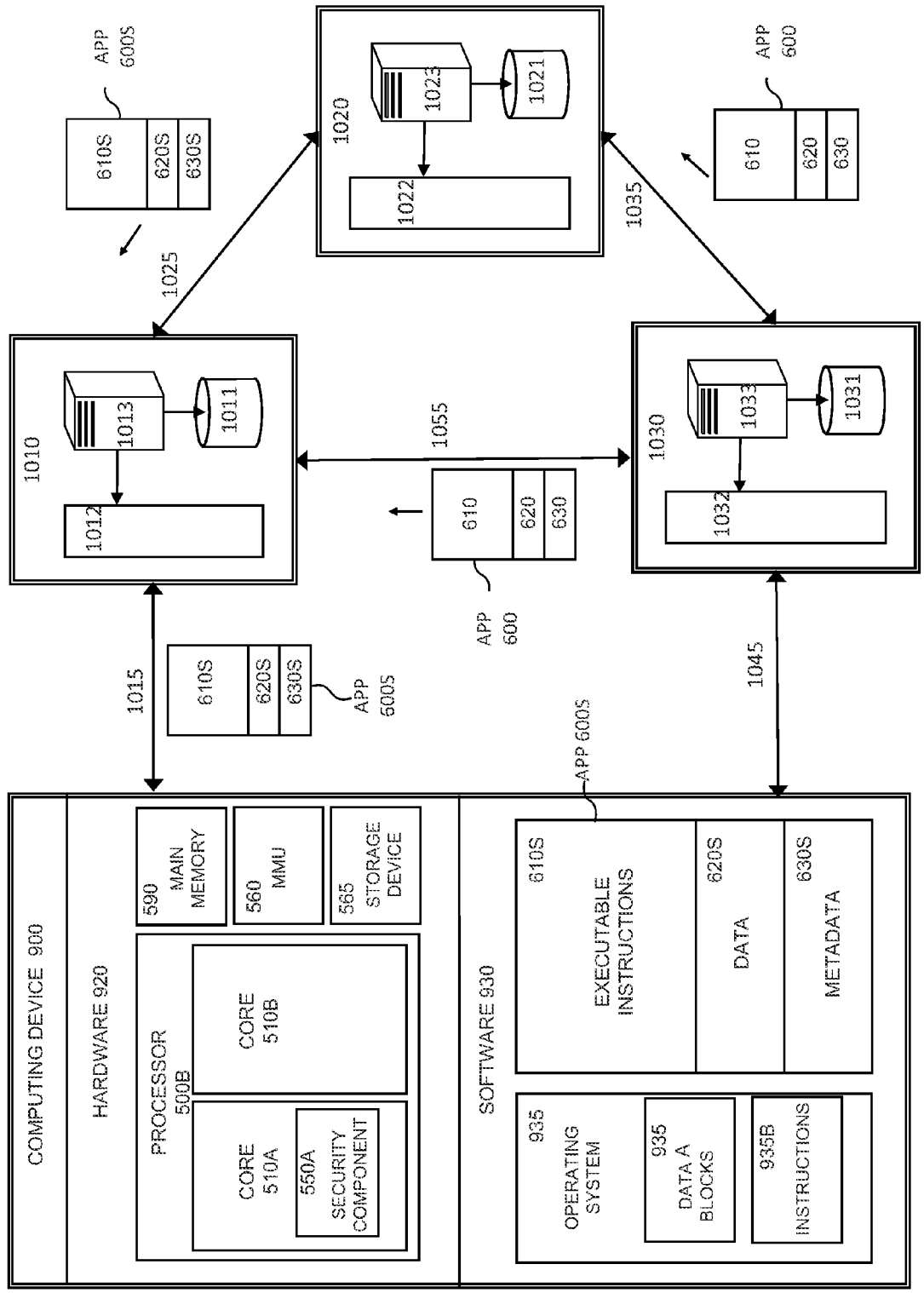
FIG. 10 shows a system according to one implementation.
Figure 13:
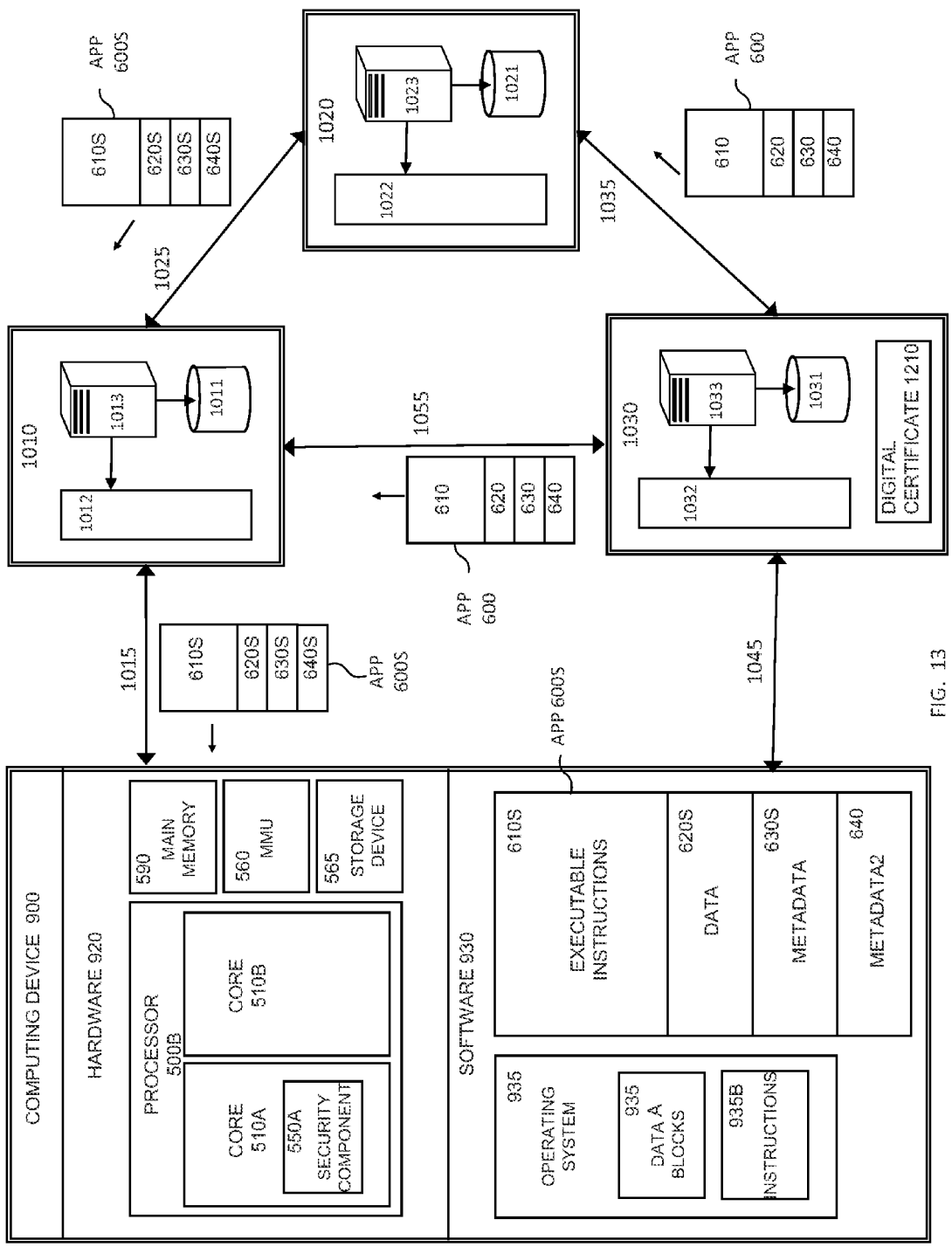
FIG. 13 shows an example of a computing device and system with a computer software application that uses a digital certificate.

The term "system" used in the explanation of implementations in FIGS. 9, 10 and 13, as well as other implementations, refers to a computing devices or group of computing devices and other electronic equipment such as routers, switches, firewalls, databases, etc. that may be connected to one or more data networks, for example data networks inside the system, or data network outside the system, and are able to exchange information and services with other systems and/or computing devices through data networks. When the external data network connecting the systems is the Internet, the systems may have associated one or more IP addresses, for example IPv4 or IPv6 addresses, and one or more URI (Uniform Resource Identifier) to identify resources and services of the systems or systems to other computing devices and/or other systems without needing to know the IP address of the internal resources and/or services in the system in numerical form.

Communications between a system and another device and/or system may use different protocols such as IPv4, IPv6 TCP/IP, UDP, RTP, RTSP, HTTP, HTML, HTML5, JavasScript, HTTPS, MOBILE IPv4, MOBILE IPv6, IPSEC, SNMP, SOAP, XML, IGMP, and others.

For example a system may be a single server or may be a data center with hundreds or thousands of servers, routers, firewalls, and other communication equipment and may be connected to the Internet. In another example a system may comprise more than one data centers.

In one implementation, the system 910 stores, for example in database 911, cryptographic keys associated to keys stored inside the processor 500B like, for example, cryptographic keys stored in the KEYS memory within the security component 550A.

In some implementations using symmetric cryptography, the system 910 may store a secret key and the same secret key may be stored inside the processor 500B, for example inside the security component 550A of CORE 510A.

In some implementations using asymmetric cryptographic, the system 910 may store a pair of cryptographic keys called PUBLIC KEY and PRIVATE KEY, and the processor 500B, for example the security component 550A inside the CORE 510, may store the PUBLIC KEY corresponding to each PRIVATE KEY.

If the processor 500B stores the PRIVATE KEY, for example in the KEYS memory inside the security component 550A, it may be a risk that the PRIVATE KEYS may be compromised or read from an attacker using laboratory equipment to read the data directly from the chip including the security component or the memory storing the keys, in a similar way that the data may be read using laboratory equipment from hard disk drives after deleting the data and overwriting it many times.

As explained before, recently the US DARPA (Defense Advanced Research Projects Agency) has started a new research program called IRIS (Integrity and Reliability of Integrated Circuits) with the objective of derive the functionality of an IC (Integrated Circuit) and looking for ways to reverse engineer a chip and find out everything it does, even when the complete design specs aren't available. As these technologies evolve it will be more risky to store secret keys inside integrated circuits.

In some implementations the processor may store, for example in the security component, the PRIVATE KEYS corresponding to PUBLIC KEYS.

In other implementations the processor does not store the PRIVATE KEY corresponding to a PUBLIC KEY avoiding the risk of the PRIVATE KEYS being compromised by extracting the information form the Integrated Circuit.

Other combinations are possible and the processor may store or not store the PRIVATE KEY corresponding to a PUBLIC KEY depending on the key pair.

In some implementations, the hash data may be verified by the security component using a secret key with a symmetric cryptographic algorithm and/or using a public key with an asymmetric cryptographic algorithm.

In one implementation, the database 911 may store multiple (e.g. thousands or millions) registers with cryptographic information, with each of the register storing information relate to a cryptographic key that may be associated with different users or entities.

In one implementation, one entity or user may be associated with multiple keys.

In one implementation, the secret keys, the public keys and/or the key pairs comprising a private key and a public key may be stored in the database 911 of system 910 in registers comprising some or all of the following data fields:
IDKEY
ID_symmetric_algorithm
ID_asymmetric_algorithm
SECRET_KEY (for symmetric cryptographic algorithm)
PRIVATE_KEY (for asymmetric cryptographic algorithm)
PUBLIC_KEY
ID_user
User_Name
User_Password
Where:
IDKEY may store a unique identifier that identifies the register storing the cryptographic information.

ID_symmetric_algorithm may store a unique identifier that identifies the type of symmetric cryptographic algorithm used to calculate the hash data. A value 0 may be used to indicate that no symmetric algorithm is used.

ID_asymmetric_algorithm may store a unique identifier that identifies the type of asymmetric cryptographic algorithm used to calculate the hash data. A value 0 may be used to indicate that no symmetric algorithm is used.

SECRET_KEY may store secret key used with a symmetric cryptographic algorithm.

PRIVATE_KEY and PUBLIC_KEY are fields that may store the key pair used with an asymmetric cryptographic algorithm.

ID_user, User_Name and User_Password are fields that may store information that identifies the entity or user that may use or have access to the same information that the information stored on register, for example a software company that use the same information than the information stored in a register to compute the hash data in the data blocks of their computer programs In some implementations, the system 910 keeps secret the private keys or secret keys used to generate digital signatures or hash values. The system 910 may receive a computer program APP 600 from a system or a computer of a registered user or entity and the system 910 may select a first cryptographic information associated with that user or entity and calculate the hash data for the data blocks of the computer program APP 600, generating the computer program APP 600S that may be transmitted and executed in a computing device, like the computing device 900 in FIG. 9. In this case the user or entity doesn't have access to the cryptographic information, for example may have access only to fields ID_user, User_Name and User_Password, but the user or entity may use the cryptographic information of the register indirectly through system 910.

In one implementation, a system or a computer of a user or a entity registered in the system 910 may receive the cryptographic information, like for example information comprising at least a part of the following information:
IDKEY
ID_symmetric_algorithm
ID_asymmetric_algorithm
SECRET_KEY (for symmetric cryptographic algorithm)
PRIVATE_KEY (for asymmetric cryptographic algorithm)
PUBLIC_KEY
ID_user
User_Name
User_Password In one implementation, the user's computer may use this cryptographic information to generate the hash data for each data block of the computer program APP 600, generating the computer program APP 600S that may be transmitted and/or executed in computing devices, like for example the computing device 900 in FIG. 9.

In one implementation at least a part of this fields, for example the field IDKEY may be stored in the metadata 630S of the computer program APP 600S. For example such information may be included in a digital certificate included in the metadata 630S.

In one implementation, the security component may store at least a first part of the cryptographic information associated with each register and the security component may use this first cryptographic information to verify the hash data of each data block of computer program APP 600S

Once the computer program APP 600S is being executed in the CORE 510A of processor 500B, the security component stores at least part of the first cryptographic information and may execute a cryptographic algorithms using the crypto module to calculate or verify cryptographic hash data of the data blocks of computer program the APP 600S.

In one implementation the KEYS memory may be located inside the security component 550A in the processor 500B and may include a flash memory capable of storing several MB or GB of data and can also store thousands or millions of registers with cryptographic information.

Using this information stored inside the security component, the crypto module may verify the hash data in the data blocks comprising instructions and hash data, before allowing a core to execute the instructions stored in the cache lines of L1 instruction cache as previously explained.

In some implementation the processor may execute instructions to read the cryptographic information stored in the metadata 630S and may transmit at least part of this cryptographic information to the security component 550A, for example by writing memory registers in a memory stored inside the security component that are mapped to input/output addresses.

In some implementations, the core 510A may use some specific cache line of its L1 data cache to store cryptographic information and the security component may be able to read these specific cache lines. Other combinations are possible to transmit information between one core and its security component.

In some implementation, the core cannot transmit or receive data from the security component.

Although FIG. 9 shows an example of an implementation with a first core 510A having a security component 550A and a second core not having a security component, other implementations are possible In one implementation, a computing device has a processor with one or more cores having security components and the security components verifies that the hash data of every data block comprising instruction is correct before allowing the data block to be stored in a L1 instruction cache. This implementation provides maximum security as no instruction can be executed in any core of the processor if the instruction cache line does not contain a verified hash data.

FIG. 10 shows an implementation in which there are various systems 1010, 1020 and 1030 that may communicate with each other via data networks, like for example the Internet.

FIG. 10 shows the communication between different systems and the computing device 900 through lines 1015, 1025, 1035, 1045 and 1055.

In the example of FIG. 10, the system 1010 is a software application store where computing devices may buy and/or download software, like for example the system known as Apple "App Store". Usually an application software store may sell software from hundreds or thousands of software developers companies.

The system 1030 may be a system of a software developer company that may communicate with other systems like for example system 1010 and/or system 1020, and may also communicate with the computing device 900.

In one implementation, the system 1030 may be any computer capable to receive cryptographic information from the system 1020 or the system 1010 and/or capable to transmit and computer program to system 1020, or directly to the system 1010.

In one implementation the system 1020 may be an intermediary system that may be used by software development companies willing to sell their software products in the software application store 1010.

In one implementation, the system 1020 is a system associated with the software application store 1010 and may be used for different processes associated with the sell of software products in the software application store 1010, like for example the process of registering the software companies, assigning a unique identifier to each software company, assigning a unique identifier to each product of each software company, approving the application programs before they are offered for sale in the software application store 1010, transmitting a digital certificate to each software company, transmitting cryptographic information to each software company and other processes.

In one implementation, the system 1020 and the system 1010 may be part of the same system 1010 and 1020. In one implementation system 1010 and 1020 may use different URI (Uniform Resource Identifier) to access resources in 1010 and 1020.

In one implementation the system 1020 doesn't exist and all their processes are executed in the system 1010.

In one implementation, the system 1020 may be a third party that does not belong to the entity using the system 1010 nor the entity using the system 1030.

As explained before in the definition of "system" in this specification, each of the systems 1010, 1020 and 1030 may comprise one or more computing devices.

To simplify the explanation, in the example of FIG. 10, the systems 1010, 1020 and 1030 may comprise a server 1013, 1023 and 1033, respectively, a database 1011, 1021 and 1031, respectively, and an application program 1012, 1022 and 1032, respectively.

In one implementation, the developer system 1030 may receive from the intermediary system 1020 cryptographic information, like for example a secret key that may be used with symmetric cryptographic algorithms, a pair of public keys comprising a private key and a public key that may be used with asymmetric cryptographic algorithms, a digital certificate or other type of cryptographic information.

In one implementation, the software developer 1030 develops a computer program APP 600 with instructions organized in data blocks that doesn't have the hash data stored in each data block, as in the example in FIG. 6, and transmits the APP 600 to the intermediary system 1020.

In one implementation, the intermediary system 1020 receives the APP 600 from the system 1030. Then the system 1020 selects a cryptographic key associated with the software developer company using the system 1030 and selects a cryptographic algorithm and calculates the hash data of each of the data blocks of the computer program APP 600 generating the computer program APP 600S, for example a computer program similar to that shown in FIG. 6B.

In one implementation, the cryptographic algorithm may be selected by the software company operating the system 1030 and transmit this information to the intermediary system 1020.

In one implementation, the system 1020 may assign different digital certificates to each software company, for example digital certificates using different PRIVATE KEYS, and PUBLIC KEYS.

In one implementation the system 1020 may transmit a first secret key to the system 1030 of the developer company to be used to calculate the hash data of the data block using symmetric cryptographic algorithms. In one implementation the same first secret key may be stored inside the processor 500B, for example inside the security component 550A In one implementation, the application store 1010 receives from the intermediary system 1020 the computer program APP 600S through communication 1025.

In one implementation, the system 1030 may receive the cryptographic information from the system 1020 comprising a digital certificate and a private key associated with the digital certificate, and the system 1030 may calculate the hash data using the private key to generate the computer program APP 600S. The system 1030 may transmit the computer program APP 600S to the system 1020 or directly to the system 1010.

In one implementation, the system 1020 may include as metadata 630S of the computer program APP 600S the IDKEY identifier that identifies a key pair PRIVATE KEY, PUBLIC KEY and an identifier that identifies the algorithm used to calculate the hash data in the data blocks of the computer program APP 600S. For example the system 1020 may include this information stored in a digital certificate received from the system 1020.

When the computing device 900 requests a download of the computer program APP 600, the application store 1010 may transmit the computer program APP 600S to computing device 900 through communication 1015.

Figure 11:
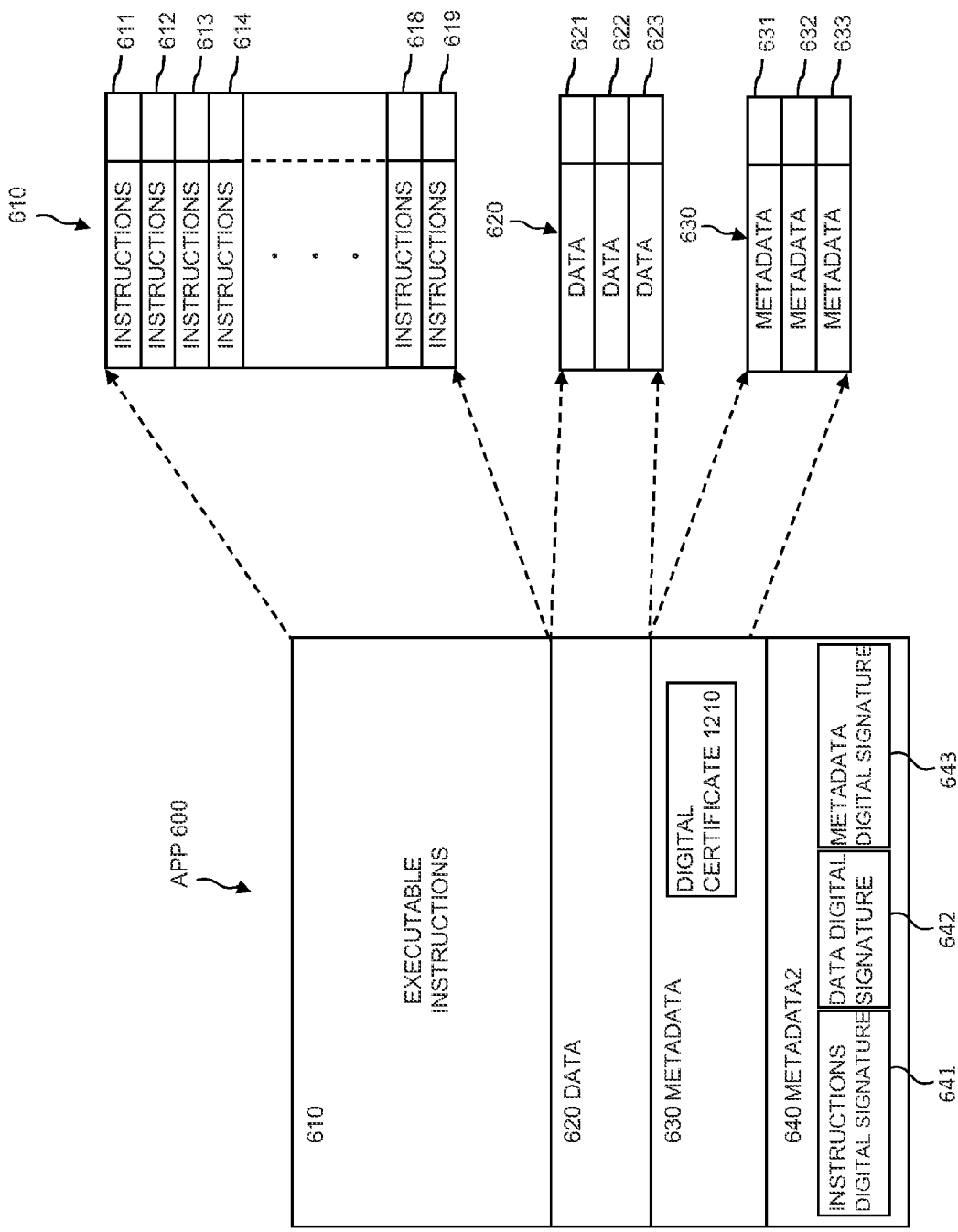
FIG. 11 shows an example of a software program that includes a digital certificate.

The example of FIG. 11 shows an implementation where the computer program APP 600 includes a digital certificate 1210 which may be used in the system 1010 or the system 1020, for example to verify digital signatures 641, 642 and 643 for parts 610, 620 and 630 of the program 600.

In one implementation, the digital certificate 1210 may be generated in the system 1020 and transmitted to system 1030. The system 1020 may also transmit to the system 1030 a private key associated with digital certificate that may be used to generate the digital signatures 641, 642 and 643

In another implementation, the digital certificate 1210 may be generated by another system not shown in FIG. 10, like for example the system of a certification authority, and may be transmitted to the system 1030 and/or the system 1020.

The digital certificate may comprise a public key associated with the private key received with the digital certificate. Using the private key, the system 1030 may generate digital signatures of data, like for example the digital signatures 641, 642 and 643.

In one implementation the private key associated with the digital certificate may be also used to calculate the hash data of the data block of the computer program APP 600S, When the computing device 900 downloads the computer program APP 600S, the digital signatures 641, 642 and 643 may be verified in the computing device using the public key included in the digital certificate 1210 offering an extra protection besides the hash data in the data blocks storing instructions, data or metadata.

In one implementations, one or more electronic signatures, like for example digital signatures 641, 642 and 643, are generated in the system 1030 and stored in part 640 of the computer program APP 600 or APP 600S, for example in a part called metadata2 640 as shown in FIG. 11. This implementation allows other systems, like for example system 1020, system 1010 and computing device 900 to identify and to verify who is the developer (authentication) of a computer program, and also allows to verify the integrity of the computer programs APP 600 or APP 600S.

Figure 12:
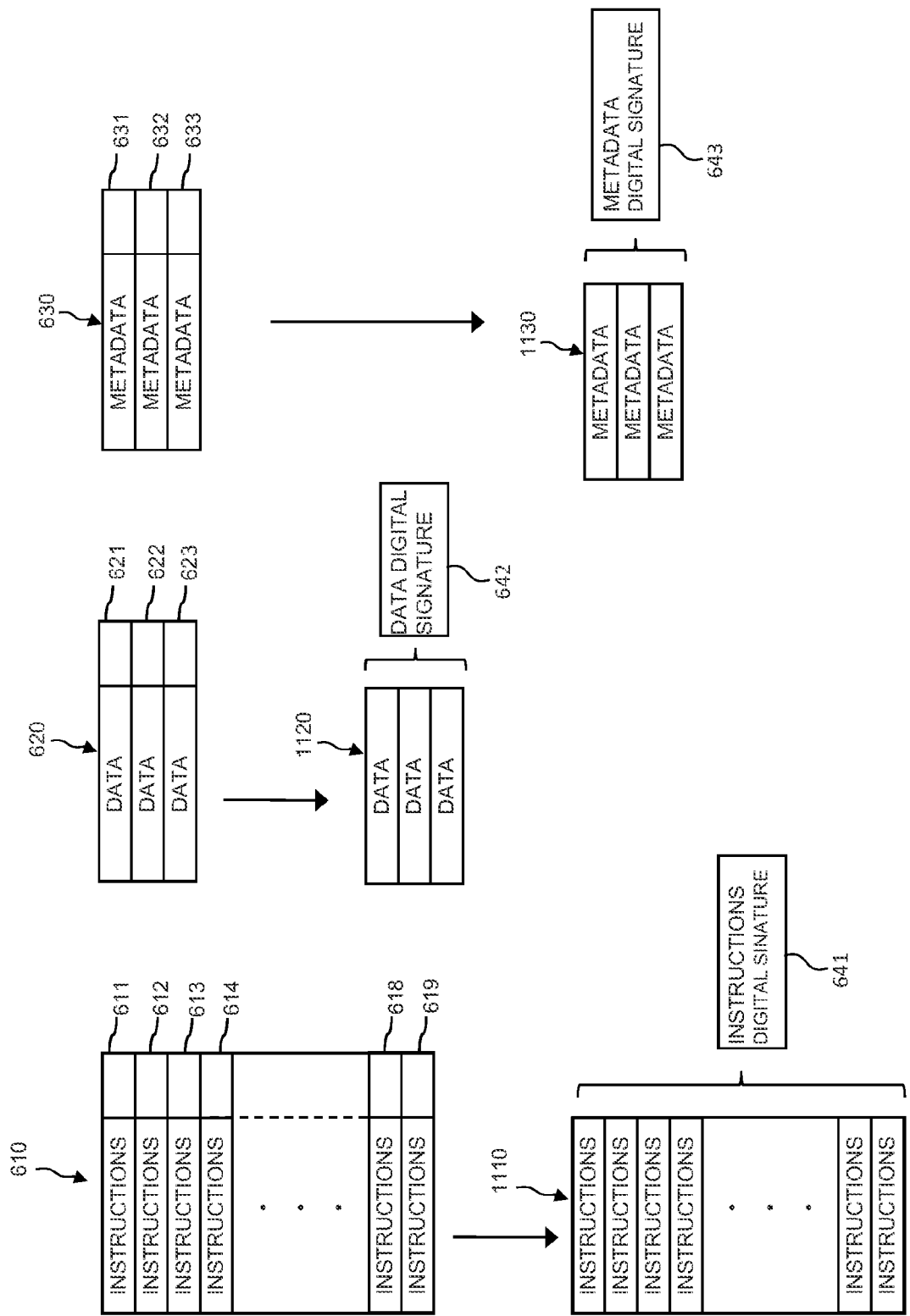
FIG. 12 shows examples of implementation with digital signatures.

In one implementation, the digital signatures 641, 642 and 643 are calculated without taking into account the bytes for the hash data of each data block. This is shown in FIG. 12. In another implementation, the bytes of the hash data may store the value 0 when the digital signatures are calculated.

The example of FIG. 12 shows an example of how to calculate the digital signatures 641, 642 and 643.

To calculate the digital signature 641 of the first part 610 of the APP 600, only data 1110 comprising instructions of the first part 610 of the software program 600 may be used as input of the cryptographic algorithm that generates the digital signature 641

Similarly, to calculate the digital signatures 642 and 643, only the data 1120 and 1130, respectively, may be used, not using in the cryptographic algorithm to calculate the digital signatures the bytes that will subsequently store the hash data of each data block.

FIG. 13 shows an implementation in which there are several systems 1010, 1020 and 1030 that communicate with each other via data networks, for example through the Internet. FIG. 13 shows the communication between different systems and the computing device through communications 1015, 1025, 1035, 1045 and 1055.

FIG. 13 shows an example of an implementation that may use digital certificates.

In the example of FIG. 13 the system 1020 receives, for example from the developer system 1030, the computer program APP 600 that includes the certificate 1210 and metadata2 640 that may comprise the digital signatures 641, 642 and 643 corresponding to parts 610, 620 and 630 respectively of the application program APP 600.

In one implementation, the system 1020 may verify that the computer program APP 600 has been developed by the developer system 1030 by verifying the digital signatures 641, 642 and 643.

In FIG. 13, the system 1020 may generate the computer program APP 600S comprising the hash data in each data block in a similar way as described above in FIG. 10 and transmits it to the application store system 1010 where it can be downloaded by many computing devices, like for example the computing device 900.

Although FIGS. 10 and 13 show a single developer system 1030 to simplify the figures, different implementations may operate with multiple developer systems 1030, multiple application stores 1010 system and multiple systems 1020.

In one implementation, the computing device 900 uses the public key included in the digital certificate 1210 to verify that the electronic signatures 641, 642 and 643 included in the metadata2 640 are correct before installing the computer program APP 600S in the computing device 900.

Figure 14:
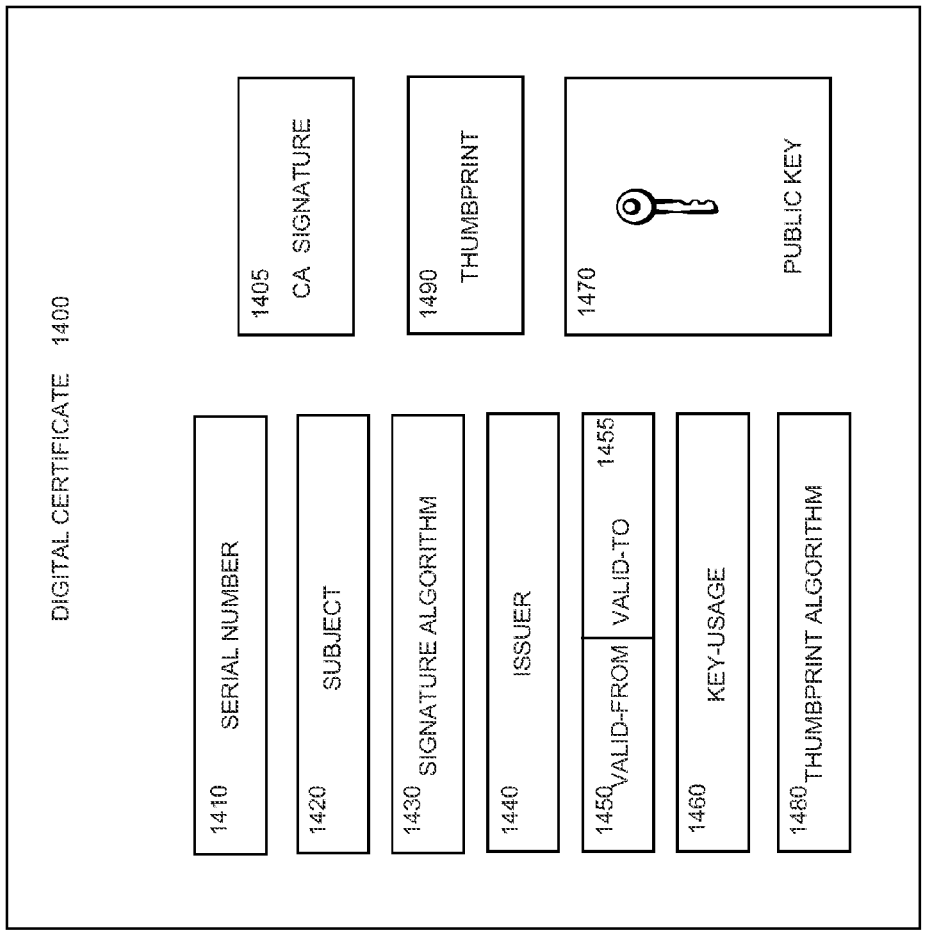
FIG. 14 shows an example of a digital certificate.

FIG. 14 shows an example of a digital certificate. A digital certificate is an electronic document that serves to link an individual or entity (e.g. name, address and other aspects of identification) and a public key. A digital certificate may be used to verify that a public key belongs to an individual or entity. A digital certificate may be signed by a Certification Authority (CA) that certifies and validates the link between public key and the individual or entity. A certification authority is a trusted entity that can issue digital certificates using an electronic signature.

In the example of FIG. 14, the digital certificate 1400 is signed by the issuing entity (CA), this signature is indicated by the element 1405.

FIG. 14 shows the typical fields inside a digital certificate 1400, for example, an X.509 type certificate, which has widespread use on the Internet:

A serial number 1410 (Serial Number) which uniquely identifies the digital certificate.
Identification data 1420 (Subject) of the individual or entity that identifies and links the certificate.
The signature algorithm 1430 (Signature Algorithm) used for creating the signature of the certificate.
Issuer 1440 (Issuer) or entity that has verified the information contained in the certificate and has issued it.
Issue date 1450 (Valid-From) and expiry date 1455 (Valid-To) of the certificate.
Purpose of the public key 1460 (Key-Usage), such as encryption, signing, etc. . . .
Public Key 1470 (Public Key)
Algorithm used to calculate the hash of the certificate 1480 (Thumbprint Algorithm)
Hash of certificate 1490 (Thumbprint)

Figure 15:
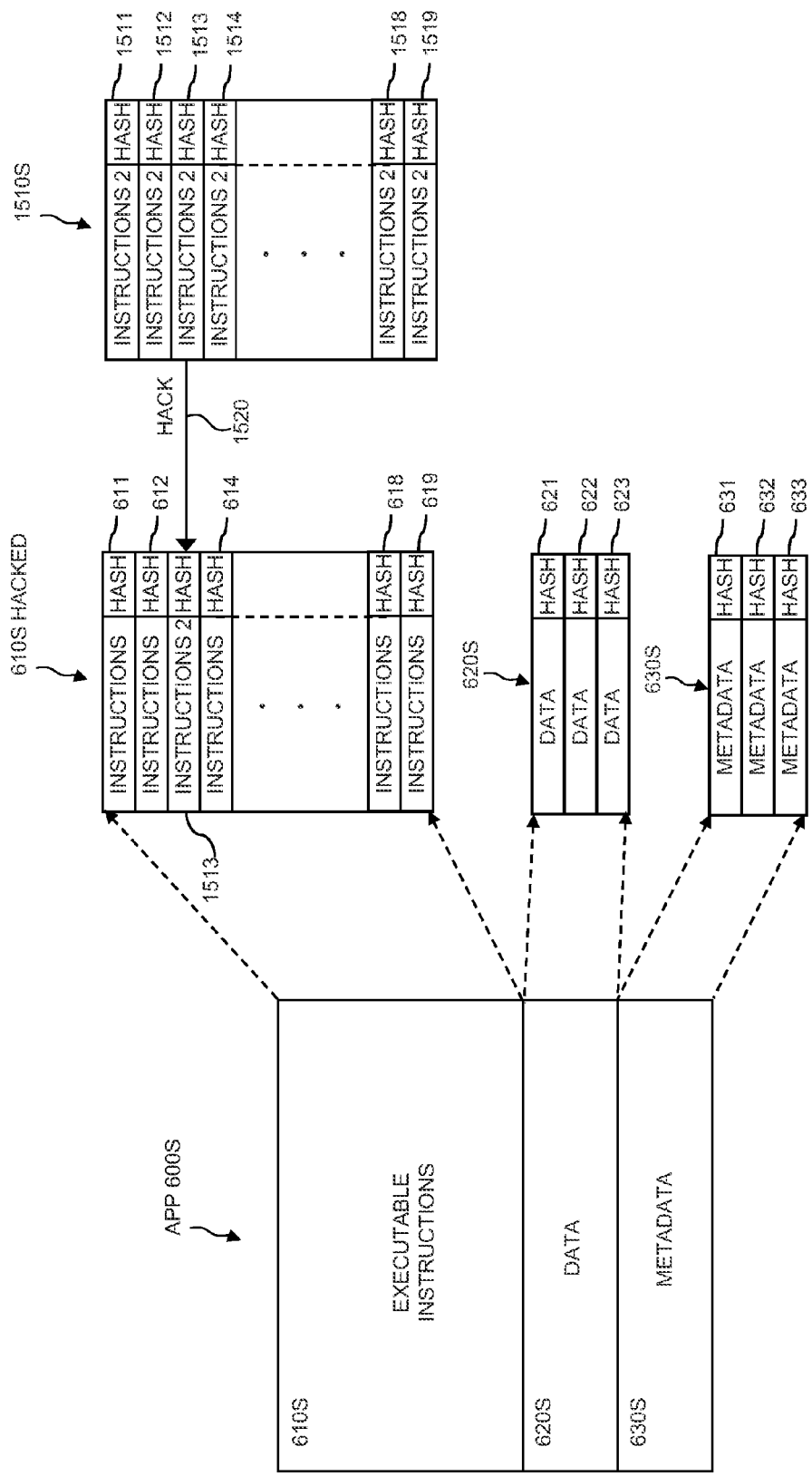
FIG. 15 shows an example of a hacked computer software program.

FIG. 15 shows an example of a hacked program. The example of FIG. 15 shows two computer programs 610S HACKED and 1510S comprising data blocks with hash data, but the computer program APP 610S HACKED has been altered replacing an original data block with the data block 1513 from the computer program 1510S.

In the example in FIG. 15, the program 1510S only shows the initial 4 data blocks 1511, 1512, 1513 and 1514, and the last two data blocks 1518 and 1519 to simplify the figure.

A hacker could register in the system 1020 shown in FIGS. 10 and 13 and provide a computer program 1510 to the system 1020 that may add the hash data to each data block and transmit the computer program 1510S that includes the hash data to the application store system 1010.

The hacker could download the computer program 1510S comprising the hash data from the application store system 1010 and use data blocks of program 1510S to alter the computer program APP 600S.

For example by replacing the third data block 613 (not shown in FIG. 15) of the computer program APP 600S by the data block 1513 of the computer program 1510S as indicated by arrow 1520 and inserting this way in the computer program APP 600S the instructions needed to hack or alter the normal functioning of the computer program APP 600S.

This attack could be executed in a computing device if the computer program APP 600S and the computer program 1510S use the same cryptographic keys and the same cryptographic algorithms.

In one implementation, to avoid this security attack, the system 1020 may assign each developer system different cryptographic keys and/or digital certificates.

In one implementation, the security component does not allow the same application to use different cryptographic keys in different data blocks comprising instructions of the same application.

In one implementation the security component differentiates between cryptographic keys assigned to software companies, like for example the software company operating the system 1030 and cryptographic keys used by the operating system, for example in functions of the operating system that may be called by the computer program APP 600S or shared libraries of the operating system.

In one implementation the security component may allow a computer program to use different cryptographic keys to the cryptographic key assigned to the developer company, for example allowing the computer program APP 600 to use shared libraries or operating system functions comprising instructions organized in data blocks with hash data.

In one implementation, the security component may store information, for example in the internal memory KEYS, to differentiate the cryptographic keys of the functions of the operating system or shared libraries.

Figure 16:
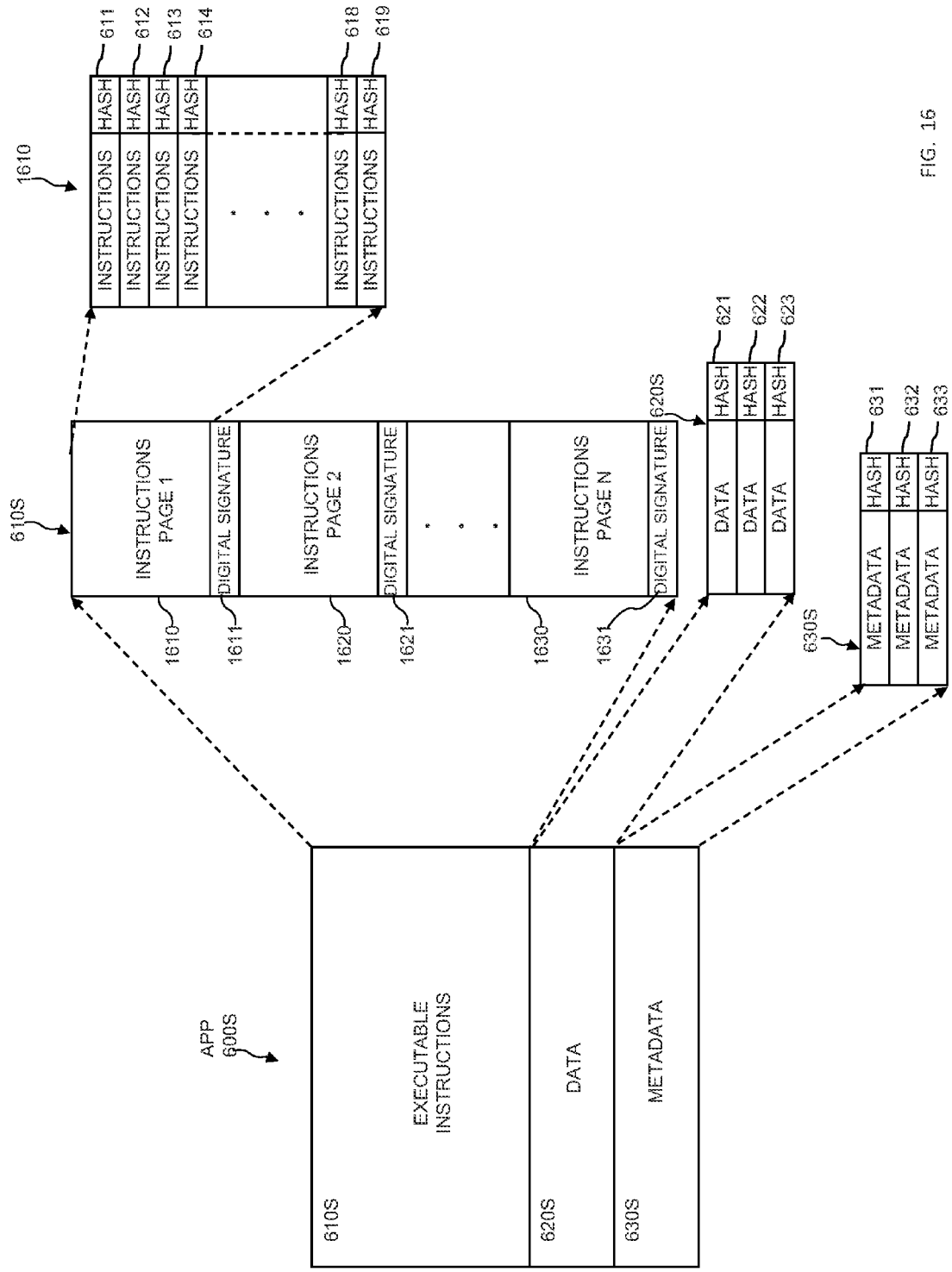
FIG. 16 shows an implementation with memory pages using hash values.

FIG. 16 shows another implementation wherein the computer program APP 600S, in addition to have a hash data in each data block also has a digital signature in each memory page.

In the example of FIG. 16, the application APP 600S comprises several pages of instructions of a similar size to the pages of the virtual memory used by the computing device 900.

In one implementation, the computer program APP 600S may have pages with instructions organized in data blocks with hash data and each page may store a digital signature.

For example, the computer program APP 600S may have the part 610S comprising a first page 1610 of instructions with a first digital signature 1611, a second page of instructions 1620 with a second digital signature 1621 and so on until completing the part 610S of application APP 600S, where the last page of instructions 1630 has the digital signatures 1631.

Figure 17:
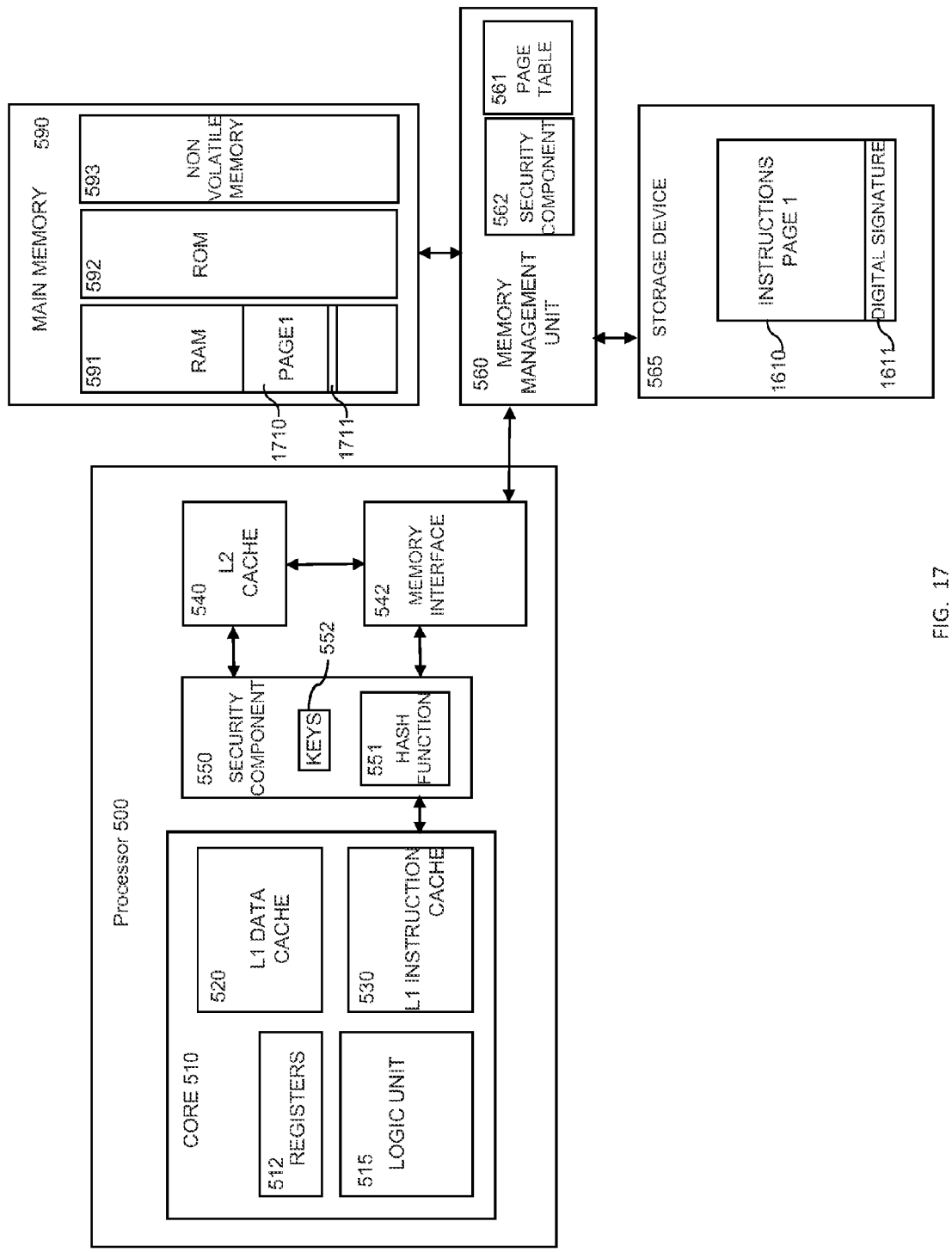
FIG. 17 shows an implementation with memory pages.

FIG. 17 shows the first page of instructions 1610 and its digital signature 1611 stored in a storage device 565.

In one implementation, when the MMU reads the memory page comprising data 1610 and 1611 to store it in the main memory 590, a second security component 562 in the MMU may verify that the digital signature 1611 calculated based on the data 1610 is correct and only then stores the page 1610 and its digital signature 1611 in the main memory as indicated by elements 1710 and 1711.

The implementation shown in the example of FIGS. 16 and 17 makes it more difficult to alter or hack the application APP 600S.

In one implementation the cryptographic keys used to calculate the digital signatures 1611, 1621 and so on up to the digital signature 1631, may be the same cryptographic keys used to calculate the hash data of each data block.

In one implementation, these hash data may be calculated in the system 1020. In another implementation the digital signatures and the hash data of each data block may be calculated in the developer system 1030 and the computer program comprising data blocks with hash data and digital signatures may be transmitted from system 1030 to system 1020 or directly to the application store system 1010.

In one implementation, the cryptographic keys used to compute the digital signatures 1611, 1621 and so on up to the digital signature 1631, are different from those used to calculate the hash data of each data block. For example the systems 1020 or 1030 may use the PRIVATE KEY associated with the digital certificate 1210 to generate the digital signatures of the pages and the systems 1020 or 1030 may calculate the hash data of each data block using a different cryptographic key.

Figure 18:
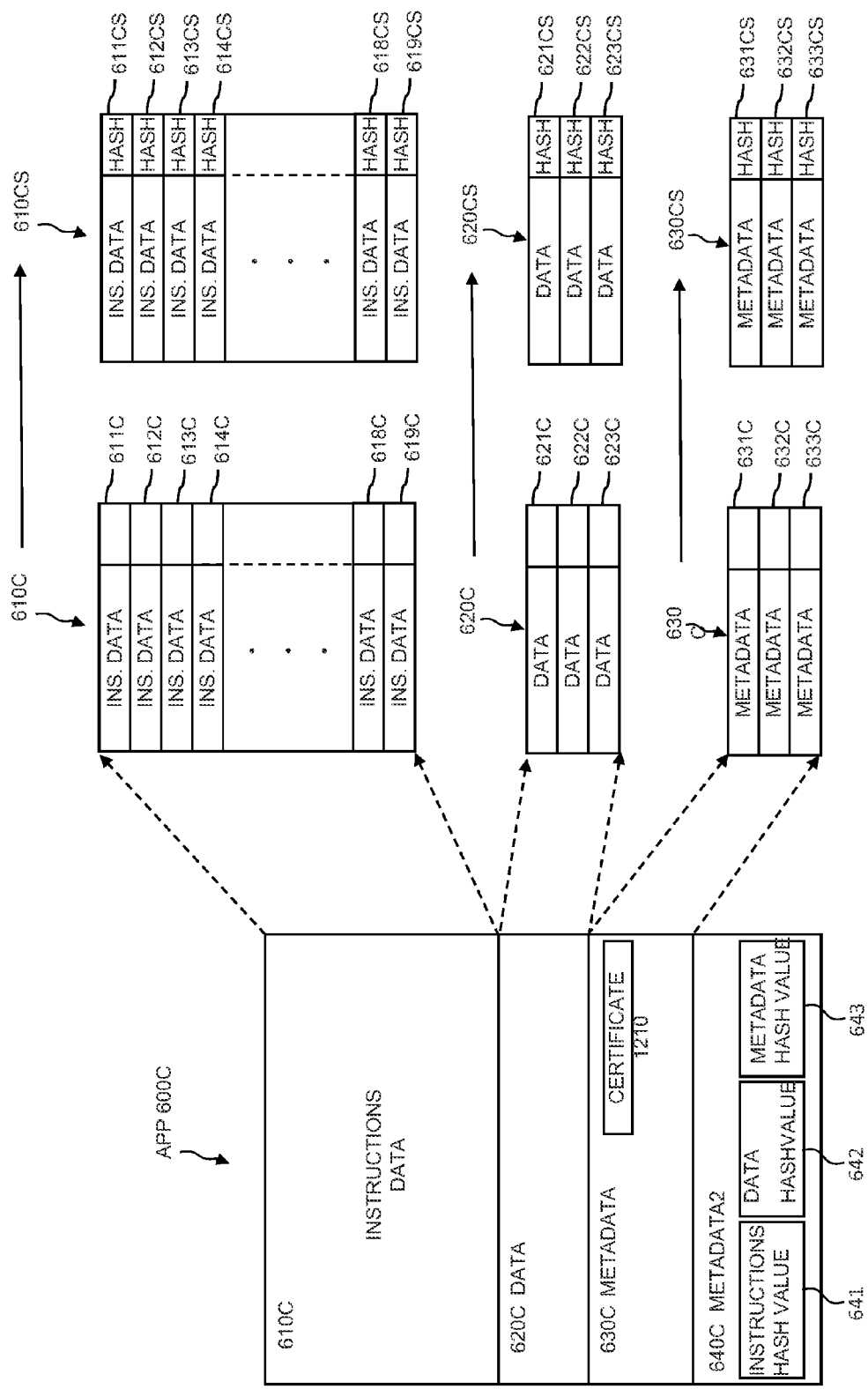
FIG. 18 shows an implementation wherein a software program can use different types of instructions.
Figure 19:
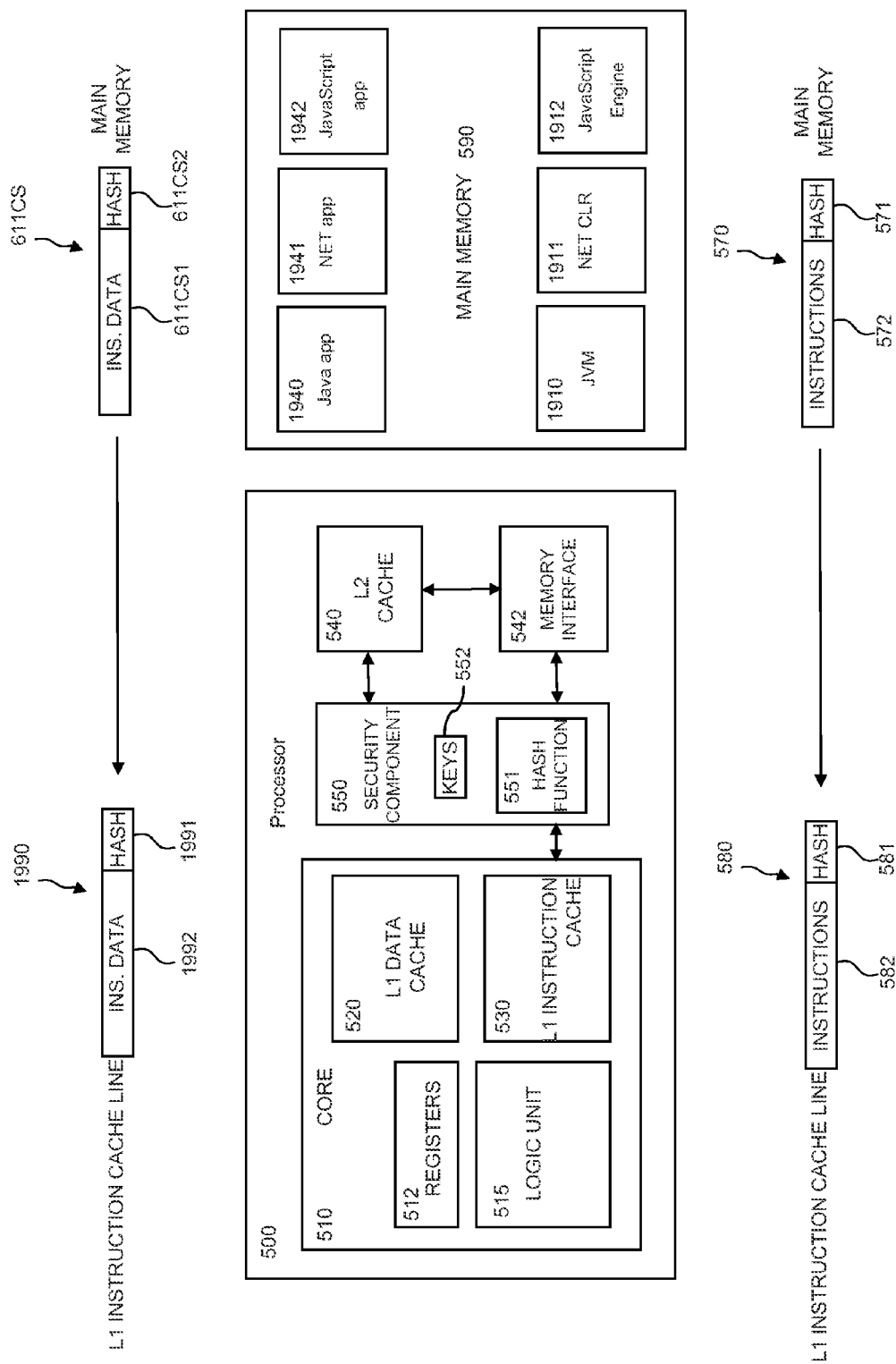
FIG. 19 shows an implementation with different types of instructions.
Figure 20:
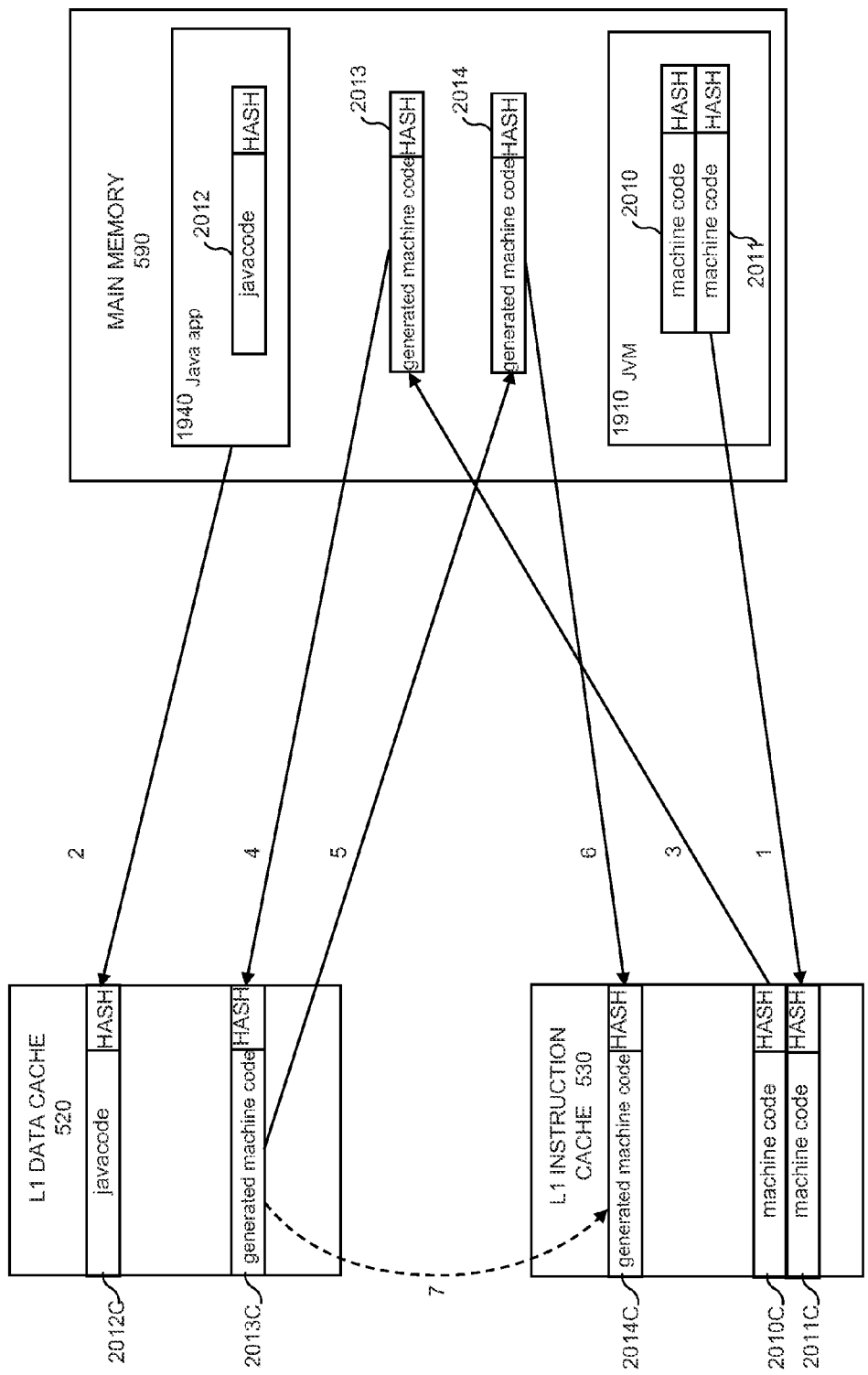
FIG. 20 shows an implementation with a computer software program comprising instructions that are not directly executable by the processor.

FIGS. 18 to 20 show examples of different implementations that may use different programming languages.

Programs developers usually write computer programs in high level code, which the processor cannot execute. As such, this source code has to be converted into machine code. This conversion may be done by a compiler or an interpreter. A compiler makes the conversion just once, while an interpreter typically converts it every time a computer program is executed (or in some languages like early versions of BASIC, every time a single instruction is executed).

In computer science, an interpreter normally means a computer program that executes instructions written in a programming language. An interpreter may be a program that either: 1) executes the source code directly, 2) translates source code into some efficient intermediate representation (code) and immediately executes this, or 3) explicitly executes stored precompiled code made by a compiler which is part of the interpreter system.

Perl, Python, MATLAB, and Ruby are examples of type 2, while UCSD Pascal is type 3. Source programs are compiled ahead of time and stored as machine independent code, which is then linked at run-time and executed by an interpreter and/or JIT (Just In Time compilers). Some systems, such as Smalltalk, BASIC, Java and others may also combine types 2 and 3.

While interpreting and compiling are the two main means by which programming languages are implemented, these are not fully distinct categories, one of the reasons being that most interpreting systems also perform some translation work, just like compilers. The terms "interpreted language" or "compiled language" merely mean that the canonical implementation of that language is an interpreter or a compiler; a high level language is basically an abstraction which is (ideally) independent of particular implementations.

There is a spectrum of possibilities between interpreting and compiling, depending on the amount of analysis performed before the program is executed. For example, Emacs Lisp is compiled to bytecode, which is a highly compressed and optimized representation of the Lisp source, but is not machine code (and therefore not tied to any particular hardware). This "compiled" code is then interpreted by a bytecode interpreter (itself written in C). The compiled code in this case is machine code for a virtual machine, which is implemented not in hardware, but in the bytecode interpreter. The same approach is used with the Forth code used in Open Firmware systems: the source language is compiled into "F code" (a bytecode), which is then interpreted by a virtual machine.

Interpreted language is a programming language in which programs are 'indirectly' executed ("interpreted") by an interpreter program. This can be contrasted with a compiled language which is converted into machine code and then 'directly' executed by the host CPU.

Theoretically, any language may be compiled or interpreted, so this designation is applied purely because of common implementation practice and not some essential property of a language. Indeed, for some programming languages, there is little performance difference between an interpretive-based or compiled-based approach to their implementation.

Many languages have been implemented using both compilers and interpreters, including BASIC, C, Lisp, Pascal, and Python. While Java is translated to a form that is intended to be interpreted, just-in-time compilation is often used to generate machine code. The Microsoft .NET Framework languages always compile to Common Intermediate Language (CIL) which is then just-in-time compiled into native machine code. Many Lisp implementations can freely mix interpreted and compiled code. These implementations also use a compiler that can translate arbitrary source code at runtime to machine code.

A computer program may comprise one or several different types of instructions that may be executed in different ways.

First types of instructions are the instructions that a microprocessor can execute directly, such as instructions called "machine code" or "native code". Hereafter, we use the term "machine code" to refer to the instructions directly executable by the microprocessor.

For example, a program developed in C++ language and compiled to convert it into machine code, can be executed directly by a microprocessor. Another example is a program developed in the language "assembly language" of a particular microprocessor and converted to "native code" of said microprocessor with a program that is often referred to as assembler.

Another type of instructions that can use the programs or software applications are instructions of interpreted programming languages.

For example, a program in JavaScript (language also called ECMAScript) can run on a computer using a "JavaScript Engine" or "JavaScript Interpreter" or "JavaScript implementation" which is a software program that interprets and executes JavaScript language programs.

JavaScript is a programming language widely used on websites and most browsers have an implementation that enables the execution of JavaScript programs.

Other types of instructions are called "bytecode" or "p-code". Bytecode contains instructions that are not a programming language or "machine code" instructions, but an intermediate type of instructions that are executed by a program called interpreter or "virtual machine" or with a JIT compiler ("Just In Time compiler").

The advantage of bytecode type instructions is that they are designed to become "machine code" quickly and allow their use in different computer systems, for example, systems using different types of processors or different operating systems. Also, different programming languages can use the same bytecode, which facilitates the creation of programming tools in different languages.

For example, programs developed in Java may be converted into programs that use bytecode and can use a JIT compiler and/or JVM ("Java Virtual Machine") to convert the bytecode into "machine code" that may be executed by a microprocessor. For example, the JIT can be part of the JVM. The Java language bytecode is often called "Java bytecode".

Another bytecode example is the CIL language ("Common Intermediate Language") used in the development environment called "NET" from Microsoft. A program called NET CLR ("Common Language Runtime") converts the CIL data into machine code.

FIG. 18 shows an implementation in which a computer program APP 600C contains INSTRUCTIONS DATA 610C which may include different types of instructions such as "machine code", "bytecode" or instructions in high level language.

In the example of FIG. 18 the computer program APP 600C may also contain data 620C, metadata 630C and second metadata 640C as described before; other configurations are possible. For example, metadata can be located in the program 600B before the instructions.

Instructions 610C may comprise different types of instructions, for example "machine code" type instructions that are run directly by the processor, bytecode instructions and/or instructions in an interpreted language.

Blocks 611C, 612C, 613C, 614C to 618C and 619C show an example of instructions data part 610C organized into data blocks, for example data blocks having the same number of bytes as the L1 cache line. In each data block there is a part with instructions shown in FIG. 18 using the abbreviation "INS. DATA" and another part that may store the hash data of each block.

The example of FIG. 18 shows the data 620C comprising three data blocks 621C, 622C and 623C but different implementations may use a different number of data blocks.

FIG. 18 also shows the metadata 630C comprising of three data blocks 631C, 632C and 633C although other implementations may use a different number of metadata blocks.

Element 610CS of FIG. 18 shows the data blocks once the hash data has been added to each data block 611CS, 612CS, 613CS, 614CS and so on until completing all instructions with the data blocks 618CS and 619CS.

Each hash data of each data block of the element 610CS may be calculated using a cryptographic algorithm applied to the data containing the "INS. DATA" for each data block. In some implementations, the cryptographic algorithm may use cryptographic key or keys.

In some implementations, the data 620C and/or metadata 630C may also be organized in data blocks with a hash data for each data block as indicated by elements 620CS and 630CS of FIG. 18.

The example of FIG. 18 shows the data 620CS containing three data blocks 621CS, 622CS and 623CS but different implementations may use a different number of data blocks.

FIG. 18 also shows the metadata 630CS composed of three data blocks 631 CS, 632CS and 633CS although other implementations may use a different number of metadata blocks.

FIG. 19 shows an example of one implementation that may verify the hash data of data blocks transferred from main memory to a cache line 580 of the L1 instruction cache and may also verify the hash data of data blocks transferred from the main memory to a cache line 590 in the L1 data cache.

Programs usually read and write data in the memory using the L1 data cache and it may be difficult to verify hash data from the cache lines in the L1 data cache.

In some implementations, the security component verifies the hash data of certain data blocks transferred from the main memory to a cache line in the L1 data cache but the security component doesn't verify hash data when the processor writes data that changes the values stored in a cache line.

In some implementations, the security component may differentiate which data blocks comprise a hash data that should be verified and which data blocks should not be verified. In one implementation, the security component may use memory addresses (for example virtual memory addresses in computer systems using virtual memory) to determine if a data block comprises a hash data or not.

In one implementation the computer programs stored in main memory use virtual memory and the data blocks stored between a first memory address and a second memory address store data blocks comprising hash data that the security component may verify when the data blocks are transferred to the cache lines of the L1 data cache.

In FIG. 19 element 570 represents a data block stored in main memory 590 and storing machine code instructions 572 and a hash data 571. In one implementation, the security component 550 verifies that the hash data 571 is correct before data block 570 can be stored in the L1 instruction cache and/or before the core 510 can execute instructions 572.

In FIG. 19, the element 580 represents the cache line of the L1 instruction cache 530 that stores the data block 570. The element 580 consists of instructions 582 and a hash data 581.

Element 611CS of FIG. 19 represents a data block stored in main memory 590. The data block 611CS has a first part 611CS1 storing any kind of data and a second part with hash data 611CS2. In one implementation the data stored in the part 611CS may be instructions data comprising instructions that may not be executed directly by the core 510 like, for example, bytecode instruction. This type of instruction data is indicated with the label "INS. DATA".

In one implementation, when the microprocessor requests from the main memory data that is within the data block 611 CS, the data block data 611 CS is transferred to a cache line 1990 of the L1 data cache.

In one implementation, the security component 550 verifies that the hash data 611CS2 is correct before allowing the CORE 510 to access data from the cache line 1990 that stores the data block 611CS. This will prevent the INS.DATA instructions stored in part 611CS1 from being altered before being executed in the computing device having the processor 500, since if they are altered the security component detects that the hash data is not correct and does not transfer them to a cache line of L1 data cache.

In FIG. 19, element 1990 represents a cache line of the L1 data cache storing the data block 611CS. The element 1990 stores data 1992 and the hash data 1991 corresponding to parts 611CS1 and 611CS2 respectively of data block 611CS.

In one implementation, the cache line 1990 of the L1 data cache that stores the data block 611CS has an associated "SECURE BIT" that the security component uses to indicate if the hash data 611CS2 is correct to allow or disallow access to the cache line data from the core 510.

For example a SECURE BIT may be associated with the cache line 1990 and may store the value of 0 when the hash data of the cache line is incorrect or has not yet been verified by the security component and may store the value 1 when the security component has verified that the hash data is correct.

FIG. 19 shows several examples of instructions stored in main memory 590 and using different programming languages, the instructions not directly executable by the core 510.

For example, elements 1940 Java app, 1941 NET app and 1942 JavaScript app represent each one at least a part of three different computer programs stored in main memory 590. The expression "at least a part" is used because in systems with virtual memory it is not necessary that the entire application is stored in the main memory and memory pages are used to store in the physical memory parts or pages of each application while others pages can be stored in a device, as for example the STORAGE DEVICE 565 shown in FIG. 5.

In one implementation, the applications Java app 1940 and NET app 1941 contain bytecode that is organized in data blocks such as the data block 611CS, including in each data block a first part comprising instructions and a second part storing a hash data. These data blocks can be transferred from the main memory to cache lines in the L1 data cache and the security component may verify the hash data of the data blocks are correct, for example before the core 510 can access the data transferred to a cache line of the L1 data cache.

For example, applications Java app 1940 and NET app 1941 may comprise data blocks such as 611CS with a first part 611CS1 comprising bytecode instructions and a second part 611CS2 storing a hash data.

The program applications 1910 JVM (Java Virtual Machine) and 1911 NET CLR (Common Language Runtime) may be used to convert bytecode instructions into machine code instructions, In another example, the application 1942 may contain instructions in a interpreted language, for example the JavaScript language, that are organized in data blocks like as the data block 611CS, including a part with instructions and a part with a hash data. These data blocks may be transferred to the L1 data cache and the security component may verify that the hash data is correct, for example before the core 510 can access data from the cache line 1990 storing the data block 611CS.

In one implementation, the program 1912 JavaScript Engine can convert such instructions from JavaScript to machine code.

In another implementation, the JavaScript Engine program 1912 is an interpreter that executes instructions of the JavaScript language using for example machine code instructions that are part of the JavaScript Engine program 1912 itself.

In one implementation, applications 1910 JVM (Java Virtual Machine), 1911 NET CLR (Common Language Runtime) and 1912 JavaScript Engine may be stored, at least in part, in the main memory and at least a part of their instructions may be machine code instructions directly executable by the microprocessor In one implementation the machine code instructions of the programs JVM 1910, NET CLR 1911 and/or JavaScript Engine 1912 are organized in data blocks, comprising machine code instructions and hash data and the security component may verify the hash data before allowing the core to execute the machine code instructions.

FIG. 20 shows some implementations that may be used in computer programs that do not consist solely of machine code type instructions. For example, programs that may comprise bytecode, like for example Javacode.

To simplify the explanation of FIG. 20 only the main memory 590 and cache memory L1 data cache 520 and L1 instruction cache 530 are shown.

In the example of FIG. 20 the computer program 1910 JVM (Java Virtual Machine) is a program organized at least in part in data blocks comprising machine code instructions and hash data and the security component may verify the hash data before allowing the core to execute the machine code instructions.

The program 1940 Java app is a Java program that comprises Javacode instructions, which can be converted into machine code instructions to be executed in the core 510.

In the example of FIG. 20, the JVM program 1910 may convert the Javacode instructions into machine code instruction that the core 510 may execute.

Although the example in FIG. 20 uses the Java language, other implementations may use other languages such as JavaScript, Visual Basic.NET or others In FIG. 20 the different process used in one implementation to convert Javacode instructions securely into machine code instructions are indicated by arrows 1, 2, 3, 4, 5 and 6.

Arrow 1 in FIG. 20 shows the process of transferring data blocks 2010, 2011 from the main memory to cache lines 2010C, 2011C in the L1 instruction cache. The data blocks 2010 and 2011 store machine code instructions of the JVM program 1910 and hash data. The security component may verify the hash data of data blocks 2010 and 2011 before the core 510 can execute their machine code instructions.

The Java app 1940 comprises data blocks like the data block 2012, with a first part comprising Javacode instructions and a second part storing a hash data.

In one implementation, when the processor executes the instructions stored in the cache line 2010C and/or cache line 2011C of the L1 instruction cache 530, the core 510 ask for data in the data block 2012 stored in main memory causing the transfer of the data block 2012 from main memory to a cache line 2012C in the L1 data cache 520. This step is shown in FIG. 20 by arrow 2.

In one implementation, the security component verifies that the hash data of data block 2012 is correct before storing the data block 2012 in the cache line 2012C or before allowing the core 510 to access the data stored in the cache line 2012C and if the hash data is not correct, the security component doesn't transfer the data block 2012 to the cache line 2012C or doesn't allow the core 510 to access the data stored in 2012C, for example using the SECURE bit as explained before.

In one implementation the JVM program 1910 may convert Javacode instructions into machine code instructions. This step is shown in FIG. 20 by the arrows 3 and 4.

The arrow 3 indicates that the core executing machine code instructions of the JVM program 1910, like the instructions stored in cache lines 2010C and 2011C of the L1 instruction cache, begins to convert bytecode instructions into machine code instructions that are written in the data block 2013 of the main memory.

Then the data block 2013 of the main memory is transferred to the cache line 2013C in the L1 data cache as shown by the arrow 4, so the core can write faster in the cache line 2013C. In this way the bytecode instructions stored in the cache line 2012C of the L1 data cache are converted in the machine code instructions stored in the cache line 2013C of the L1 data cache.

Machine code type instructions generated by the JVM program 1910 from the bytecode instructions may be stored in one or more cache lines of L1 data cache, for example cache line 2013C. In FIG. 20 these machine code instructions generated by the program JVM 1910 are indicated as "generated machine code".

In one implementation, to execute the generated machine code instructions stored in the cache line 2013C, the cache line 2013C may be transferred first to the main memory, for example to the data block 2013 or the data block 2014 stored in main memory.

The data block 2014 stored in the main memory may be stored, for example, in a memory block assigned by the operating system to the JVM program or a memory block assigned to the Java app 1940. This step is shown in FIG. 20 by arrow 5 (although the data block 2014 is shown outside the Java app 1940 and the JVM program 1910).

In one implementation, to execute the instructions generated by the JVM stored in the data block 2014 of the main memory, first these instructions may be transferred to the cache line 2014C in the L1 instruction cache. This step is shown by arrow 6.

In one implementation, the cache line 2013C may be transferred directly from the L1 data cache 530 to the cache line 2014C in the L1 instruction cache 530 as indicated by dashed line 7.

In one implementation, when the cache line 2013C is transferred from the L1 data cache to the L1 instruction cache directly, the cache line 2013C is also copied to a data block 2014 stored in the main memory 590.

In some implementations the cache line 2013C of the L1 data cache may be stored in a L2 cache memory (not shown in FIG. 20) and then transferred from the L2 memory to the cache line 2014C in the L1 instruction cache.

In one implementation, once the byte Javacode instructions have been converted into generated machine code instructions stored in the L1 instruction cache, the core may execute the generated machine code instructions In some implementations the security component may calculate a hash data corresponding to the generated machine code instructions stored in the cache line 2013C in the L1 data cache and store the hash data in part of the cache line 2013C, like for example the last 20 bytes of a cache line of 128 bytes.

In one implementation, the security component may store a first private key and a second public key forming a cryptographic key pair and the security component may use the private key to calculate the hash data using cryptographic algorithm and store the calculated hash data in the cache line 2013C.

In one implementation, the cryptographic key pair or key used by the security component to generated the hash data in cache line 2013C is the same cryptographic key pair or key used to generate the hash data of the data block 2012 in the Java app 1940.

In one implementation the hash data stored by the security component in the cache line 2013C is temporary. For example, they may be valid for milliseconds, seconds, minutes, a day or a week.

In one implementation every time the processor executes an instructions of the JVM program 1910 that writes data in the cache line 2013C, where the JVM stores the generated machine code instructions, the security component 550 calculates a hash data and stores the hash data in the cache line 2013C.

In one implementation, the security component detects that cache line 2013C in the L1 data cache uses hash data because the virtual address in main memory associated with the cache line 2013C is an address between a first address and a second address reserved to be used with cache lines in the L1 data cache that comprise hash data.

In one implementation, the security component does not allow other programs or applications other than the JVM program 1910 that is generating machine code instructions in cache line 2013C to access the data stored in the cache line 2013C This helps avoid a potential vulnerability consisting in modifying the instructions of the cache line 2013C between two processes of writing data in the cache line 2013 by the JVM program 1910.

In another implementation, to prevent instructions of cache line 2013C from being altered while being written by the JVM program 1910, each time an instruction is written in the cache line 2013 the JVM program 1910 makes a copy of the cache line 2013 data and stores it and the next time the JVM program 1910 is going to write an instruction in the cache line 2013, the JVM program 1910 first checks that the content of the cache line 2013 corresponds to the data copy by the JVM in the last modification.

There are some processors that may execute directly Java bytecode, for example, the processor picoJava is a microprocessor dedicated to native execution of Java bytecode without the need for an interpreter or just-in-time compiler.

In some implementations, the processor of a computing device is a Java processor that includes a security component, and the Java processor may execute the Java bytecode instructions organized in data blocks, for example data blocks comprising 108 bytes of Java bytecode and a hash data of 20 bytes.

As explained before, in different implementations executable instructions may be stored in data blocks comprising a hash data.

Figure 21A:
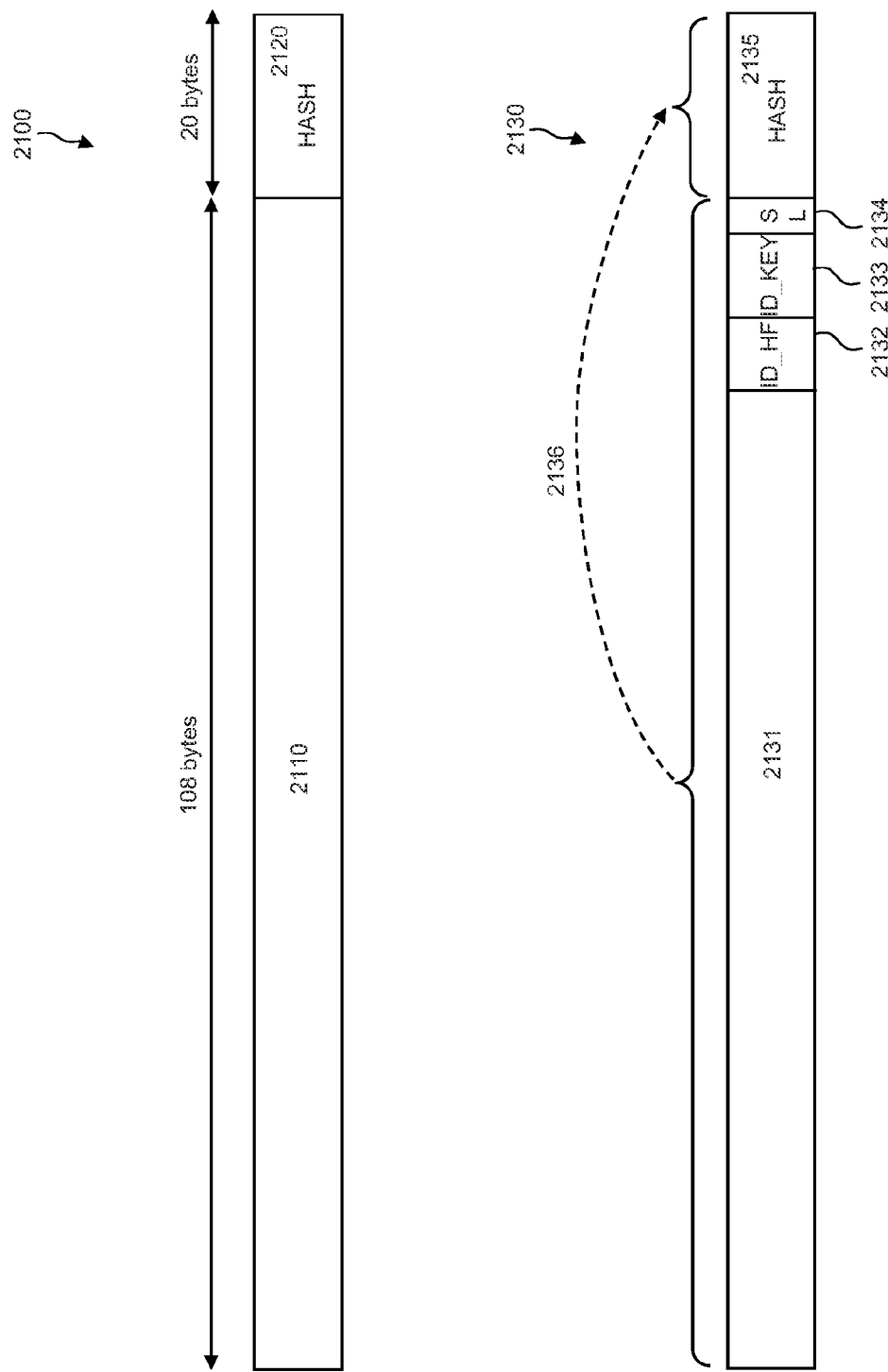
FIGS. 21A, 21B and 21C show examples of different cache lines.
Figure 21B:
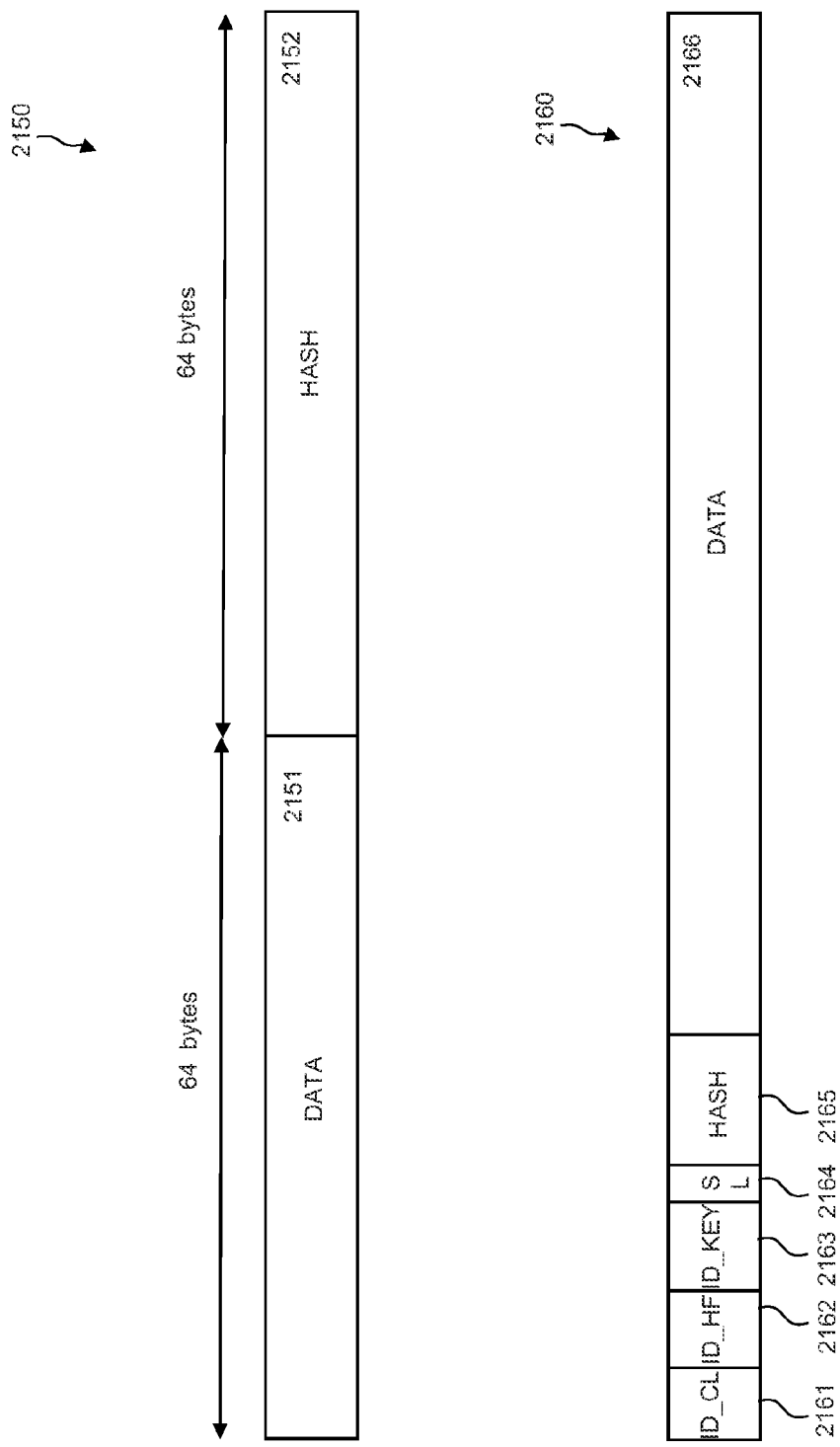
Figure 21C:
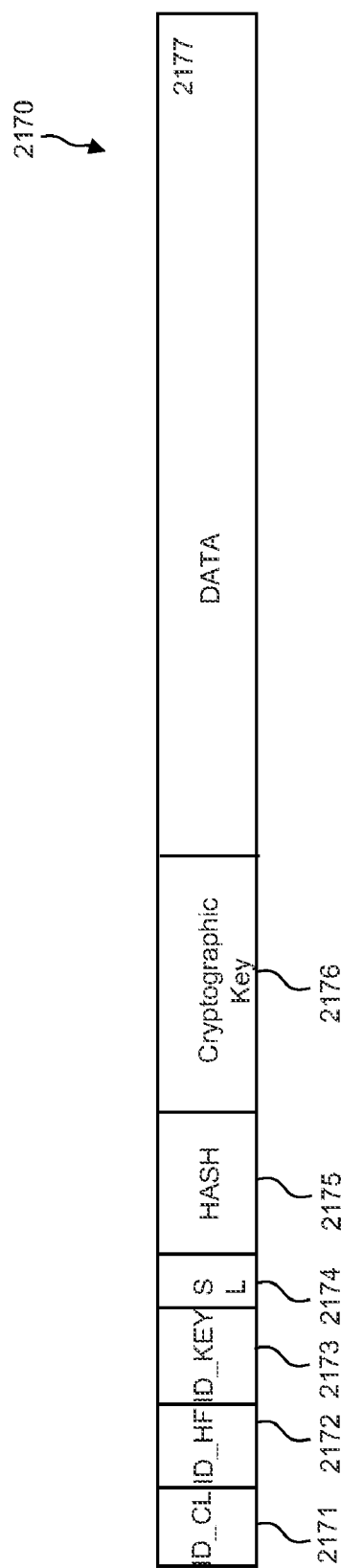

These data blocks may have different formats. FIGS. 21A, 21B and 21C show examples of data blocks formats, but other configurations are possible.

FIGS. 21A, 21B and 21C are not figures drawn to scale, and the size of the fields in the figure may not correspond to the size that would occupy if the figure was drawn to scale. The same may happen in other figures.

FIG. 21A shows an example of a data block 2100 of 128 bytes comprising a first data portion 2110 of 108 bytes and a second data portion that may store a hash data 2120 of 20 bytes. It's the same example of data block used in the previous examples and implementations although the data block size may vary, for example to match with the size of different L1 cache lines in different processors. In the same way, the sizes of the parts 2110 and 2120 may also vary.

FIG. 21A shows a second example of an implementation using a data block 2130. Data block 2130 may comprise data 2131, like for example instructions, and data fields shown in the figure as ID_HF 2132, ID_KEY 2133, SL 2134 and HASH 2135 that are explained below.

Data 2131 may comprise instructions, for example machine code instructions or bytecode instructions. Data 2131 may also contain other type of data and/or metadata. In the example of FIG. 21 data block 2130 has 128 bytes and data 2131 occupy 101 bytes.

ID_HF data field 2132 is a data field that may contain a unique identifier, for example an integer, that identifies the cryptographic algorithm used to calculate and/or verify the hash data 2135. In the example of FIG. 21 the field ID_HF 2131 may use two bytes.

ID_KEY field 2133 is a field that may contain a unique identifier, for example an integer that identifies a cryptographic key. In the example of FIG. 21 the field ID_KEY 2132 uses 4 bytes allowing to store $255^4$ (4,228,250,625) cryptographic key identifiers, for example using integer identifiers of 4 bytes.

In one implementation, the ID_KEY field does not store the cryptographic keys but an identifier that allows identifying each cryptographic key. For example, the security component may access a memory where cryptographic keys are stored and each cryptographic key may have a unique identifier that identifies it. This allows the security component to access to the cryptographic key specified in the field ID_KEY for using it in the crypto module with the cryptographic algorithm specified in the field ID_HF to compute and/or verify the hash data 2135.

Although $255^4$, that is equivalent to 4,228,250,625, cryptographic key identifiers may seem sufficient, the same was thought years ago about IPv4 addresses composed of four bytes and since then the industry has realized that the need of more IP addresses were necessary. This caused the development of IPv6 addresses using 16 bytes.

In other implementations the field ID_KEY 2133 may use a larger number of bytes, for example 6, 8, 12 or 16 bytes, to store data that uniquely identify each cryptographic key.

Other implementations are possible. For example when the key associated to an ID_KEY is a public cryptographic key, the data block 2130 may have a KEY field instead of a ID_KEY field, and the KEY field may store the public cryptographic key directly instead of data that identifies the key.

SL field 2134 (SECURITY LEVEL) is a field that may be used to indicate the security level of the computer program containing the data block 2130. For example, the field SL may use one byte, where the value 0 corresponds to the lowest security level and the value 255 corresponds to the highest security level.

The field HASH 2135 may store a hash data that may be computed or verified using the cryptographic algorithm identified in data field ID_HF 2132 and the cryptographic key identified in data field ID_KEY 2133.

In one implementation, the hash data 2135 may be calculated and or verified using the cryptographic key and taking as input of the cryptographic algorithm the data 2131, 2132, 2133 and 2134, as indicated by arrow 2136, to prevent these data and data fields to be altered.

FIG. 21B shows one implementation 2150 of data block of 128 bytes, having 64 bytes to store the data 2151, like for example machine code instructions, and 64 bytes (512 bits) to store the hash data 2152, for example using the hashing algorithms SHA512 or HMAC-SHA512 that generate hash data of 512 bits.

FIG. 21B shows also an example of one implementation of a data block 2160 that may uses different formats.

In one implementation, the field ID_CL 2161 may be an identifier for the cache line format and the data block format, and different formats may have different total size and may use different fields of different lengths, for example different cryptographic algorithm that generate different hash data of different lengths.

The ID_CL 2161 data field may be stored in a fixed location, like for example the first two bytes of the data block. In the example 2160 of FIG. 21B the data field ID_CL 2161 is stored in the first two bytes of the data block 2160.

For example, a value 1 in the data field ID_CL 2161 may correspond to a data block 2160 with a total size of 128 bytes, that uses 2 bytes for the data field ID_CL 2161, 2 bytes for the data field ID_HF 2162, 4 bytes for data field ID_KEY 2163, 1 byte for the data field SL 2164, 32 bytes for the data field HASH 2165 that stores the hash data, and 87 bytes of data 2166 that may store, for example, machine code instructions.

In some implementations the value of the data field ID_CL determines other information of the data block, like for example the ID_HF, the ID_KEY and/or the SL fields.

In some implementations the value of the ID_CL data field determines the ID_HF value and there is no need to store the ID_HF information in the data block.

For example, the value 2 in the data field ID_CL may correspond to a data block with a total size of 128 bytes that always uses the HMAC-SHA256 algorithm. The fields in this example may be:

| | |
|---|---|
| ID_CL | 2 bytes |
| ID_KEY | 4 bytes |
| SL | 1 byte |
| HASH | 32 bytes (256 bits to store the hash value with SHA256) |
| DATA | 89 bytes (for example to store machine code instructions) |

FIG. 21C shows an example of one implementation of a data block 2170 that stores a cryptographic key, like for example a public key, in a data block. This way the security component has direct access to the cryptographic key it may use to verify the hash data data stored in a data block In FIG. 21C the elements 2171 ID_CL, 2172 ID_HF, 2173 ID_KEY, 2174 SL, 2175 HASH may have the same use as explained in FIG. 21B. The field 2176 stores the cryptographic key that may be used to generate and/or verify the hash data 2175, for example using as input data the data 2171 that may comprise instructions Hereinafter, different examples and implementations using the Security Level field on processors that use one or more cores are described.

Figure 22:
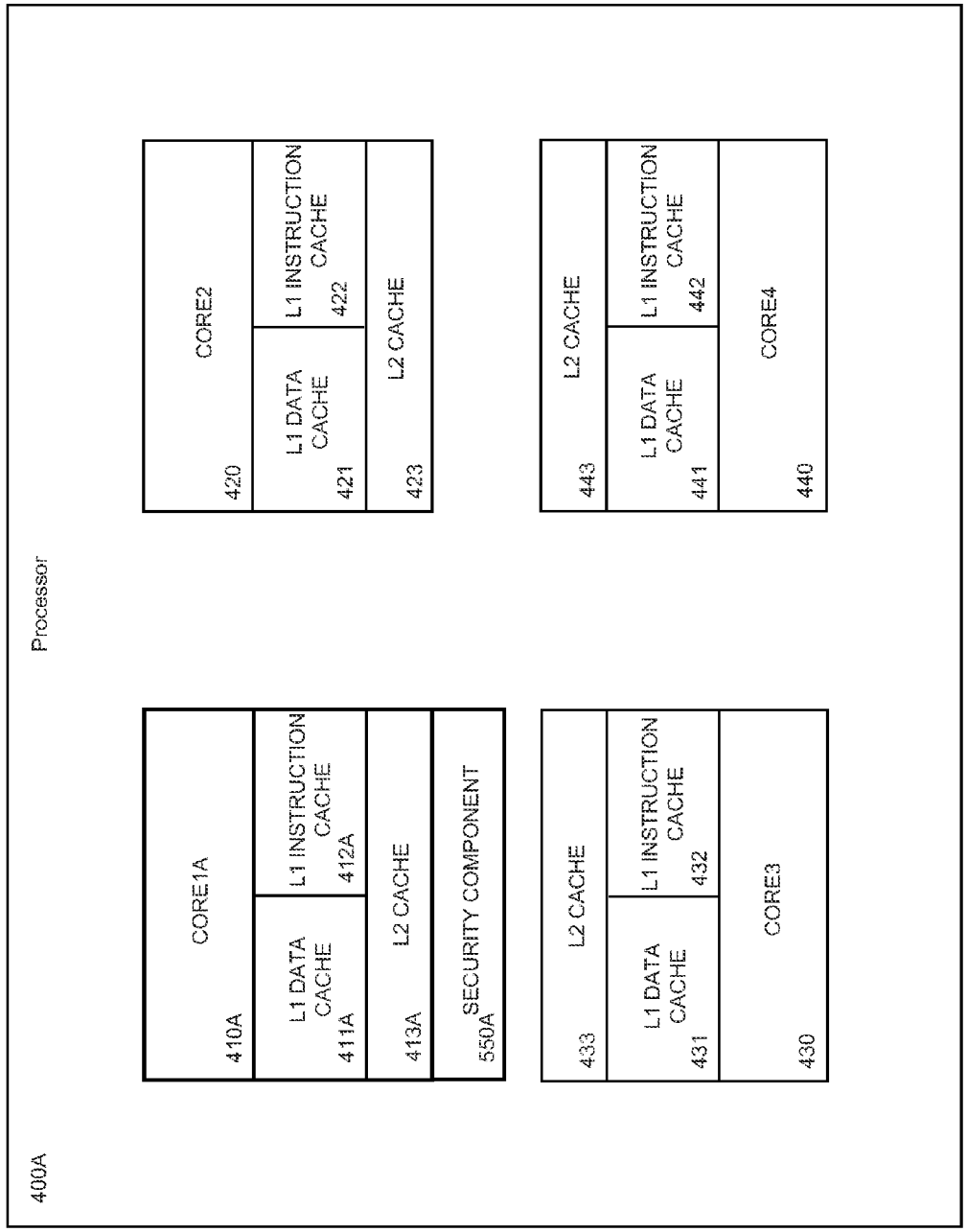
FIG. 22 shows an example of one implementation with a quad core processor with one core having one security component.

FIG. 22 shows an example of an implementation with a processor 400A that comprises four cores like the example of FIG. 4: CORE1A 410A, CORE2 420, CORE3 430 and CORE4 440. Each core comprises an L1 data cache 411A, 421, 431 and 441, respectively, an L1 instruction cache 412A, 422, 432 and 442, respectively, and an L2 cache 413A, 423, 433 and 443, respectively.

In the example of FIG. 22 only CORE 1 has a security component 550A allowing CORE 1 to check that the data blocks are transferred to the L1 data cache or to the L1 instruction cache if they have a correct hash data, as explained above in different implementations.

Hereinafter, the term secure core is used to refer to the cores that may use a security component to calculate and/or to verify the hash data of data blocks stored or going to be stored in the cache lines.

In some implementations the secure cores having a security component and the cores not having a security component (non-secure cores) are similar cores, for example cores that may have the same registers, the same logic unit and the same set of instructions.

In some implementations, the secure core or cores and the non-secure core or cores of a processor execute, or are adapted to execute, the same type of machine code instructions, for example, the secure cores and the non-secure cores may execute, or be adapted to execute, the same set of machine code instructions In some implementations the secure core or cores and the non-secure core or cores of a processor execute, or are adapted to execute, the same executable instructions generated using the same assembly language.

In some implementations the secure core or cores and the non-secure core or cores of a processor have the same instruction set or instruction set architecture (ISA).

In some implementations the secure core or cores and the non-secure core or cores of a processor use the same native data type or the same instructions or the same registers or the same addressing modes or the same memory architecture or the same interrupt handling or the same exception handling.

In some implementations, the secure core or cores and the non-secure core or cores of a processor have the same microarchitecture.

In some implementations secure core or cores and non-secure core or cores of a processor have a different microarchitecture and the same instruction set.

In some implementations, the secure core or cores and the non-secure core or cores of a processor have at least a part of the same microarchitecture, for example the part used to implement or execute the instruction set.

In some implementations, the secure core or cores and the non-secure core or cores of a processor use the same design techniques to implement the instructions set, for example using the same design of logic gates to execute the machine code instructions.

In some implementations, the secure core or cores and the non-secure core or cores of a processor use, or are adapted to use, at least a part of the same design techniques to implement the instructions set, for example using at least a part of the same design of logic gates to execute the machine code instructions.

In some implementations, the secure core or cores and the non-secure core or cores of a processor access or are adapted to access the same main memory, for example using a memory management unit, and execute computer programs stored in the same main memory.

In the example of FIG. 22, CORE1 is a secure core and the other three cores CORE2, CORE3 and CORE4 are non-secure cores.

Figure 23:
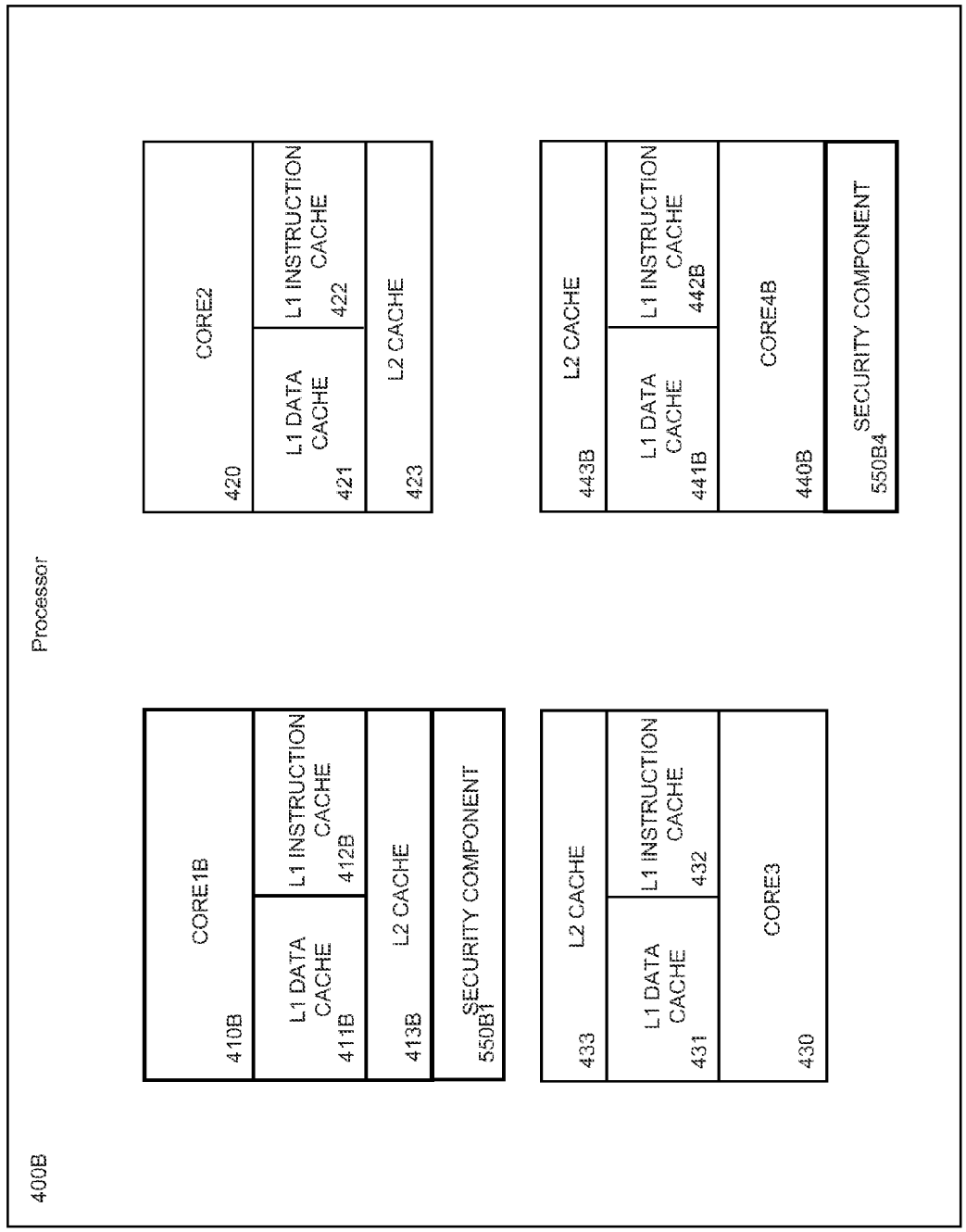
FIG. 23 shows an example of one implementation with a quad core processor with two cores having security components

FIG. 23 shows another example of an implementation with a processor 400B comprising four cores, CORE1B 410B, CORE2 420, CORE3 430 and CORE4B 440B. Each core CORE1B, CORE2, CORE3 and CORE4B comprises a L1 data cache 411B, 421, 431 and 441B, respectively, an L1 instruction cache 412B, 422, 432 and 442B, respectively, and an L2 cache 413B, 423, 433 and 443B, respectively. In the example of FIG. 23, the processor has two secure cores CORE1B and CORE4B, which may use a security component 550B1 and 550B4, respectively.

Figure 24:
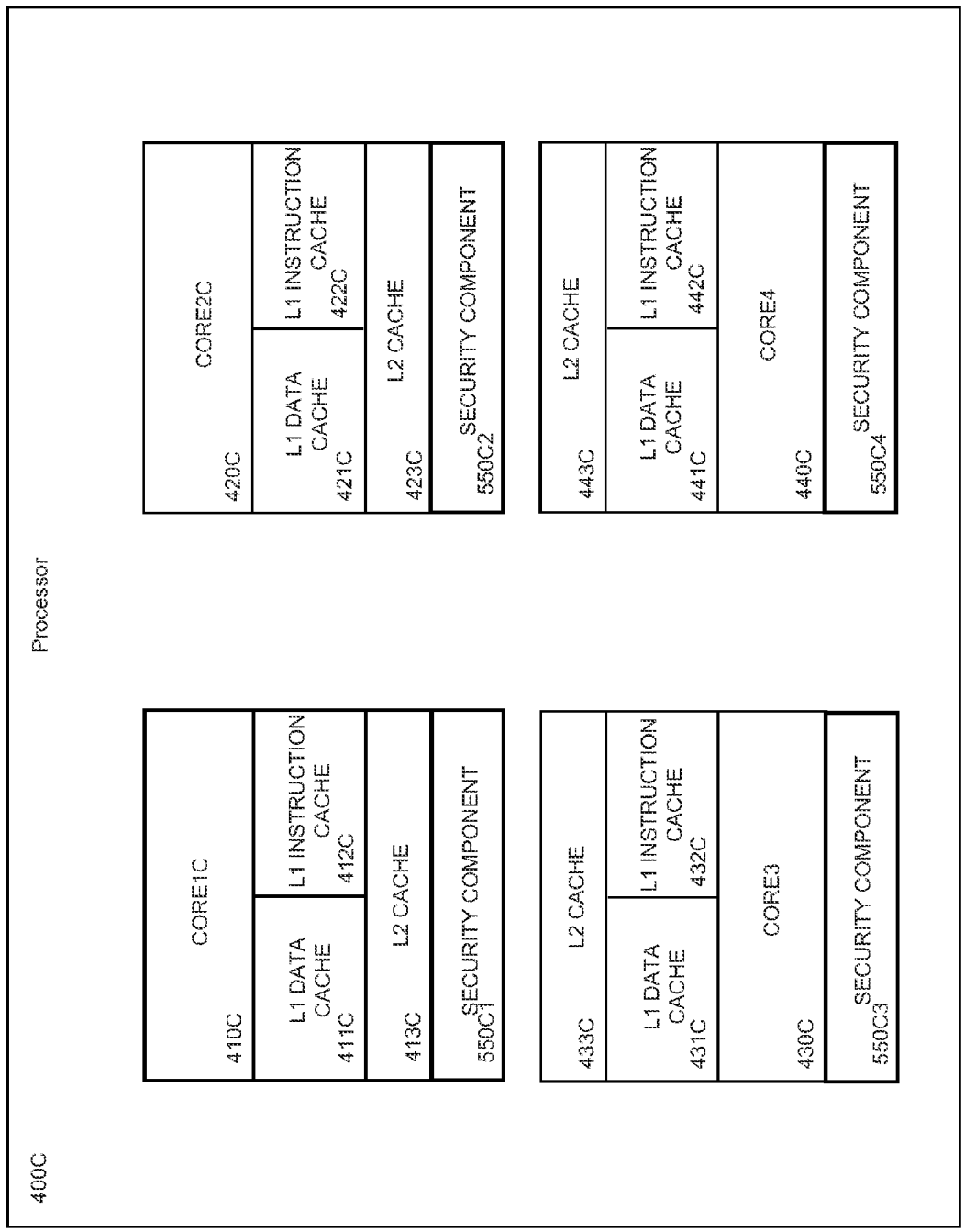
FIG. 24 shows an example of one implementation with a quad core processor with the four cores having security components.

FIG. 24 shows an example of an implementation with a processor 400C with four cores where all processor cores are secure cores. Each of the cores CORE1C 410C, CORE2C 420C, CORE3C 430C and CORE4C 440C may use a security component 550C1, 550C2, 550C3 and 550C4, respectively. Each core CORE1C, CORE2C, CORE3C and CORE4C comprises a L1 data cache 411C, 421C, 431C and 441C, respectively, an L1 instruction cache 412C, 422C, 432C and 442C, respectively, and an L2 cache 413C, 423C, 433C and 443C, respectively.

Figure 25:
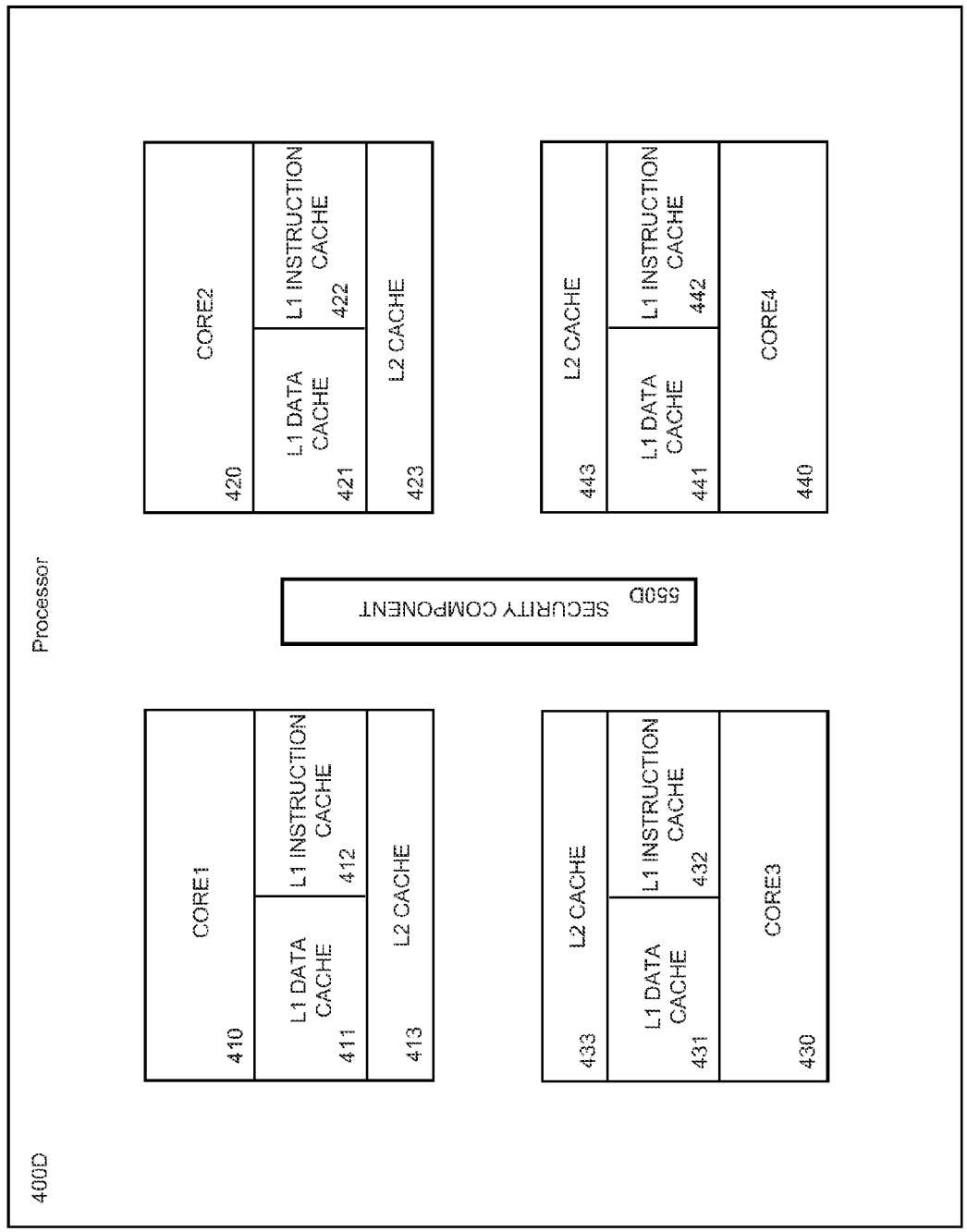
FIG. 25 shows an example of an implementation with a quad core processor and one security component.

FIG. 25 shows an example of an implementation of a processor 400D with four cores comprising one security component 550D that may be used by any of the cores CORE 1, CORE 2, CORE 3 and CORE 4 of the processor 400D

FIGS. 22 through 25 show examples of configurations of processors, but other combinations are possible, for example processors with more or less cores and/or secure cores.

In the examples of FIGS. 22 to 25, each core has its own L2 cache, however, other implementations may use different configurations, for example, several processor cores may share the same L2 cache memory.

In one implementation, each core shown in FIGS. 22 to 25 may use the same cryptographic keys and hash algorithms. In other implementations, each core may use different cryptographic keys and/or different hash algorithms.

Figure 26:
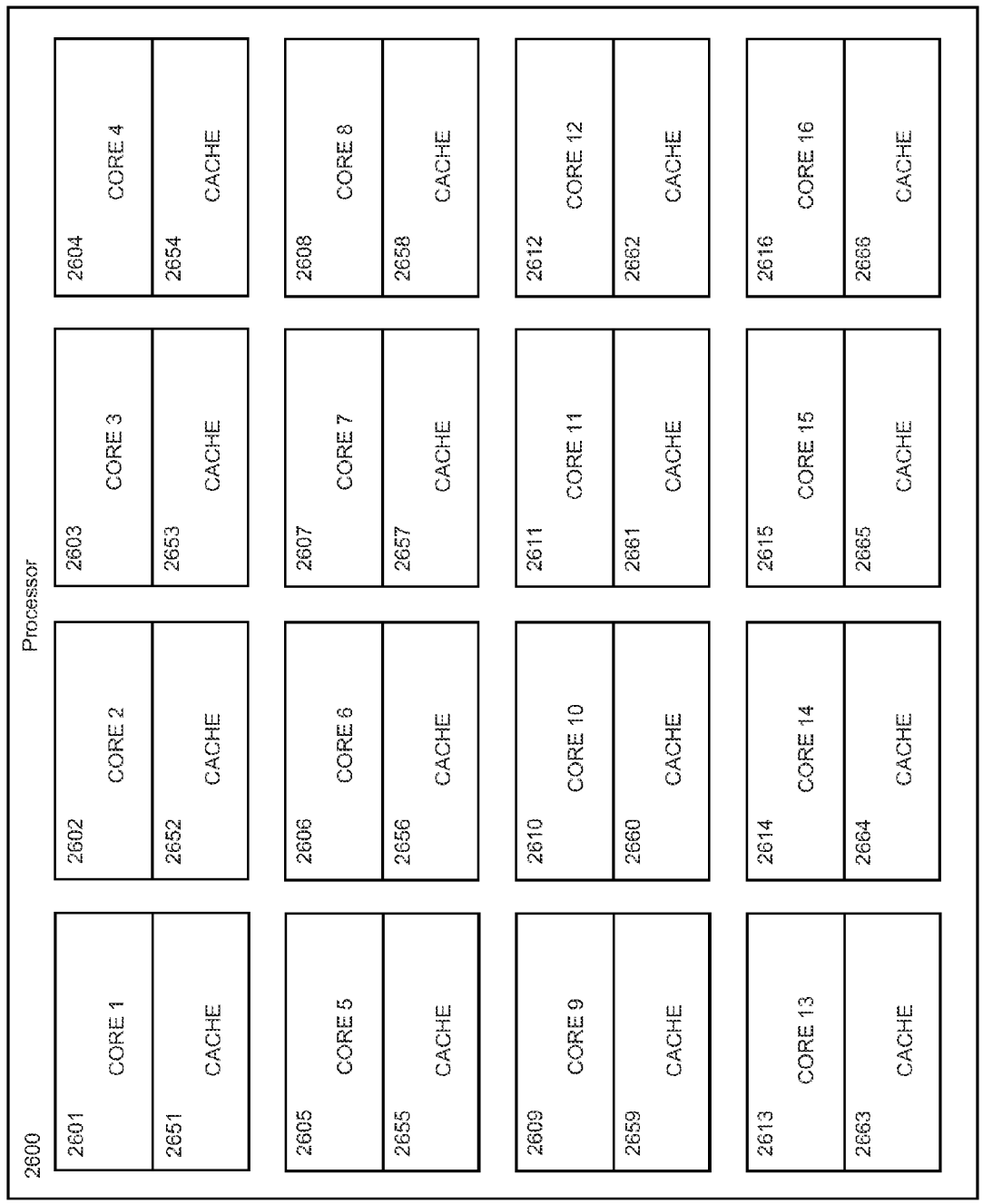
FIG. 26 shows and example of a processor with 16 cores used in some implementations.

FIG. 26 shows an example of an implementation of a processor with 16 cores. The processor 2600 comprises 16 cores; CORE 1 2601, CORE 2 2602, CORE 3 2603, CORE 4 2604, CORE 5 2605, CORE 6 2606, CORE 7 2607, CORE 8 2608, CORE 9 2609, CORE 10 2610, CORE 11 2611, CORE 12 2612, CORE 13 2613, CORE 14 2614, CORE 15 2615 and CORE 16 2616 comprising cache memories 2651, 2652, 2653, 2654, 2655, 2656, 2657, 2658, 2659, 2660, 2661, 2662, 2663, 2664, 2665 and 2666, respectively.

Different processor implementations of FIG. 26 may use a different number of secure cores, as for example 1, 2, 3, 4, 8 or 16 secure cores, or any number of secure cores between 1 and 16.

In another implementation a processor with "n" cores (for example 64 cores) may implement a number of secure cores between 1 and n (for example between 1 and 64 secure cores).

FIG. 26 does not shows the security components and the internal distribution of cache memories for the purpose of simplifying the figure.

Nowadays, the technology trend in processors is to include an ever larger number of cores in processors. Manufacturer's processor companies are designing and implementing increasingly processors with a larger number of cores. For example, AMD with 16 cores processor "Bulldozer", Intel with 48 cores processor "Westmere" or ClearSpeed Technology Ltd with 192 cores processor CSX700.

In some implementations, secure cores may execute programs that may affect the security of a computing device, for example the program or programs used by the computing device to load the operating system like for example the instructions stored in the computing device firmware or the instructions stored in the boot sector of the hard disk ("boot sector level 0"), some functions of the operating system, programs using cryptographic keys and algorithms, programs used to update the operating system, the operating system programs that detects the security level of other programs, antivirus programs and programs for detection and removal of malware programs.

A boot sector is a sector of a hard disk or similar data storage device contains machine code for booting programs (usually, but not necessarily, operating systems) stored in other parts of the disk. On an IBM PC compatible machine, for example, the BIOS selects a boot device, then it copies the first sector from the device (which may be a MBR, VBR or any executable code), to address location 0x7C00. On other systems, the process may be quite different. Since code in the boot sector is executed automatically, boot sectors have historically been a common attack vector for computer viruses.

In some implementations, programs requiring a lower security level may be executed in non-secure cores.

The security of computing device can be improved by restricting the programs that can be executed on secure cores. This may avoid the attack called "Instruction Cache Attack".

The publication "New Results on Instruction Cache Attacks", Onur Arigmez et al, from the book "Cryptographic Hardware and Embedded Systems"—CHES 2010, published by Springer (2010) explains an example of Instruction Cache Attack in which a core executes a first program containing cryptographic algorithms and using cryptographic keys and the attack consist of running in the same core a second spy program that find out the cryptographic keys used by the first program by using cryptoanalysis and analyzing the use of the cache memory.

In some implementations secure cores only execute instructions, for example machine code instructions, which are organized into data blocks that contain a hash data verified by the crypto module. That way the security component can verify the hash data before the core executes the instructions stored in the instruction cache line as explained above in different examples and implementations.

In other implementation each secure core may have assigned a security level, for example 255 may be the maximum security level and 0 may be the minimum security level.

For example, the security level of each core may be fixed at the time of manufacture and the value may be stored in the processor, for example in a memory accessible by the security component of each core.

In one implementation, when a computer program is going to be executed in a computing device that incorporates a processor with secure cores, the computing device determines before executing the program, the security level of the computer program, for example by reading the Security Level (SL) field shown in the examples of FIGS. 21A, 21B and 21C when the program comprises data blocks that have hash data and/or by reading the information from the metadata of the computer program.

In one implementation, the microprocessor checks that the security level indicated by the program is real to avoid, for example, a virus or other program that could affect the security of the computing device to be executed with a high security level higher to attack the computing device. To that end, the computing device may verify the electronic signatures and digital certificates included in the computer program and in its metadata and/or the hash data of data blocks comprising instructions, data and metadata.

In one implementation, when a program does not comprise data blocks or information about its security level that can be verified with the hash data of the data blocks, the processor may assign the security level 0.

Once the computer program security level is determined, the processor and/or operating system may select the core or cores to execute the computer program so that programs having a higher security level may be executed on the secure cores with the highest security level or levels and programs with lower security level may be executed on the secure cores with lower security level or levels or on non secure cores.

In one implementation, the processor may restrict the computer programs running on a certain secure core that has a security level SL1 to run only program in the core with a security level equal or greater than SL1.

In one implementation, the computing device may limit the security level of the computer programs running in the secure cores as well as the computer programs running on non-secure cores.

For example, in one implementation the security levels from 0 to 127 may be used with digital certificates included in the computer program metadata that indicate the security level of a computer program and security levels from 128 to 255 may be used in the computing device with computer programs comprising data blocks.

To eliminate or avoid an attack, the computing device may set a high security level value for all the computer programs allowed to be executed in the computing device for the purpose of preventing a virus and/or other program attacking the computing device or any other program having a security level below a certain value.

For example, if the computing device is configured to run only programs with a security level equal to or greater than 250, the virus or other attacker programs are inhibited from being executed in the secure processor cores. If all cores are secure cores, the virus or attacker program prevented from being executed in the computing device.

In one implementation the processor stores the security level information of each core, for example in a memory in the security component of each core and does not allow to run in the secure cores programs having a lower security level.

FIGS. 27A, 27B, 27C and 27D show examples of data blocks that may be used in some implementations.

Figure 27A:
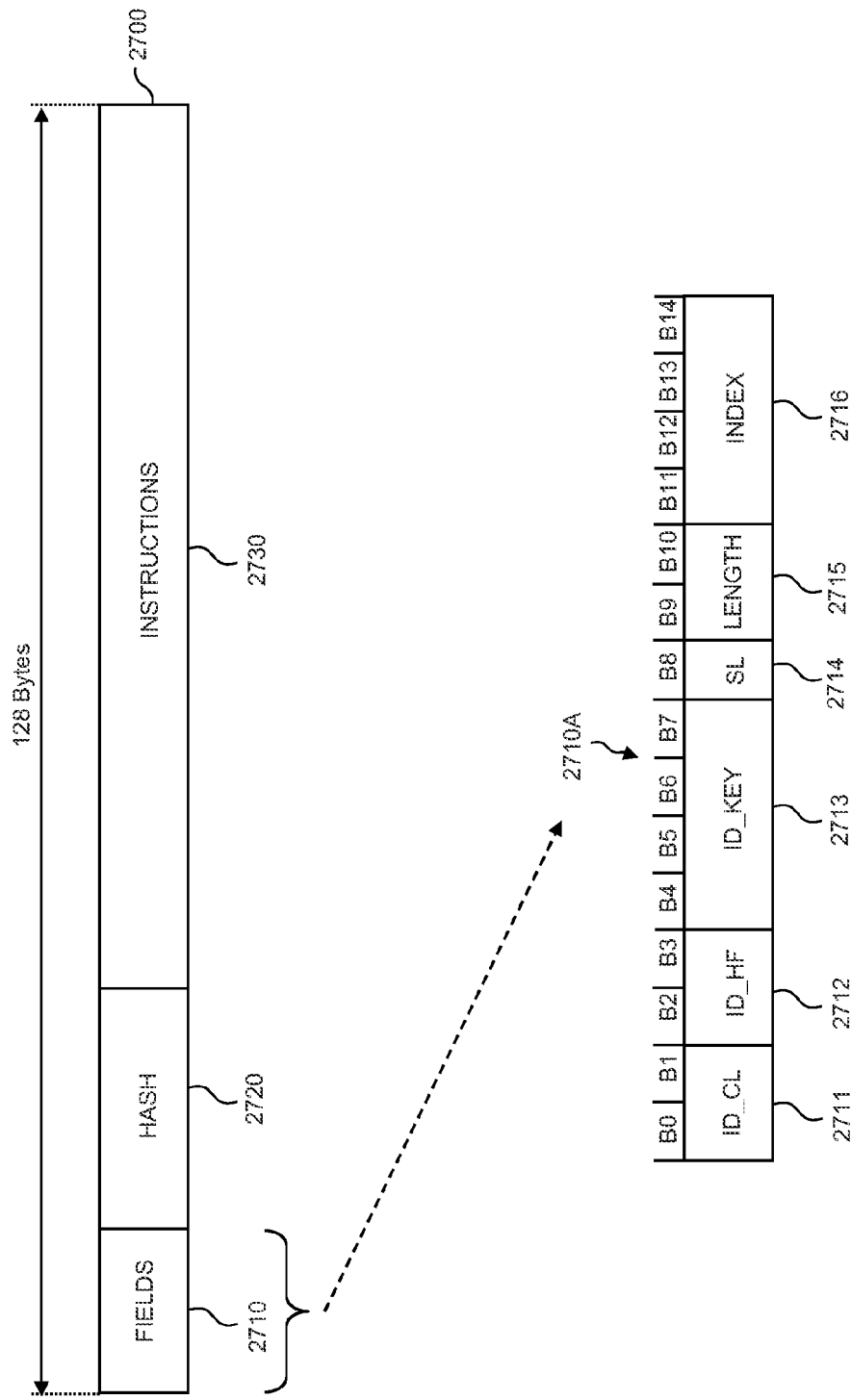
FIGS. 27A and 27B show examples of different cache lines.
Figure 27B:
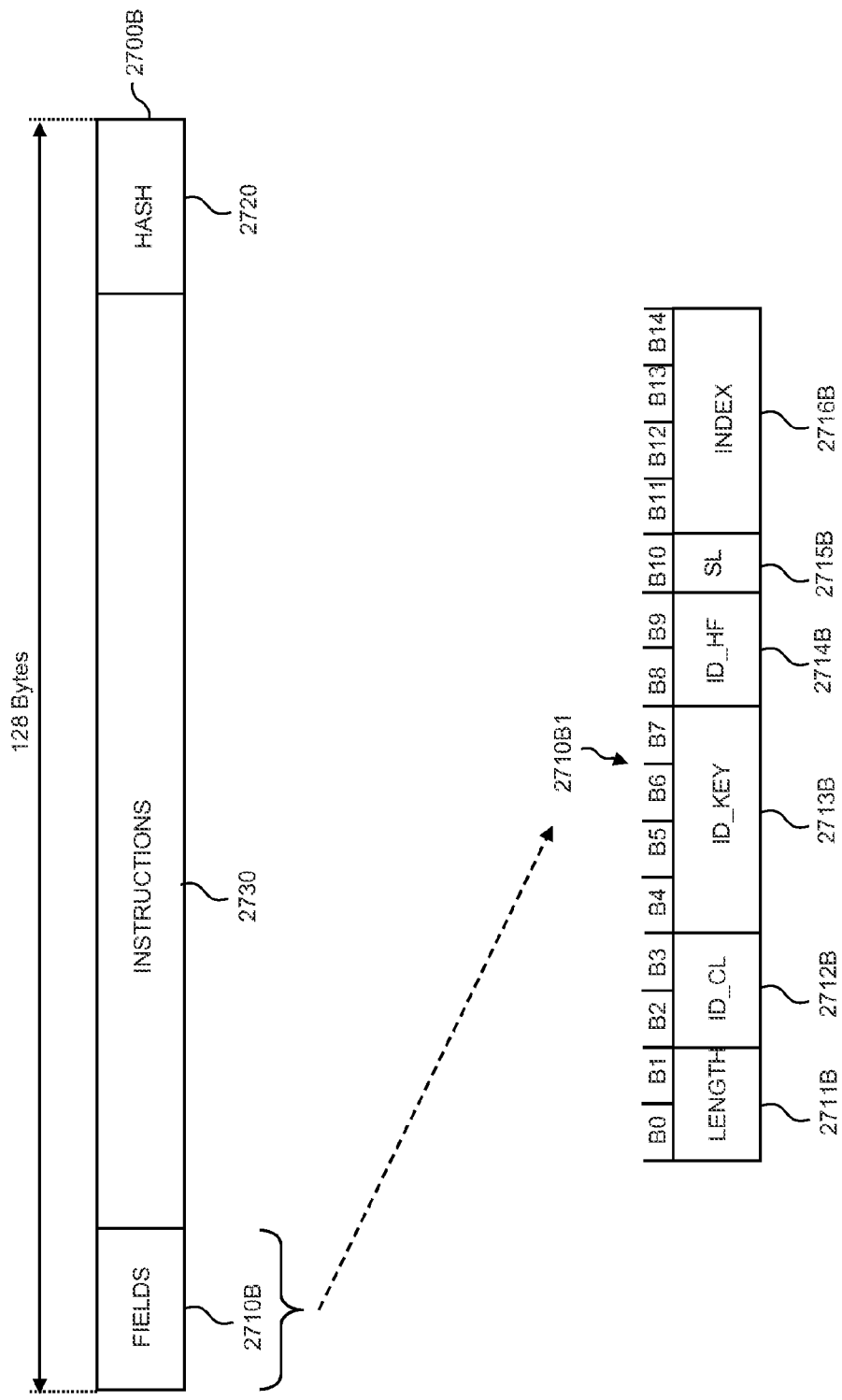
Figure 27C:
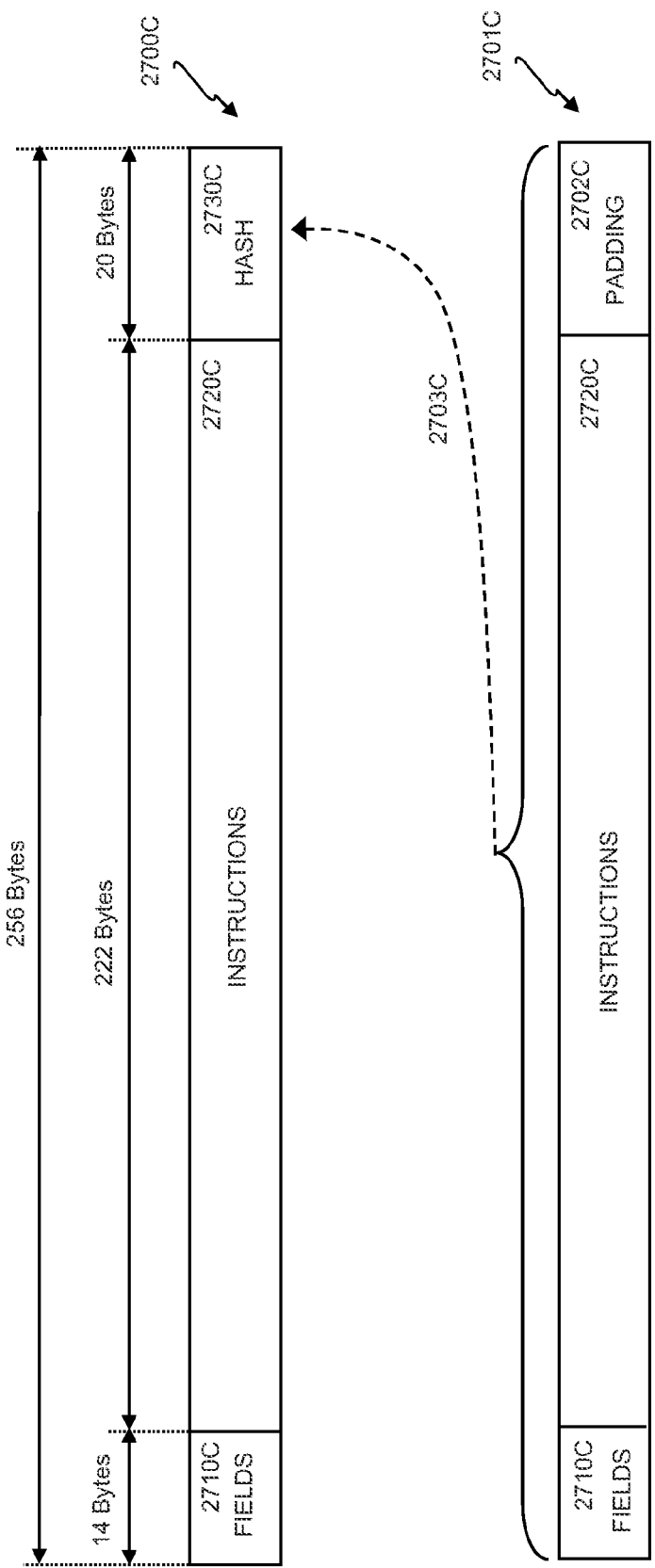
FIGS. 27C and 27D show examples of padding.
Figure 27D:
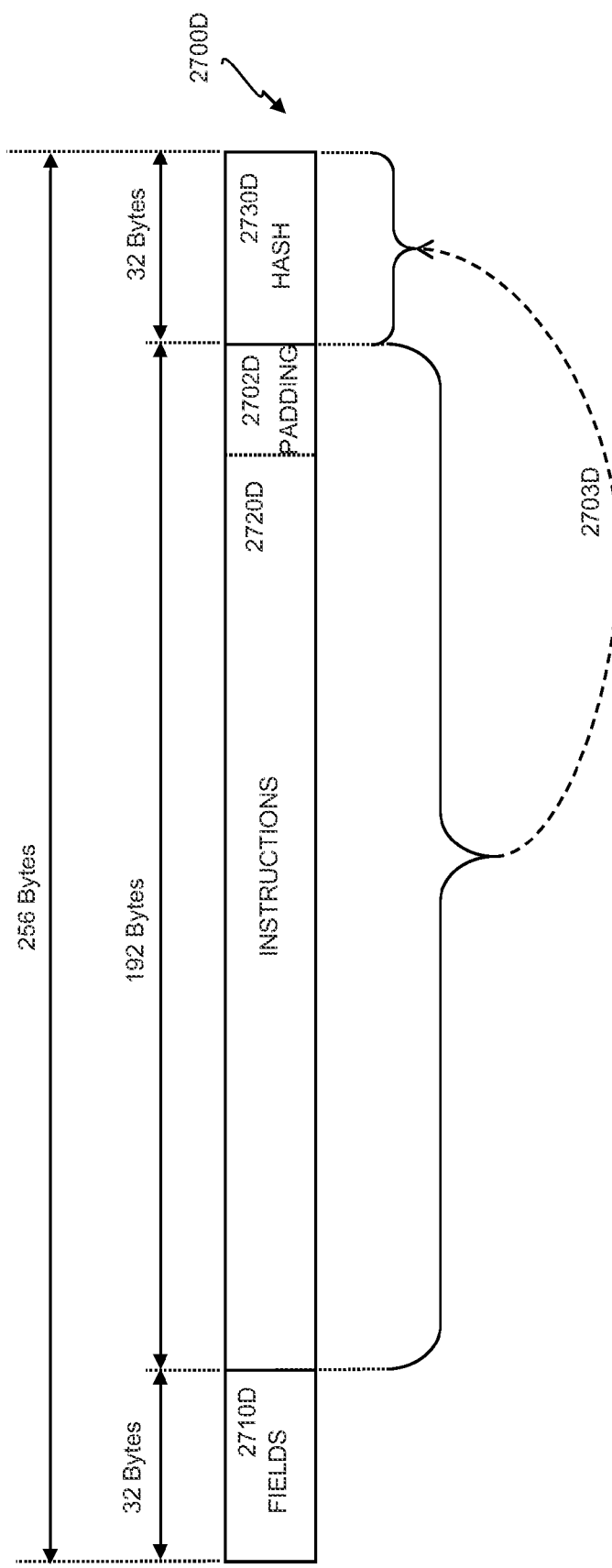

The examples of FIGS. 27A and 27B show data blocks of 128 bytes and the examples of FIGS. 27C and 27D show examples of data blocks of 256 bytes but other implementations are possible, for example with data blocks of 384 bytes, 512 bytes, 1024 bytes, 2048 bytes and others.

In the examples of FIGS. 27A, 27B, 27C, 27D, 28, 29, 30 and 31, the term INSTRUCTIONS is used to refer to the part of the data block that may store instructions, like for example machine code instructions.

The term INSTRUCTIONS is being used to simplify or clarify the explanation, but in some implementations the INSTRUCTIONS part of the data block may store or comprise other data different from instructions, like for example data that may be used by instructions of the computer program stored in the data block or metadata comprising information about the computer program comprising the data blocks. For example, the computer program comprising the data block may be a program similar to the one shown in the FIG. 6B and may comprise a first part with executable instructions, a second part with data and a third part with metadata.

In the examples of FIG. 27A, a data block 2700 of 128 bytes comprises a first data FIELDS 2710, a second data HASH 2720 and a third data INSTRUCTIONS 2730.

The second data HASH 2720 of the data block 2700 may store, for example, a hash value, a cryptographic hash value or a digital signature computed taking as input of the cryptographic algorithm at least the third data INSTRUCTIONS 2730.

As explained before, the cryptographic algorithm may use a cryptographic key, for example a secret key or a public key. In some implementations, the cryptographic algorithm may use as input also the first data FIELDS 2710, for example the input may be the first data FIELD concatenated with the third data INSTRUCTIONS and concatenated with some padding data that may depend on the cryptographic algorithm. Padding is explained latter with more detail in FIGS. 27C and 27D.

In the examples shown in FIGS. 27A, 28, 29 and 30 the data blocks are shown storing first the FIELDS data, represented with the name "FIELDS" or the capital letter "F". The second data in the data blocks is the HASH data, represented with the name "HASH" or the capital letter "H" and the third data is the INSTRUCTIONS data. But some implementations may use other order like the example of FIG. 27B storing first the FIELDS data, second the INSTRUCTIONS data and third the HASH data. Other implementations with the FIELDS data, the HASH data and the INSTRUCTIONS data in different order are also possible.

In one implementation, the data FIELDS 2710 may comprise the data fields shown in the element 2710A in FIG. 27A.

In FIG. 27A, the data fields ID_CL 2711, ID_HF 2712, ID_KEY 2713 and SL 2714 shown in the element 2710A may have the same use explained in some implementations and examples of element 2160 in FIG. 21B that are summarized below.

The field ID_CL 2711 may be an identifier for the cache line format and the data block format, and different formats may have different size and may use different fields of different lengths, for example using different cryptographic algorithm to generate or verify the HASH data. The ID_CL 2711 data field may be stored in a fixed location, like for example the first two bytes (B0 and B1) of the data block 2700.

ID_HF data field 2712 may store a unique identifier, for example an integer that identifies the cryptographic algorithm used to compute and/or verify the hash data 2720. In the example of the FIG. 27 the field ID_CA 2712 may use two bytes, corresponding to bytes B2 and B3 of the data block 2700.

ID_KEY data field 2713 may store a unique identifier, for example an integer that identifies a cryptographic key. In the example of FIG. 27 the field ID_KEY 2713 uses 4 bytes, corresponding to bytes B4, B5, B6 and B7 of the data block 2700, capable to store $255^4$ (4,228,250,625) cryptographic key identifiers.

In other implementations the data field ID_KEY 2713 may use a larger number of bytes, for example 6, 8, 12 or 16 bytes, to store data that uniquely identify each cryptographic key.

The data field SL 2714 (Security Level) may be used to store the security level of the computer program containing the data block 2700. For example, the field SL may use one byte, like the byte B8 of the data block 2700, where the value 0 corresponds to the lowest security level and the value 255 corresponds to the highest security level.

In FIG. 27A, the element 2710A may comprise other data fields indicated as data field LENGTH 2715 and data field INDEX 2716.

The data field LENGTH 2715 may be used to store the length of the data block 2700. In one implementation the length is stored measured in bytes. For example, the data field LENGTH may store the values 128, 256 or 512 corresponding to data blocks of 128 bytes, 256 bytes and 512 bytes, respectively In the example of FIG. 27A the data field LENGTH uses two bytes B9 and B0 to store the length of the data block in bytes but other implementation are possible.

In some implementations the data field LENGTH may use only one byte and/or store the length of the data block 2700 in units of 16 bytes. For example, the data field LENGTH may store the values 8, 16 or 32 corresponding to data blocks of 128 bytes, 256 bytes and 512 bytes, respectively.

In some implementations, the data field INDEX 2716 may be used to avoid a security attack consisting in changing the order of the data blocks of a computer program. A hacker could change the order of the data blocks of a computer program to make a jump instruction go to to a different data block inside the program and execute machine code in an order that is not the normal order of execution. This attack may crash the program or the computer.

In one implementation, the data field INDEX may store a value that depends on the physical memory address or the virtual memory address of the data block 2700 within a computer program when at least a part of the computer program that comprises the data block 2700 is stored in the main memory of a computer.

For example, the data field INDEX may store the virtual memory address of the first byte B0 of the data block 2700 where the byte B0 of the data block 2700 is going to be stored.

As explained before, the memory address of each cache line is calculated based on the size of the cache line. For example in a 64-byte cache line the last 6 bits of the memory address of the cache line are zero. In a 128-byte cache line, the last 7 bits of the memory address of each cache line are zero. In general, in a cache line a size of $2^n$ bits, the last n bits (the lower n bits) of the address of the cache line are zero.

In some implementations, the data field INDEX may only store the most significant bytes of the memory address or the virtual memory address that will be used to store the data block 2700. For example, in a data block of 128 bytes the data field INDEX may not store the last 7 bits that may be zero and may store all the bits of the memory address except the last 7 bits.

In some implementations, the security component may verify that the physical memory address or the virtual memory address stored in the data field INDEX corresponds to the physical memory address or the virtual memory address in main memory storing the data block 2700.

In one implementation, the data field INDEX may store sequence data that corresponds to the order of the data blocks in the computer program comprising data blocks like the data block 2700. In some implementations the operating system of the computing device executing the computer program verifies that the order of the data blocks is correct before loading at least a part of the computer program into the main memory, for example each time a page or part of the computer program is loaded into main memory from a disk drive.

For example, the program loader of the operating system may detect that the computer program stores instructions, data or metadata in data blocks and may verify the sequence of the data blocks of all the data blocks of the computer program and/or only verify the order of the data blocks of the computer program that are being stored or going to be stored in the main memory, for example the data blocks going to be stored in a 4K or 8K memory page in main memory.

In the example of FIG. 27A, the data field INDEX uses 4 bytes indicated as B11, B12, B13 and B14, but other implementations are possible using more or less bytes to store the data field INDEX.

In the examples of FIG. 27B, a data block 2700B of 128 bytes comprises a first data FIELDS 2710, a second data INSTRUCTIONS 2730 and a third data HASH 2720. For example, the data block 2700B may comprise the same parts of data than the block 2700 of FIG. 27A but in a different order.

In some implementations, the first data FIELDS 2710B may comprise the data fields shown in the element 2710B1 in FIG. 27B.

In FIG. 27B, the data fields LENGTH 2711B, ID_CL 2712B, ID_KEY 2713B, ID_HF 2714B, SL 2715B and INDEX 2716B shown in the element 2710B may have the same use explained in FIG. 27A, but the order of the fields is different.

Figure 28:
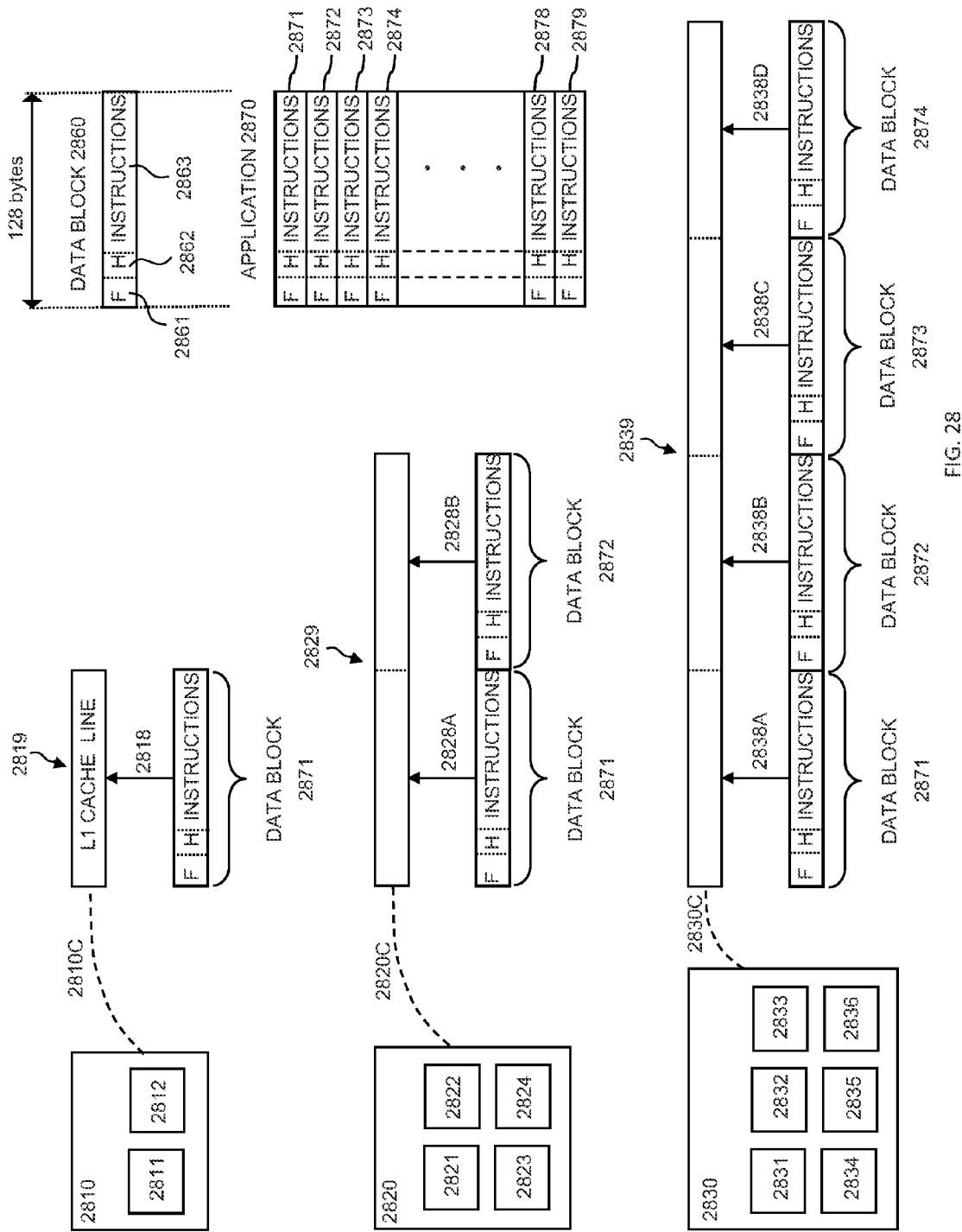
FIG. 28 shows implementations of processors having cores with different cache line length in bytes that may execute the same computer program application.
Figure 29:
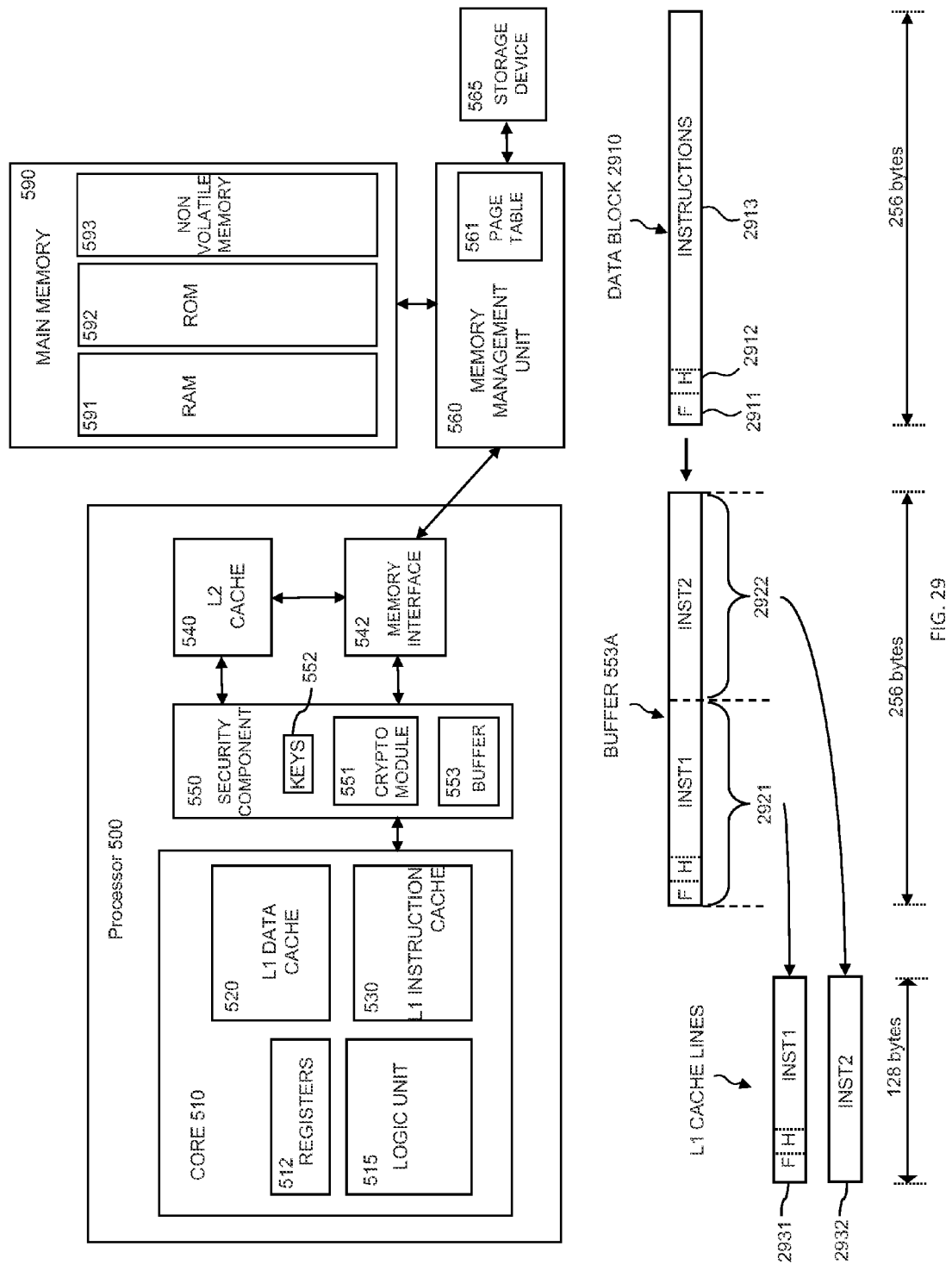
FIG. 29 shows an implementation of a processor having at least one core that may execute computer program applications with data blocks having a length in bytes bigger than the length in bytes of the cache lines of the processor's cores.

In the example of FIG. 27B, the data field LENGTH occupies the first two bits B0 and B1 of the FIELD data 2710B1, this may be useful in some implementations that are explained in FIGS. 28 and 29.

In some implementations the cryptographic algorithms, like for example a hash function, a cryptographic hash function, a digital signature and/or other cryptographic algorithms may add padding data to make the total length of the message or data that is the input of the cryptographic algorithm a multiple of certain number of bits.

For example, SHA-224 and SHA-256 are hashing functions that take as input of the functions messages or data with a total length in bits that is a multiple of 512 bits.

SHA-384 and SHA-512 are hashing functions that take as input of the functions messages or data with a total length in bits that is a multiple of 1024 bits.

Other hash functions like SHA-1, SHA-2 and MD5 take as input of the functions messages or data with a total length in bits that is a multiple of 512 bits.

In some implementations the cryptographic algorithm may take as input message or data with a total length that is a multiple of other certain number of bits, like for example a multiple of 128 bits, 256 bits, 384 bits or other number of bits.

In some implementations the padding data may depend on the graphic algorithm.

RFC 2104 "HMAC: Keyed-Hashing for Message Authentication", by H. Krawczyk et. al. explains how to add padding data when using the HMAC algorithm with SHA-1 (HMCA-SHA1), MD5 (HMAC-MD5) and RIPEMD (HMAC-RIPEMD) hash functions.

RFC 6234 "US Secure Hash Algorithms (SHA ans SHA-based HMAC and HKDF)", by D. Eastlake Huawei et. al. explains in section "4. Message Padding and Parsing" how to add padding data when using the HMAC and/or the HKDF with SHA-224, SHA-256, SHA-384 and SHA-512.

FIGS. 27C and 27D show examples of implementations of data blocks that may use padding.

In the example of FIG. 27C the padding data is not stored in the data block while in the example of FIG. 27D the padding data may be stored in the data block.

FIG. 27C shows an example of a data block 2700C with a total length in bytes of 256 bytes. The data block 2700C comprises a first data FIELDS 2710C with a length of 14 bytes, a second data INSTRUCTIONS 2720C with a length of 222 bytes and a third data HASH 2730C with a length of 20 bytes.

In the example of FIG. 27C the hash data is computed or calculated taking as input of the cryptographic algorithm at least the FIELDS data 2710C and the INSTRUCTION data 2720C. The total length of the FIELDs data 2710C plus the INSTRUCTION data 2720C is 14 bytes+222 bytes=236 bytes.

The element 2701C in FIG. 27C shows an example of how to add padding data 2702C to make the total length of element 2701C a multiple of 512 bits (total length of 2701C=256 bytes=2048 bits=8×512 bits).

The data 2701C may be used as input for a cryptographic algorithm that takes as input a message or data with a total length in bits that is a multiple of 512 bits.

In some implementations the security component may add the padding data to some parts of the data block to verify the hash data.

Similarly, the development tool used to add hash data to the data blocks, like for example a compiler, may add the padding data to compute and store the hash data.

FIG. 27D shows an example of a data block 2700D where the padding data 2702D is stored inside the data block.

The data block 2700D comprises a first data FIELDS 2710D with a length of 32 bytes, a second data INSTRUCTIONS 2720D a third data PADDING 2702D and a fourth data HASH 2730D with a length of 32 bytes. The total length of second data INSTRUCTIONS and third data PADDING is 192 bytes=1536 bits that is a multiple of 512 bits (3×512 bits=1536 bits).

The PADDING data 2702D may be used, for example, when there are some machine code instructions that require more bytes than the free bytes not used in the INSTRUCTION data. In this case these machine code instructions may be replaced by jump instruction followed by padding data.

For example, if there are 180 bytes storing machine code instructions and only 12 bytes free to store more instructions in the data block, and we want to add the following two instructions, represented in a pseudocode assembly language:

Load r2, data1 (6 bytes)
Jump address2 (8 bytes)

If the Load instruction requires 6 bytes and the Jump instructions requires 8 bytes, the total memory needed to store the two instructions in the data block is 14 bytes. As we have only 12 bytes free the data block may store the following:

Jump address2 (8 bytes)
Padding (4 bytes)

Where address2 may be a virtual memory address in the computing device storing the "Load r2, data1" instruction, for example in the first bytes of the INSTRUCTIONS data in another data block of the same computer program.

In the example of FIG. 27D the HASH data 2730D may be computed using the HMAC-SHA256 that generates a hash data of 256 bits (32 bytes) and takes as input a data that is a multiple of 512 bits. In this case the total length of the INSTRUCTION data and the PADDING data is 1536 bits (192 bytes) that is a multiple of 512 bits.

In some implementations the HASH data may be computed or calculated taking as input of the cryptographic algorithm at least the FIELDS data and the INSTRUCTION data, as indicated with the dashed line 2703C in the example of FIG. 27C.

In some implementations the HASH data may be computed or calculated taking as input of the cryptographic algorithm at least the INSTRUCTION data, as indicated with the dashed line 2703D in the example of 27D.

FIGS. 28 and 29 show examples of implementations where the size or length in bytes of the cache line of a core or cores may be different than the size or length in bytes of the data blocks of the computer program application that may be executed in the core or cores.

In some implementations, the cache line of the core may be bigger than the data blocks of the computer program application. FIG. 28 is used to explain examples of these implementations.

In some implementations the cache line of the core may be smaller than the data blocks of the computer program application. FIG. 29 is used to explain examples of these implementations.

Today, cache lines of 64 or 128 bytes are common, but new processors may have cores with cache lines of 256 bytes, 512 bytes, 1024 bytes or more. Also new processors may have more cores or many more cores with smaller cache lines.

Some implementations may execute a computer program application comprising data blocks having a first length in bytes in core or cores having a security component and cache lines with a second length in bytes. In some implementations the first length in bytes and the second length in bytes may be different.

In some implementations a processor has at least one core with a security component and is capable of executing computer programs with data blocks with a length in bytes different than the length in bytes of the cache lines of the at least one core with the security component and the processor is capable to execute computer programs developed before the time the processor was designed and/or manufactured and/or computer program applications developed after the time the processor was designed and/or manufactured, thus avoiding compatibility and migrations problems.

For example, new computing devices using processors with a new design may be capable of executing old computer program applications (e.g. computer program comprising data blocks with a length in bytes smaller than the cache lines of the cores of the processor having a security component) and old computing devices using old processors are capable of executing new computer program (e.g. computer programs comprising data blocks with a length in bytes bigger than the length of the cache lines of the cores of the processor having a security component).

In some implementations, a first computing device and a second computing device are connected in a data network, the first computing device comprising at least a first processor with at least a first core having a first security component, the at least first core using cache lines of a first length in bytes, and the first computing device is capable of executing a first computer program comprising data blocks with HASH data, the data block having the same first length in bytes than the cache lines of the at least first core, and the security component is capable of verifying the HASH data of data blocks comprising instructions of the first computer program before the instructions of the data blocks are executed in the at least one core having the first security component, the second computing device comprising at least a second processor with at least a second core having a second security component, the at least a second core using cache lines of a second length in bytes that is different than the first length in bytes, and the second computing device is capable of executing the same first computer program comprising data blocks with a HASH data, the data blocks having the same first size or length in bytes than the cache lines of the at least first core of the at least first processor of the first computing device, and the second security component is capable of verifying the HASH data of data blocks comprising instructions of the first computer program before the instructions of the data block are executed in the at least second core of the second processor in the second computing device.

As explained before, in some implementations the HASH data may be a hash value, a cryptographic hash value, a digital signature or other data computed using a cryptographic algorithm, where the cryptographic algorithm may use one or more cryptographic keys, like for example a secret key, a private key and/or a public key.

In some implementations the data network may comprise one or more networks, like for example a local area network, a wide area network, the Internet network, a network comprising mobile nodes like for example 3G or 4G network, and other networks and/or sub networks.

FIG. 28 shows examples of different processors having cores with cache lines of 128 bytes, 256 bytes and 512 bytes capable of executing a computer program application 2870 comprising data blocks of 128 bytes comprising HASH data.

FIG. 28 shows processors 2810, 2810 and 2830 that may have cores that use cache lines of 128 bytes, 256 bytes and 512 bytes, respectively. The processors are shown in FIG. 28 as blocks comprising cores without any detail to simplify the explanation. The processors of FIG. 28 may be, for example, any of the processors explained before in previous figures and may comprise at least a part or all of the components explained before, like for example a L1 instruction cache and a L1 data cache.

The first processor 2810 may have two cores 2811 and 2812 that may use L1 cache lines like the cache line 2819 with a length of 128 bytes. The dashed line 2810C indicates that the L1 cache line 2819 is a L1 cache line of one of the cores of the processor 2810 having a security component, for example a cache line of the L1 instruction cache of the core 2812 having a security component.

The second processor 2820 may have four cores 2821, 2822, 2823 and 2824 that uses L1 cache lines like the cache line 2829 with a length of 256 bytes. The dashed line 2820C indicates that the L1 cache line 2829 is a L1 cache line of one of the cores of the processor 2820 having a security component, for example a cache line of the L1 instruction cache of the core 2822 having a security component.

The third processor 2830 may have six cores 2831, 2832, 2833, 2834, 2835 and 2836 that use L1 cache lines like the cache line 2839 with a length of 512 bytes. The dashed line 2830C indicates that the L1 cache line 2839 is a L1 cache line of one of the cores of the processor 2830 having a security component, for example a cache line of the L1 instruction cache of the core 2833 having a security component.

Other implementations may use different processors with a different number of cores and/or secure cores and having different cache line length.

In FIG. 28, a computer program application 2870 comprises data blocks of 128 bytes to store their instructions, data and/or metadata.

In one implementation, the data blocks of the program application 2870 may have the format shown in the element 2860 of FIG. 28.

Data block 2860 has a length of 128 bytes and comprises a first data FIELDS 2861 indicated with the capital letter "F", a second data HASH 2862 indicated with the capital letter "H" and a third data INSTRUCTIONS 2863.

In some implementations, the parts of the data block 2860 may be the same parts explained in different implementations of FIGS. 27A, 27B, 27C and 27C For simplicity, in the elements of FIGS. 28 and 29, the first data FIELDS is indicated with the capital letter "F" and the data field HASH is indicated with the capital letter "H".

The computer program application 2870 may comprise data blocks with the format of the data block 2860.

FIG. 28 shows the first four data blocks 2871, 2872, 2873, 2874 and the last two data blocks 2878 and 2879 of the computer program application 2870. Each of these data blocks are shown with an "F" indicating the FIELDS data field, and "H" indicating the HASH data field and an INSTRUCTIONS data field that as explained before may comprise instructions, data or metadata.

In some implementations, the size of the computer program application 2870 may be more than one MB or more than one GB. FIG. 28 only shows some data blocks of the computer program application 2870 for simplicity.

The examples of FIG. 28 are used to explain some implementations that allow the processors 2810, 2820, and 2830 having cores with cache lines with a length of 128 bytes, 256 bytes and 512 bytes, respectively, to execute the computer program 2870 comprising data blocks of 128 bytes.

In the first processor 2810 having two cores 2811 and 2812 with cache lines of 128 bytes the process to execute the computer program application 2870 comprising data blocks of 128 bytes is the same explained in previous figures because the length in bytes of the data blocks of the computer program application 2870 is the same that the size of the cache lines of the cores 2811 and 2812. The arrow 2818 represents the process of storing one data block of the computer program application 2870, for example data block 2871, in one cache line 2819 of one of the cores 2811 or 2812 that has a security component.

As explained before, at least one core with a security component where one data block is stored or going to be stored in one cache line may verify that the HASH data "H" of the data block is correct before allowing the at least one core to execute the instructions stored in the data block, for example using the SECURE BIT as explained before or not storing the data block in the cache line if the HASH data is not correct.

The second processor 2820 has four cores 2821, 2822, 2823 and 2824 having cache lines of 256 bytes and the process to verify the HASH data fields of the data blocks of the computer program 2870 is different from the process explained in processor 2810 because the length in bytes of the data blocks of the computer application 2870 is 128 bytes that is a different value than the 256 bytes length of the cache lines of the cores.

The arrows 2828A and 2828B represent the process of storing two data blocks of the computer program application 2870, for example data blocks 2871 and 2872, in one cache line 2829 of at least one of the cores of the processor 2820 having a security component. The cache line 2829 has a length of 256 bytes and is capable of to store two data blocks of 128 bytes.

The process to verify the HASH data fields of the data blocks 2871 and 2872 in the security component of the at least one core of the processor 2820 is different because two HASH data corresponding to data blocks 2871 and 2872 may be verified before the security component allows the at least one core to execute the instruction stored in data block 2871 and/or data block 2872.

In some implementations, to know the size of the data blocks 2871 and 2872 stored or going to be stored in the cache line 2829, the security component may read some of the data fields inside the FIELDS first data (indicated with the capital letter F of the first data block 2871, like for example the data field ID_CL and/or the data field LENGTH explained before in FIGS. 27A and 27B.

In some implementations, the ID_CL data field is stored in the first bits of the data blocks, for example using Litle Indian or Big Indian bit order, and the ID_CL data data field determines the format of the data block.

For example, the security component may use the value stored in the data field ID_CL to determine the size or length in bytes of the data block and/or in which bits in the data block is stored the LENGTH data field that indicates the size or length in bytes of the data blocks. The security component may determine the length in bytes of the first data block 2871 by reading the ID_CL data field and/or the LENGTH data field.

In some implementations, the length in bytes of a data block may be determined by the security component by reading the value of the ID_CL data field and searching the format associated with this value in a data block format table stored in a memory inside the security component, for example a ROM memory or a FLASH memory. In some implementations, the data block format table may have an additional cache memory that stores the data most recently used from the data block format table to speed the memory access.

In some implementations the first bytes of the cache line are used to store the LENGTH data field of the data block, for example using the first two bytes to store the length of the data block in byte units like the example 2710B in FIG. 27B. The use of a LENGTH data field in the first bytes of the cache line may be faster because it allows the security component to determine the length of the data block directly reading the bytes of the LENGTH data field without making a search in the data block format table.

In some implementations, the security component calculates the number N of data blocks stored or being stored in the cache line by dividing the length in bytes of the cache line by the length in bytes of the first data block stored or going to be stored in the cache line.

In some implementation the security component verifies the HASH data field of each of the N data blocks and after verify that the HASH value is correct in all the N data blocks, the security component allows the core to execute any instruction in the N data blocks, for example executing the instructions after the data blocks are transferred to the cache line.

In some implementations, the security component may use a SECURE BIT associated with the cache line storing the N data blocks to indicate that the N HASH data of the N data blocks stored in the cache line are correct, for example by using the value 1 to indicate that the N HASH data are correct and the value 0 to indicate that the N HASH data are not correct or are not still verified and the core is only allowed to execute the instructions in the cache line when the SECURE BIT indicates that the N HASH data are correct.

In some implementations, the security component verifies that the N HASH data of the N data blocks are correct before storing the N data blocks in the cache line, for example storing the data blocks in a buffer memory (not shown in FIG. 28) inside the security component and verifying the N HASH data before storing the data blocks in the cache line.

In the example of processor 2820 at least one core having a security component and cache lines of 256 bytes is capable of determine that the size of the two data blocks 2871 and 2872 is 128 bytes each and determines the number of data blocks N by dividing 256 bytes/128 bytes=2 data blocks. The security component then verifies the HASH data of the two data blocks 2871 and 2872 before allowing the at least one core having a security component to execute instructions stored in data blocks 2871 and 2872.

The third processor 2830 has six cores 2831, 2832, 2833, 2834, 2835 and 2836 having cache lines of 512 bytes. The arrows 2838A, 2838B, 2838C and 2838D represents the process of storing four data blocks of 128 bytes of the computer program 2870, for example data blocks 2871, 2872, 2873 and 2874, in one cache line 2839 of 512 bytes in the at least one of the cores of the processor 2830 having a security component.

In some implementations the third processor 2830 may use a process to verify the HASH data of the data blocks that is similar to the process explained in processor 2820.

In the example of processor 2830 at least one core having a security component and cache lines of 512 bytes is capable of to determine that size of the four data blocks 2871, 2872, 2873 and 2874 is 128 bytes each and determines the number of data blocks N by dividing 512 bytes/128 bytes=4 data blocks. The security component then verifies the HASH data of the four data blocks before allowing the at least one core having a security component to execute the instructions stored in any of the data blocks 2871, 2872, 2873 and 2874.

In some implementations, a processor having at least one core with a security component with cache lines of a size or length of X bytes may execute instructions of a computer program applications comprising data blocks with a size or length in bytes that is double than X, triple than X, four times X or N times X, where N is a positive integer number.

FIG. 29 shows an example of an implementation where a processor having at least one core with a security component and cache lines of 128 bytes is capable of executing instructions of a computer program application comprising data blocks of 256 bytes.

FIG. 29 shows a processor 500 with only one core 510 but other implementations may use different processors with a different number of cores with at least one of the cores having a security component.

In the example of FIG. 29, the security component 550 comprises a BUFFER 553 that may be a memory capable to store a limited number of data blocks and that may be used by the crypto module 551 of the security component to verify that the HASH data of the data blocks before storing at least a part of the data block in a cache line or storing all the data block in more than one cache line, for example storing the data block in N cache lines, where N is the size in bytes of the data block divided by the size in bytes of the cache line.

To avoid confusion, note than in FIG. 29 "N" is the number of cache lines that may be used to store one data block while in FIG. 28 "N" was the number of data blocks that may be stored in one cache line.

In the example of FIG. 29, the size in bytes of the data block 2910 is 256 bytes and the size in bytes of the cache lines 2931 and 2932 is 128 bytes and the security component may calculate N by dividing 256 bytes/128 bytes and the value of N is two meaning that the data block 2910 may be stored using two cache lines in the L1 cache memory of the core 510, for example in two cache lines of the L1 instruction cache 530.

In the example of FIG. 29, the data block comprises a first data FIELDS 2911, a second data HASH 2912 and a third data INSTRUCTION 2913. In some implementations the order of these data may be different. The data block 2910 may use, for example, the order shown in FIG. 27B.

In one implementation, the security component transfers the first 128 bytes of the data block 2910 to a first part 2921 of a buffer memory 553A and the security component reads the information stored in the FIELDS data fields, like for example the ID_CL data fields and/or the LENGTH data field to calculate the size in bytes of the data block 2910, using one of the different process explained before in the implementation of FIG. 28 to calculate the size of a data block.

In the example of FIG. 29 the security component reads the FIELDS data and determines that the size of the data block stored in part 3021 of buffer 553A is 256 bytes and then the security component request the transfer of the second 128 bytes of the data block 2910 from memory to the part 2922 of buffer 553A to store the complete data block 2910 in the memory BUFFER 553A that may be a part of the memory BUFFER 553.

Once the data block 2910 is stored in the memory BUFFER 553A, the security component may verify that the HASH data is correct.

After verifying that the HASH data is correct, the security component may transfer at least a part of the data block 2910 to a cache line, like for example may transfer the part 2921 (for example comprising the instructions INST1) to the cache line 3031 and/or transfer the part 2922 (for example comprising the instructions INST2) to the cache line 3032.

In on implementation, the security component may transfer only the part corresponding to the memory address that the core has requested from main memory.

In one implementation the security component may keep stored the data block 2910 in the memory BUFFER 553A ready to transfer any part of it to a cache line without verifying again the HASH data field. For example the BUFFER 553A may store the data block 2910 during a certain amount of time or until the memory BUFFER 553A will need to store another data block.

In one implementation the security component may use the SECURE BIT of cache lines 2931 and/or 2932 to indicate to the CORE 510 that it is allowed to execute instructions stored in the cache lines 2931 and/or 2932.

In one implementation, the compiler used to generate the computer program comprising the data block 2910 of FIG. 29 or the computer program 2810 of FIG. 28, may store the first byte of each data block in the virtual memory address of the first byte corresponding to the first byte of a cache line. In this way, when one core ask for one byte of a data block, the first byte of the data block is transferred to the first byte of a cache line or to the first byte of buffer 553A.

Figure 30:
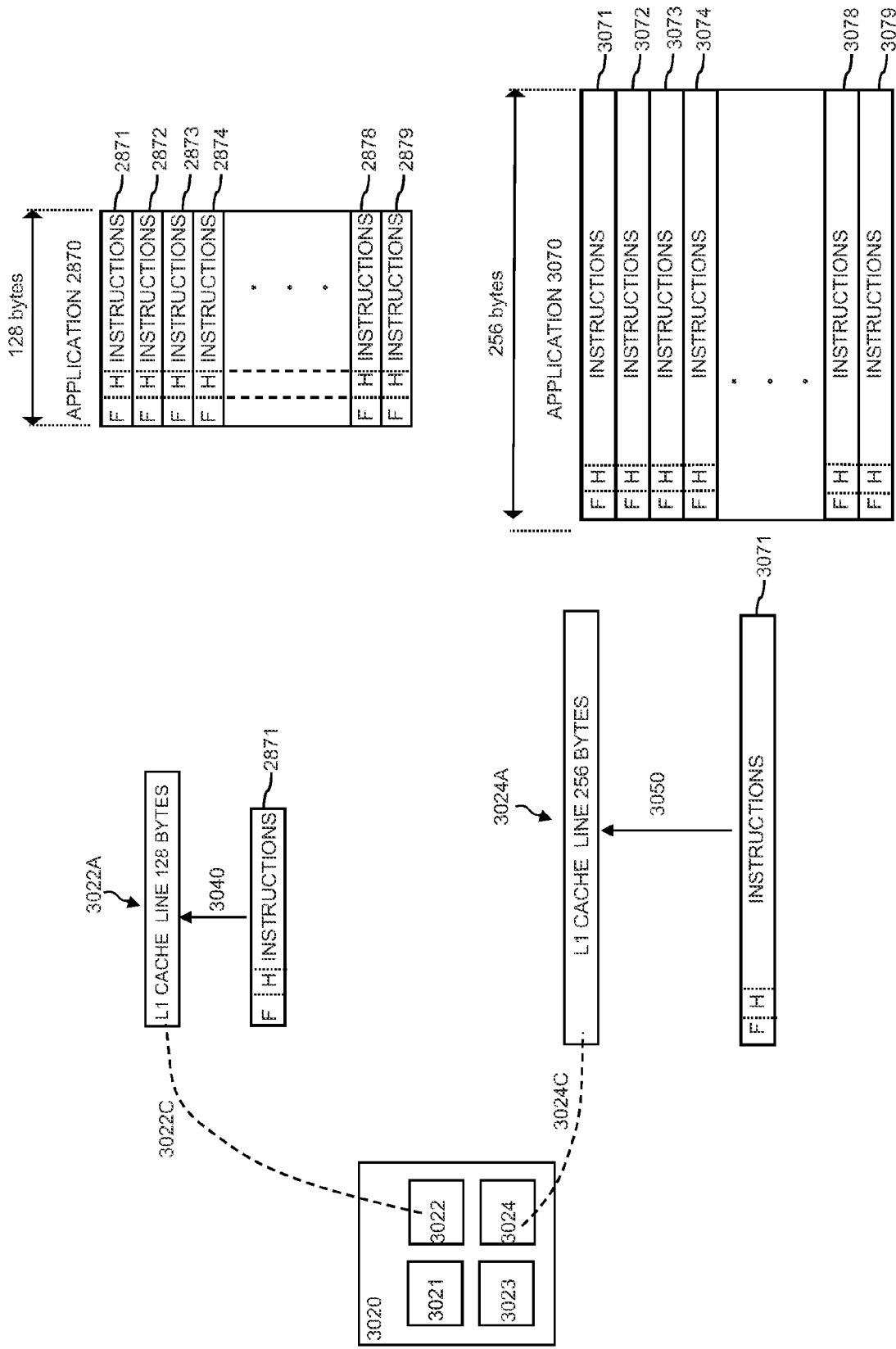
FIG. 30 shown an implementation of a processor comprising cores with cache lines having different lengths.

FIG. 30 shows an example of one implementation of a processor that may comprise different cores and may use cache lines of different length, for example a processor 3020 with four cores 3021, 3022, 3023 and 3024, where a first core 3022 uses a cache line of 128 bytes and a second core 3024 using a cache line of 256 bytes.

The dashed line 3022C indicates that the element 3022A is a 128 bytes cache line of the core 3022.

The dashed line 3024C indicates that the element 3024A is a 256 bytes cache line of the core 3024.

FIG. 30 shows two computer programs 2870 and 3070 that comprise data blocks of 128 bytes and 256 bytes respectively. The application 2870 may be the same application 2870 explained in previous figures.

FIG. 30 shows the first four data blocks and the last two data blocks of the computer program 3070 to simplify the figure but, as explained before, the computer program 3070 may comprise thousands or millions of data blocks occupying Megabytes or Gigabytes in the memory of a computing device.

Elements 3071, 3072, 3073 and 3074 in FIG. 30 represent the first four data blocks of computer program 3070, and elements 3078 and 3079 represent the last two data blocks.

The processor 3020 and/or the operating system of the computing device may determine the size of the data blocks of a computer program application, for example reading the metadata of the computer program or reading the ID_CL and/or the LENGTH data fields stored in one data block, for example the first data block comprising instructions of the computer program application, the first data block comprising data or the first data block comprising metadata.

After determining the size of the data blocks of a computer program, the processor and/or the operating system (for example a program of the operating system being executed in the processor) may select one or more cores in the processor to execute the computer program, where the selected one or more cores in the processor have a security component and use L1 cache lines of the same length in bytes of the length in bytes of the data blocks of the computer program.

In the example of FIG. 30, the processor 3020 of a computing device may execute a program loader of the operating system of the computing device and may select the core 3022 to execute the computer program application 2870 comprising data blocks of 128 bytes and/or may select the core 3024 to execute the computer program application 3070 comprising data blocks of 256 bytes, where both cores 3022 and 3024 have a security component, the core 3022 using L1 cache lines of 128 bytes and the core 3024 using L1 cache lines of 256 bytes.

Figure 31:
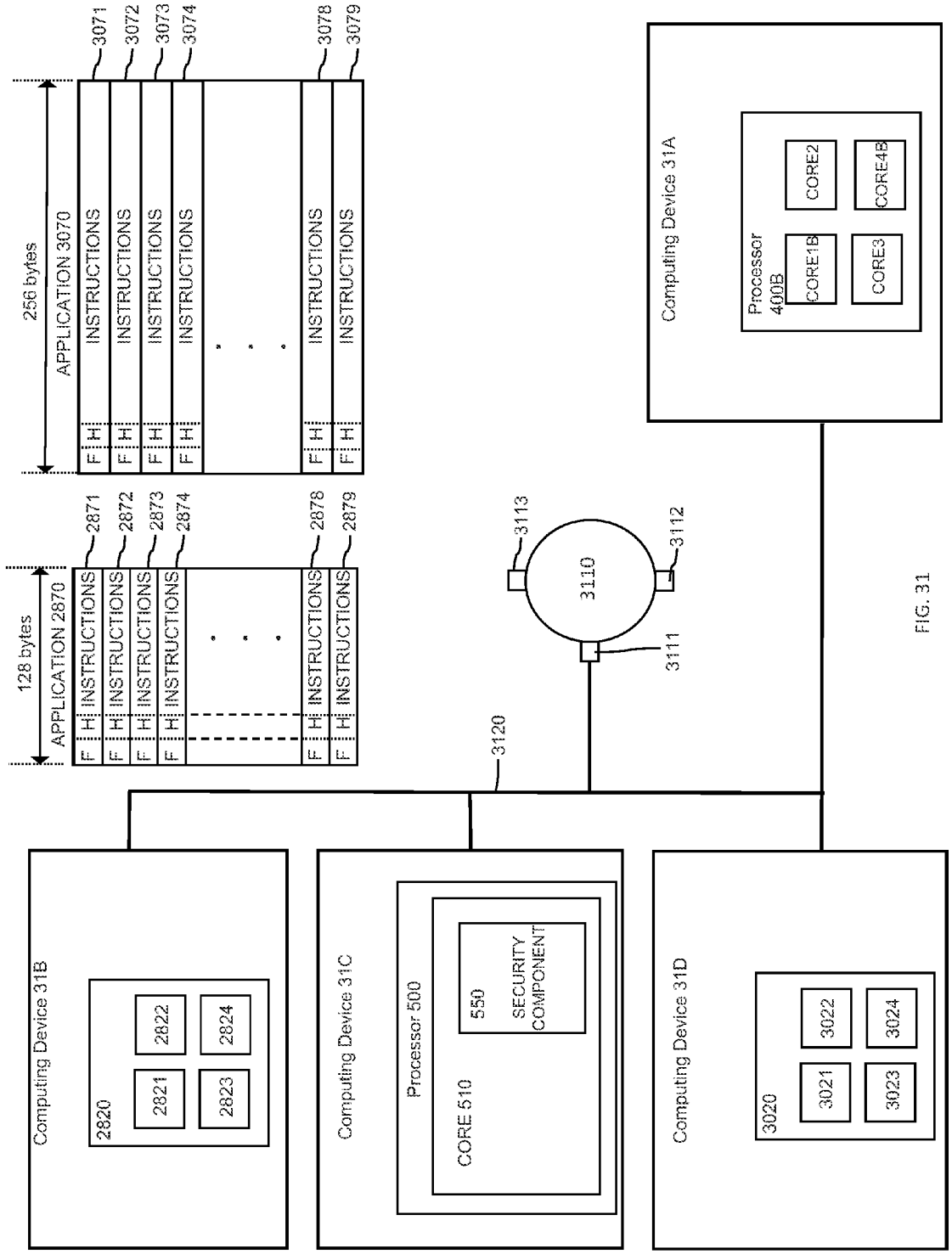
FIG. 31 shows an implementation of different computing devices connected in a data network.

FIG. 31 shows an example of a data network 3120 connecting a router 3110 and four computer devices 31A, 31B, 31C and 31D, like for example an Ethernet network using the IP protocol, or any other data network.

The router 3110 comprises three network interfaces 3111, 3112 and 3113. The network interfaces 3112 and 3113 may be connected to other networks (not shown in the figure) like for example the Internet, a mobile network, a local area network or a wide area network.

In the example of FIG. 31, the computing device 31A may use the configuration of processor 400B explained in FIG. 23. For example computing device 31A may be capable of executing computer programs applications comprising data blocks with the same length in bytes as the L1 cache lines of the cores CORE1B and CORE4B having a security component.

For example, if the length in bytes of the L1 cache lines of the cores of processor 400B is 256 bytes, the computing device may be able to execute the computer program application 3070 comprising data blocks of 256 bytes in the secure cores CORE1B and CORE4B. The computing device 31A may be capable of executing the computer program application 2870 comprising data blocks of 128 bytes in the cores that are not secure, like CORE2 and CORE3 but this may be a security risk.

Computing device 31B may use processor 2820 explained in FIG. 28. Processor 2820 may comprise one or more cores with a security component and cache lines of 256 bytes. The processor 2820 may execute both computer program applications 2870 and 3070 in secure cores as explained in FIG. 28.

Computing device 31C may use the implementation of processor 500 described in FIG. 29 and the CORE510 may be a secure core capable of executing both computer program applications 2870 and 3070.

Computer device 31D may use the processor 3020 described in FIG. 30 and is capable to execute the computer program application 2870 in at least the secure core 3022 and capable to execute the computer program application 3070 in at least the secure core 3024, as explained in FIG. 30.

Other implementations are possible to execute in one computing device different computer programs with data blocks of different length.

In some implementations the features described in processors of FIGS. 28 and 29 may be combined in a simple processor having at least one core with a security component and using cache lines of X bytes length, allowing a processor to execute first, second and/or third computer programs, the first computer program comprising data blocks of the same X bytes length, the second computer program comprising data blocks with a length in bytes that is a fraction of the length in bytes of X, like for example X/2, X/3 or X/4, and the third computer program comprising data blocks with a length bigger than X, for example data blocks with 2× bytes, 3× bytes and/or 4× bytes.

In some implementations, the features described in FIGS. 28, 29 and 30 may also be combined in a single processor that may have cores with different cache lines.

What is claimed is:

1. A processor adapted to process data blocks of a first computer program, the data blocks having a length in bytes and comprising first data comprising information fields, second data comprising executable instructions and third data usable to verify at least the second data, the information fields of the first data comprising a first information field identifying a format of the data blocks, a second information field identifying a first cryptographic key and a third information field identifying a first cryptographic algorithm usable to verify the at least second data using the first cryptographic key and the third data, the processor comprising a first core having an L1 instruction cache memory with cache lines having a length in bytes that is same length in bytes as the data blocks, the L1 instruction cache memory adapted to store a data block of the first computer program in a cache line of the L1 instruction cache memory, the first core comprising a security component adapted to read information of the data block stored in the cache line and to access inside the processor the first cryptographic key identified in the second information field of the data block and use the first cryptographic key in the execution of the first cryptographic algorithm to calculate fourth data based at least on the second data, and to verify at least the second data if the calculated fourth data is the same as the third data stored in the data block, the first core adapted to execute the executable instructions of a data block stored in the cache line of the L1 instruction cache memory only upon the security component verifying at least the second data of the data block, the processor further comprising a second core, registers, a logic unit and a set of instructions, the second core being a non-secure core and sharing with the first core the registers, the logic unit and the set of instructions.

2. The processor of claim 1, wherein the security component comprises logic gates that implement Boolean functions that are useable to execute one or both of read and verify functions of the security component.

3. The processor of claim 1, wherein the security component comprises a Field Programmable Gate Array that is configured, reconfigured or programmed to execute one or both of read and verify functions of the security component.

4. The processor of claim 1, wherein the first cryptographic key is a secret key and the first cryptographic algorithm is a symmetric cryptographic algorithm, the security component adapted to calculate the fourth data using the secret key and the symmetric cryptographic algorithm.

5. The processor of claim 1, wherein the first cryptographic key is a public key associated with a private key and the first cryptographic algorithm is an asymmetric cryptographic algorithm, the security component adapted to calculate the fourth data using the public key and the asymmetric cryptographic algorithm.

6. The processor of claim 5, wherein the private key is stored inside the processor.

7. A processor adapted to process data blocks of a first computer program, the data blocks having a length in bytes and comprising first data comprising information fields, second data comprising executable instructions and third data usable to verify at least the first and second data, the information fields of the first data comprising a first information field identifying a format of the data blocks, a second information field identifying a first cryptographic key and a third information field identifying a first cryptographic algorithm usable to verify the at least first and second data using the first cryptographic key and the third data, the processor comprising a first core having an L1 instruction cache memory with cache lines having a length in bytes that is same length in bytes as the data blocks, the L1 instruction cache memory adapted to store a data block of the first computer program in a cache line of the L1 instruction cache memory, the first core comprising a security component adapted to read information of the data block stored in the cache line and to access inside the processor the first cryptographic key identified in the second information field of the data block and use the first cryptographic key in the execution of the first cryptographic algorithm to calculate fourth data based at least on the first and second data, and to verify at least the first and second data if the calculated fourth data is the same as the third data stored in the data block, the first core adapted to execute the executable instructions of a data block stored in the cache line of the L1 instruction cache memory only upon the security component verifying at least the first and second data of the data block, the processor further comprising a second core, registers, a logic unit and a set of instructions, the second core being a non-secure core and sharing with the first core the registers, the logic unit and the set of instructions.

8. The processor of claim 7, wherein the security component comprises logic gates that implement Boolean functions that are useable to execute one or both of read and verify functions of the security component.

9. The processor of claim 7, wherein the security component comprises a Field Programmable Gate Array that is configured, reconfigured or programmed to execute one or both of read and verify functions of the security component.

10. The processor of claim 7, wherein the first cryptographic key is a secret key and the first cryptographic algorithm is a symmetric cryptographic algorithm, the security component adapted to calculate the fourth data using the secret key and the symmetric cryptographic algorithm.

11. The processor of claim 7, wherein the first cryptographic key is a public key associated with a private key and the first cryptographic algorithm is an asymmetric cryptographic algorithm, the security component adapted to calculate the fourth data using the public key and the asymmetric cryptographic algorithm.

12. The processor of claim 11, wherein the private key is stored inside the processor.

13. A processor adapted to process data blocks of a first computer program, the data blocks having a length in bytes and comprising first data comprising information fields, second data comprising executable instructions and third data usable to verify at least the second data, the information fields of the first data comprising a first information field identifying a format of the data blocks, a second information field identifying a first cryptographic key and a third information field identifying a first cryptographic algorithm usable to verify the at least second data using the first cryptographic key and the third data, the processor comprising a first core having an L1 instruction cache memory with cache lines having a length in bytes that is same length in bytes as the data blocks, the L1 instruction cache memory adapted to store a data block of the first computer program in a cache line of the L1 instruction cache memory, the first core comprising a security component adapted to read information of the data block stored in the cache line and to access inside the processor the first cryptographic key identified in the second information field of the data block and use the first cryptographic key in the execution of the first cryptographic algorithm to calculate fourth data based at least on the second data, and to verify at least the second data if the calculated fourth data is the same as the third data stored in the data block, the first core adapted to execute the executable instructions of a data block stored in the cache line of the L1 instruction cache memory only upon the security component verifying at least the second data of the data block, the processor further comprising a second core, the second core being a non-secure core, the first core is adapted to execute a first type of machine code instructions and the second core is adapted to execute a second type of machine code instructions, the first and second types of machine code instructions being the same.

14. The processor of claim 13, wherein the security component comprises logic gates that implement Boolean functions that are useable to execute one or both of read and verify functions of the security component.

15. The processor of claim 13, wherein the security component comprises a Field Programmable Gate Array that is configured, reconfigured or programmed to execute one or both of read and verify functions of the security component.

16. The processor of claim 13, wherein the first cryptographic key is a secret key and the first cryptographic algorithm is a symmetric cryptographic algorithm, the security component adapted to calculate the fourth data using the secret key and the symmetric cryptographic algorithm.

17. The processor of claim 13, wherein the first cryptographic key is a public key associated with a private key and the first cryptographic algorithm is an asymmetric cryptographic algorithm, the security component adapted to calculate the fourth data using the public key and the asymmetric cryptographic algorithm.

18. The processor of claim 17, wherein the private key is stored inside the processor.

19. A processor adapted to process data blocks of a first computer program, the data blocks having a length in bytes and comprising first data comprising information fields, second data comprising executable instructions and third data usable to verify at least the second data, the information fields of the first data comprising a first information field identifying a format of the data blocks, a second information field identifying a first cryptographic key and a third information field identifying a first cryptographic algorithm usable to verify the at least second data using the first cryptographic key and the third data, the processor comprising a first core having an L1 instruction cache memory with cache lines having a length in bytes that is same length in bytes as the data blocks, the L1 instruction cache memory adapted to store a data block of the first computer program in a cache line of the L1 instruction cache memory, the first core comprising a security component adapted to read information of the data block stored in the cache line and to access inside the processor the first cryptographic key identified in the second information field of the data block and use the first cryptographic key in the execution of the first cryptographic algorithm to calculate fourth data based at least on the second data, and to verify at least the second data if the calculated fourth data is the same as the third data stored in the data block, the first core adapted to execute the executable instructions of a data block stored in the cache line of the L1 instruction cache memory only upon the security component verifying at least the second data of the data block, the processor further comprising a second core, the second core being a non-secure core, the first core is adapted to execute instructions generated using a first assembly language and the second core is adapted to execute instructions generated using a second assembly language, the first and second assembly languages being the same.

20. The processor of claim 19, wherein the security component comprises logic gates that implement Boolean functions that are useable to execute one or both of read and verify functions of the security component.

21. The processor of claim 19, wherein the security component comprises a Field Programmable Gate Array that is configured, reconfigured or programmed to execute one or both of read and verify functions of the security component.

22. The processor of claim 19, wherein the first cryptographic key is a secret key and the first cryptographic algorithm is a symmetric cryptographic algorithm, the security component adapted to calculate the fourth data using the secret key and the symmetric cryptographic algorithm.

23. The processor of claim 19, wherein the first cryptographic key is a public key associated with a private key and the first cryptographic algorithm is an asymmetric cryptographic algorithm, the security component adapted to calculate the fourth data using the public key and the asymmetric cryptographic algorithm.

24. The processor of claim 23, wherein the private key is stored inside the processor.

25. A processor adapted to process data blocks of a first computer program, the data blocks having a length in bytes and comprising first data comprising information fields, second data comprising executable instructions and third data usable to verify at least the second data, the information fields of the first data comprising a first information field identifying a format of the data blocks, a second information field identifying a first cryptographic key and a third information field identifying a first cryptographic algorithm usable to verify the at least second data using the first cryptographic key and the third data, the processor comprising a first core having an L1 instruction cache memory with cache lines having a length in bytes that is same length in bytes as the data blocks, the L1 instruction cache memory adapted to store a data block of the first computer program in a cache line of the L1 instruction cache memory, the first core comprising a security component adapted to read information of the data block stored in the cache line and to access inside the processor the first cryptographic key identified in the second information field of the data block and use the first cryptographic key in the execution of the first cryptographic algorithm to calculate fourth data based at least on the second data, and to verify at least the second data if the calculated fourth data is the same as the third data stored in the data block, the first core adapted to execute the executable instructions of a data block stored in the cache line of the L1 instruction cache memory only upon the security component verifying at least the second data of the data block, the processor further comprising a second core, the second core being a non-secure core, the first core has a first instruction set or a first instruction set architecture, and the second core has a second instruction set or a second instruction set architecture, the first and second instruction sets being the same or the first and second instruction set architectures being the same.

26. The processor of claim 25, wherein the security component comprises logic gates that implement Boolean functions that are useable to execute one or both of read and verify functions of the security component.

27. The processor of claim 25, wherein the security component comprises a Field Programmable Gate Array that is configured, reconfigured or programmed to execute one or both of read and verify functions of the security component.

28. The processor of claim 25, wherein the first cryptographic key is a secret key and the first cryptographic algorithm is a symmetric cryptographic algorithm, the security component adapted to calculate the fourth data using the secret key and the symmetric cryptographic algorithm.

29. The processor of claim 25, wherein the first cryptographic key is a public key associated with a private key and the first cryptographic algorithm is an asymmetric cryptographic algorithm, the security component adapted to calculate the fourth data using the public key and the asymmetric cryptographic algorithm.

30. The processor of claim 29, wherein the private key is stored inside the processor.

31. A processor adapted to process data blocks of a first computer program, the data blocks having a length in bytes and comprising first data comprising information fields, second data comprising executable instructions and third data usable to verify at least the second data, the information fields of the first data comprising a first information field identifying a format of the data blocks, a second information field identifying a first cryptographic key and a third information field identifying a first cryptographic algorithm usable to verify the at least second data using the first cryptographic key and the third data, the processor comprising a first core having an L1 instruction cache memory with cache lines having a length in bytes that is same length in bytes as the data blocks, the L1 instruction cache memory adapted to store a data block of the first computer program in a cache line of the L1 instruction cache memory, the first core comprising a security component adapted to read information of the data block stored in the cache line and to access inside the processor the first cryptographic key identified in the second information field of the data block and use the first cryptographic key in the execution of the first cryptographic algorithm to calculate fourth data based at least on the second data, and to verify at least the second data if the calculated fourth data is the same as the third data stored in the data block, the first core adapted to execute the executable instructions of a data block stored in the cache line of the L1 instruction cache memory only upon the security component verifying at least the second data of the data block, the processor further comprising a second core, the second core being a non-secure core, the first core has a first microarchitecture and the second core has a second microarchitecture, the first and second microarchitectures being the same.

32. The processor of claim 31, wherein the security component comprises logic gates that implement Boolean functions that are useable to execute one or both of read and verify functions of the security component.

33. The processor of claim 31, wherein the security component comprises a Field Programmable Gate Array that is configured, reconfigured or programmed to execute one or both of read and verify functions of the security component.

34. The processor of claim 31, wherein the first cryptographic key is a secret key and the first cryptographic algorithm is a symmetric cryptographic algorithm, the security component adapted to calculate the fourth data using the secret key and the symmetric cryptographic algorithm.

35. The processor of claim 31, wherein the first cryptographic key is a public key associated with a private key and the first cryptographic algorithm is an asymmetric cryptographic algorithm, the security component adapted to calculate the fourth data using the public key and the asymmetric cryptographic algorithm.

36. The processor of claim 35, wherein the private key is stored inside the processor.

37. A processor adapted to process data blocks of a first computer program, the data blocks having a length in bytes and comprising first data comprising information fields, second data comprising executable instructions and third data usable to verify at least the second data, the information fields of the first data comprising a first information field identifying a format of the data blocks, a second information field identifying a first cryptographic key and a third information field identifying a first cryptographic algorithm usable to verify the at least second data using the first cryptographic key and the third data, the processor comprising a first core having an L1 instruction cache memory with cache lines having a length in bytes that is same length in bytes as the data blocks, the L1 instruction cache memory adapted to store a data block of the first computer program in a cache line of the L1 instruction cache memory, the first core comprising a security component adapted to read information of the data block stored in the cache line and to access inside the processor the first cryptographic key identified in the second information field of the data block and use the first cryptographic key in the execution of the first cryptographic algorithm to calculate fourth data based at least on the second data, and to verify at least the second data if the calculated fourth data is the same as the third data stored in the data block, the first core adapted to execute the executable instructions of a data block stored in the cache line of the L1 instruction cache memory only upon the security component verifying at least the second data of the data block, the processor further comprising a second core, the second core being a non-secure core, the first core has a first microarchitecture and a first instruction set and the second core has a second microarchitecture and a second instruction set, the first and second microarchitectures being different and the first and second instruction sets being the same.

38. The processor of claim 37, wherein the security component comprises logic gates that implement Boolean functions that are useable to execute one or both of read and verify functions of the security component.

39. The processor of claim 37, wherein the security component comprises a Field Programmable Gate Array that is configured, reconfigured or programmed to execute one or both of read and verify functions of the security component.

40. The processor of claim 37, wherein the first cryptographic key is a secret key and the first cryptographic algorithm is a symmetric cryptographic algorithm, the security component adapted to calculate the fourth data using the secret key and the symmetric cryptographic algorithm.

41. The processor of claim 37, wherein the first cryptographic key is a public key associated with a private key and the first cryptographic algorithm is an asymmetric cryptographic algorithm, the security component adapted to calculate the fourth data using the public key and the asymmetric cryptographic algorithm.

42. The processor of claim 41, wherein the private key is stored inside the processor.

43. A processor adapted to process data blocks of a first computer program, the data blocks having a length in bytes and comprising first data comprising information fields, second data comprising executable instructions and third data usable to verify at least the second data, the information fields of the first data comprising a first information field identifying a format of the data blocks, a second information field identifying a first cryptographic key and a third information field identifying a first cryptographic algorithm usable to verify the at least second data using the first cryptographic key and the third data, the processor comprising a first core having an L1 instruction cache memory with cache lines having a length in bytes that is same length in bytes as the data blocks, the L1 instruction cache memory adapted to store a data block of the first computer program in a cache line of the L1 instruction cache memory, the first core comprising a security component adapted to read information of the data block stored in the cache line and to access inside the processor the first cryptographic key identified in the second information field of the data block and use the first cryptographic key in the execution of the first cryptographic algorithm to calculate fourth data based at least on the second data, and to verify at least the second data if the calculated fourth data is the same as the third data stored in the data block, the first core adapted to execute the executable instructions of a data block stored in the cache line of the L1 instruction cache memory only upon the security component verifying at least the second data of the data block, the processor further comprising a second core, the second core being a non-secure core, the first core has a first microarchitecture having a first part used to implement or execute instruction sets and the second core has a second microarchitecture having a second part used to implement or execute instruction sets, the first and second parts being the same.

44. The processor of claim 43, wherein the security component comprises logic gates that implement Boolean functions that are useable to execute one or both of read and verify functions of the security component.

45. The processor of claim 43, wherein the security component comprises a Field Programmable Gate Array that is configured, reconfigured or programmed to execute one or both of read and verify functions of the security component.

46. The processor of claim 43, wherein the first cryptographic key is a secret key and the first cryptographic algorithm is a symmetric cryptographic algorithm, the security component adapted to calculate the fourth data using the secret key and the symmetric cryptographic algorithm.

47. The processor of claim 43, wherein the first cryptographic key is a public key associated with a private key and the first cryptographic algorithm is an asymmetric cryptographic algorithm, the security component adapted to calculate the fourth data using the public key and the asymmetric cryptographic algorithm.

48. The processor of claim 47, wherein the private key is stored inside the processor.

49. A processor adapted to process data blocks of a first computer program, the data blocks having a length in bytes and comprising first data comprising information fields, second data comprising executable instructions and third data usable to verify at least the first and second data, the information fields of the first data comprising a first information field identifying a format of the data blocks, a second information field identifying a first cryptographic key and a third information field identifying a first cryptographic algorithm usable to verify the at least first and second data using the first cryptographic key and the third data, the processor comprising a first core having an L1 instruction cache memory with cache lines having a length in bytes that is same length in bytes as the data blocks, the L1 instruction cache memory adapted to store a data block of the first computer program in a cache line of the L1 instruction cache memory, the first core comprising a security component adapted to read information of the data block stored in the cache line and to access inside the processor the first cryptographic key identified in the second information field of the data block and use the first cryptographic key in the execution of the first cryptographic algorithm to calculate fourth data based at least on the first and second data, and to verify at least the first and second data if the calculated fourth data is the same as the third data stored in the data block, the first core adapted to execute the executable instructions of a data block stored in the cache line of the L1 instruction cache memory only upon the security component verifying at least the first and second data of the data block, the processor further comprising a second core, the second core being a non-secure core, the first core is adapted to execute a first type of machine code instructions and the second core is adapted to execute a second type of machine code instructions, the first and second types of machine code instructions being the same.

50. The processor of claim 49, wherein the security component comprises logic gates that implement Boolean functions that are useable to execute one or both of read and verify functions of the security component.

51. The processor of claim 49, wherein the security component comprises a Field Programmable Gate Array that is configured, reconfigured or programmed to execute one or both of read and verify functions of the security component.

52. The processor of claim 49, wherein the first cryptographic key is a secret key and the first cryptographic algorithm is a symmetric cryptographic algorithm, the security component adapted to calculate the fourth data using the secret key and the symmetric cryptographic algorithm.

53. The processor of claim 49, wherein the first cryptographic key is a public key associated with a private key and the first cryptographic algorithm is an asymmetric cryptographic algorithm, the security component adapted to calculate the fourth data using the public key and the asymmetric cryptographic algorithm.

54. The processor of claim 49, wherein the private key is stored inside the processor.

55. A processor adapted to process data blocks of a first computer program, the data blocks having a length in bytes and comprising first data comprising information fields, second data comprising executable instructions and third data usable to verify at least the first and second data, the information fields of the first data comprising a first information field identifying a format of the data blocks, a second information field identifying a first cryptographic key and a third information field identifying a first cryptographic algorithm usable to verify the at least first and second data using the first cryptographic key and the third data, the processor comprising a first core having an L1 instruction cache memory with cache lines having a length in bytes that is same length in bytes as the data blocks, the L1 instruction cache memory adapted to store a data block of the first computer program in a cache line of the L1 instruction cache memory, the first core comprising a security component adapted to read information of the data block stored in the cache line and to access inside the processor the first cryptographic key identified in the second information field of the data block and use the first cryptographic key in the execution of the first cryptographic algorithm to calculate fourth data based at least on the first and second data, and to verify at least the first and second data if the calculated fourth data is the same as the third data stored in the data block, the first core adapted to execute the executable instructions of a data block stored in the cache line of the L1 instruction cache memory only upon the security component verifying at least the first and second data of the data block, the processor further comprising a second core, the second core being a non-secure core, the first core is adapted to execute instructions generated using a first assembly language and the second core is adapted to execute instructions generated using a second assembly language, the first and second assembly languages being the same.

56. The processor of claim 55, wherein the security component comprises logic gates that implement Boolean functions that are useable to execute one or both of read and verify functions of the security component.

57. The processor of claim 55, wherein the security component comprises a Field Programmable Gate Array that is configured, reconfigured or programmed to execute one or both of read and verify functions of the security component.

58. The processor of claim 55, wherein the first cryptographic key is a secret key and the first cryptographic algorithm is a symmetric cryptographic algorithm, the security component adapted to calculate the fourth data using the secret key and the symmetric cryptographic algorithm.

59. The processor of claim 55, wherein the first cryptographic key is a public key associated with a private key and the first cryptographic algorithm is an asymmetric cryptographic algorithm, the security component adapted to calculate the fourth data using the public key and the asymmetric cryptographic algorithm.

60. The processor of claim 59, wherein the private key is stored inside the processor.

61. A processor adapted to process data blocks of a first computer program, the data blocks having a length in bytes and comprising first data comprising information fields, second data comprising executable instructions and third data usable to verify at least the first and second data, the information fields of the first data comprising a first information field identifying a format of the data blocks, a second information field identifying a first cryptographic key and a third information field identifying a first cryptographic algorithm usable to verify the at least first and second data using the first cryptographic key and the third data, the processor comprising a first core having an L1 instruction cache memory with cache lines having a length in bytes that is same length in bytes as the data blocks, the L1 instruction cache memory adapted to store a data block of the first computer program in a cache line of the L1 instruction cache memory, the first core comprising a security component adapted to read information of the data block stored in the cache line and to access inside the processor the first cryptographic key identified in the second information field of the data block and use the first cryptographic key in the execution of the first cryptographic algorithm to calculate fourth data based at least on the first and second data, and to verify at least the first and second data if the calculated fourth data is the same as the third data stored in the data block, the first core adapted to execute the executable instructions of a data block stored in the cache line of the L1 instruction cache memory only upon the security component verifying at least the first and second data of the data block, the processor further comprising a second core, the second core being a non-secure core, the first core has a first instruction set or a first instruction set architecture, and the second core has a second instruction set or a second instruction set architecture, the first and second instruction sets being the same or the first and second instruction set architectures being the same.

62. The processor of claim 61, wherein the security component comprises logic gates that implement Boolean functions that are useable to execute one or both of read and verify functions of the security component.

63. The processor of claim 61, wherein the security component comprises a Field Programmable Gate Array that is configured, reconfigured or programmed to execute one or both of read and verify functions of the security component.

64. The processor of claim 61, wherein the first cryptographic key is a secret key and the first cryptographic algorithm is a symmetric cryptographic algorithm, the security component adapted to calculate the fourth data using the secret key and the symmetric cryptographic algorithm.

65. The processor of claim 61, wherein the first cryptographic key is a public key associated with a private key and the first cryptographic algorithm is an asymmetric cryptographic algorithm, the security component adapted to calculate the fourth data using the public key and the asymmetric cryptographic algorithm.

66. The processor of claim 65, wherein the private key is stored inside the processor.

67. A processor adapted to process data blocks of a first computer program, the data blocks having a length in bytes and comprising first data comprising information fields, second data comprising executable instructions and third data usable to verify at least the first and second data, the information fields of the first data comprising a first information field identifying a format of the data blocks, a second information field identifying a first cryptographic key and a third information field identifying a first cryptographic algorithm usable to verify the at least first and second data using the first cryptographic key and the third data, the processor comprising a first core having an L1 instruction cache memory with cache lines having a length in bytes that is same length in bytes as the data blocks, the L1 instruction cache memory adapted to store a data block of the first computer program in a cache line of the L1 instruction cache memory, the first core comprising a security component adapted to read information of the data block stored in the cache line and to access inside the processor the first cryptographic key identified in the second information field of the data block and use the first cryptographic key in the execution of the first cryptographic algorithm to calculate fourth data based at least on the first and second data, and to verify at least the first and second data if the calculated fourth data is the same as the third data stored in the data block, the first core adapted to execute the executable instructions of a data block stored in the cache line of the L1 instruction cache memory only upon the security component verifying at least the first and second data of the data block, the processor further comprising a second core, the second core being a non-secure core, the first core has a first microarchitecture and the second core has a second microarchitecture, the first and second microarchitectures being the same.

68. The processor of claim 67, wherein the security component comprises logic gates that implement Boolean functions that are useable to execute one or both of read and verify functions of the security component.

69. The processor of claim 67, wherein the security component comprises a Field Programmable Gate Array that is configured, reconfigured or programmed to execute one or both of read and verify functions of the security component.

70. The processor of claim 67, wherein the first cryptographic key is a secret key and the first cryptographic algorithm is a symmetric cryptographic algorithm, the security component adapted to calculate the fourth data using the secret key and the symmetric cryptographic algorithm.

71. The processor of claim 67, wherein the first cryptographic key is a public key associated with a private key and the first cryptographic algorithm is an asymmetric cryptographic algorithm, the security component adapted to calculate the fourth data using the public key and the asymmetric cryptographic algorithm.

72. The processor of claim 71, wherein the private key is stored inside the processor.

73. A processor adapted to process data blocks of a first computer program, the data blocks having a length in bytes and comprising first data comprising information fields, second data comprising executable instructions and third data usable to verify at least the first and second data, the information fields of the first data comprising a first information field identifying a format of the data blocks, a second information field identifying a first cryptographic key and a third information field identifying a first cryptographic algorithm usable to verify the at least first and second data using the first cryptographic key and the third data, the processor comprising a first core having an L1 instruction cache memory with cache lines having a length in bytes that is same length in bytes as the data blocks, the L1 instruction cache memory adapted to store a data block of the first computer program in a cache line of the L1 instruction cache memory, the first core comprising a security component adapted to read information of the data block stored in the cache line and to access inside the processor the first cryptographic key identified in the second information field of the data block and use the first cryptographic key in the execution of the first cryptographic algorithm to calculate fourth data based at least on the first and second data, and to verify at least the first and second data if the calculated fourth data is the same as the third data stored in the data block, the first core adapted to execute the executable instructions of a data block stored in the cache line of the L1 instruction cache memory only upon the security component verifying at least the first and second data of the data block, the processor further comprising a second core, the second core being a non-secure core, the first core has a first microarchitecture and a first instruction set and the second core has a second microarchitecture and a second instruction set, the first and second microarchitectures being different and the first and second instruction sets being the same.

74. The processor of claim 73, wherein the security component comprises logic gates that implement Boolean functions that are useable to execute one or both of read and verify functions of the security component.

75. The processor of claim 73, wherein the security component comprises a Field Programmable Gate Array that is configured, reconfigured or programmed to execute one or both of read and verify functions of the security component.

76. The processor of claim 73, wherein the first cryptographic key is a secret key and the first cryptographic algorithm is a symmetric cryptographic algorithm, the security component adapted to calculate the fourth data using the secret key and the symmetric cryptographic algorithm.

77. The processor of claim 73, wherein the first cryptographic key is a public key associated with a private key and the first cryptographic algorithm is an asymmetric cryptographic algorithm, the security component adapted to calculate the fourth data using the public key and the asymmetric cryptographic algorithm.

78. The processor of claim 77, wherein the private key is stored inside the processor.

79. A processor adapted to process data blocks of a first computer program, the data blocks having a length in bytes and comprising first data comprising information fields, second data comprising executable instructions and third data usable to verify at least the first and second data, the information fields of the first data comprising a first information field identifying a format of the data blocks, a second information field identifying a first cryptographic key and a third information field identifying a first cryptographic algorithm usable to verify the at least first and second data using the first cryptographic key and the third data, the processor comprising a first core having an L1 instruction cache memory with cache lines having a length in bytes that is same length in bytes as the data blocks, the L1 instruction cache memory adapted to store a data block of the first computer program in a cache line of the L1 instruction cache memory, the first core comprising a security component adapted to read information of the data block stored in the cache line and to access inside the processor the first cryptographic key identified in the second information field of the data block and use the first cryptographic key in the execution of the first cryptographic algorithm to calculate fourth data based at least on the first and second data, and to verify at least the first and second data if the calculated fourth data is the same as the third data stored in the data block, the first core adapted to execute the executable instructions of a data block stored in the cache line of the L1 instruction cache memory only upon the security component verifying at least the first and second data of the data block, the processor further comprising a second core, the second core being a non-secure core, the first core has a first microarchitecture having a first part used to implement or execute instruction sets and the second core has a second microarchitecture having a second part used to implement or execute instruction sets, the first and second parts being the same.

80. The processor of claim 79, wherein the security component comprises logic gates that implement Boolean functions that are useable to execute one or both of read and verify functions of the security component.

81. The processor of claim 79, wherein the security component comprises a Field Programmable Gate Array that is configured, reconfigured or programmed to execute one or both of read and verify functions of the security component.

82. The processor of claim 79, wherein the first cryptographic key is a secret key and the first cryptographic algorithm is a symmetric cryptographic algorithm, the security component adapted to calculate the fourth data using the secret key and the symmetric cryptographic algorithm.

83. The processor of claim 79, wherein the first cryptographic key is a public key associated with a private key and the first cryptographic algorithm is an asymmetric cryptographic algorithm, the security component adapted to calculate the fourth data using the public key and the asymmetric cryptographic algorithm.

84. The processor of claim 83, wherein the private key is stored inside the processor.

* * * * *